United States Patent
Usui et al.

(10) Patent No.: US 7,768,801 B2
(45) Date of Patent: *Aug. 3, 2010

(54) CURRENT RESONANT DC-DC CONVERTER OF MULTI-OUTPUT TYPE

(75) Inventors: Hiroshi Usui, Saitama (JP); Yukihiro Kaminaga, Saitama (JP); Syohei Osaka, Saitama (JP)

(73) Assignee: Sanken Electric Co., Ltd., Saitama (JP)

( * ) Notice: Subject to any disclaimer, the term of this patent is extended or adjusted under 35 U.S.C. 154(b) by 399 days.

This patent is subject to a terminal disclaimer.

(21) Appl. No.: 11/720,857

(22) PCT Filed: Aug. 10, 2005

(86) PCT No.: PCT/JP2005/014646

§ 371 (c)(1),
(2), (4) Date: Jun. 5, 2007

(87) PCT Pub. No.: WO2006/061924

PCT Pub. Date: Jun. 15, 2006

(65) Prior Publication Data

US 2009/0251925 A1   Oct. 8, 2009

(30) Foreign Application Priority Data

Dec. 8, 2004 (JP) ............................. 2004-355854
Mar. 4, 2005 (JP) ............................. 2005-060864

(51) Int. Cl.
   *H02M 3/335*   (2006.01)
(52) U.S. Cl. .................... 363/21.06; 363/89; 363/17
(58) Field of Classification Search ............. 363/16–20, 363/21.01, 21.08, 40, 55, 56.01, 95, 97, 131; 323/222, 266, 268, 271, 272, 207, 267

See application file for complete search history.

(56) References Cited

U.S. PATENT DOCUMENTS

| 5,619,403 A | * | 4/1997 | Ishikawa et al. ......... 363/21.06 |
| 2002/0006047 A1 | | 1/2002 | Yasumura |
| 2006/0104097 A1 | | 5/2006 | Tsuruya |
| 2007/0024255 A1 | * | 2/2007 | Yasumura .................... 323/267 |

FOREIGN PATENT DOCUMENTS

| JP | 3007062 | 1/1991 |
| JP | 2000014145 | 1/2000 |

(Continued)

*Primary Examiner*—Rajnikant B Patel
(74) *Attorney, Agent, or Firm*—Bachman & LaPointe, P.C.

(57) ABSTRACT

A current resonant DC-DC converter of multi-output type is provided which comprises an output-regulatory MOS-FET 40 connected between a secondary winding 5c of a transformer 5 and a smoothing capacitor 16 in a second rectifying smoother 17, and an output control circuit 41 for controlling the on-off operation of output-regulatory MOS-FET 40 based on voltage $V_{O2}$ from smoothing capacitor 16 in second rectifying smoother 17. By turning the on-off operation of output-regulatory MOS-FET 40 in synchronization with switching frequency of first or second MOS-FETs 1, 2, an ideal cross regulation among respective DC outputs can be obtained, providing the inexpensive converter with simple circuit alteration capable of producing highly stable DC outputs with high power conversion efficiency, high accuracy and less power conversion loss.

16 Claims, 32 Drawing Sheets

FOREIGN PATENT DOCUMENTS

| | | |
|---|---|---|
| JP | 2000217356 | 8/2000 |
| JP | 2002034245 | 1/2002 |
| JP | 2002-199721 | 7/2002 |
| JP | 2003-047248 | 2/2003 |
| JP | 2003-116279 | 4/2003 |
| WO | 03/052913 | 6/2003 |
| WO | 2004/036726 | 4/2004 |

* cited by examiner (A) Low input voltage E (B) High input voltage E (C) Under light-load Condition (D) Under heavy-load Condition

CURRENT RESONANT DC-DC CONVERTER OF MULTI-OUTPUT TYPE

TECHNICAL FIELD

This invention relates to a current resonance DC-DC converter of multi-output type for producing a plurality of DC outputs, in particular, of the type of capable of improving entire power conversion efficiency by reducing switching loss of output control switching element in a secondary side of the converter.

BACKGROUND OF THE ART

A prior art DC-DC converter of multi-output type comprises a switching element turned on and off to convert DC input from a DC power source into high frequency power which is supplied to a primary winding of a transformer so that the high frequency power is again converted into a plurality of DC powers through rectifying smoothers connected to a plurality of secondary windings in the transformer to produce a plurality of DC powers from each rectifying smoother. Such DC-DC converters have been used in information appliances such as personal computers and domestic appliances such as air conditioners and audio and visual electric products. For example, as shown in FIG. 35, such a prior art DC-DC converter of multi-output type comprises first and second main MOS-FETs 1 and 2 as first and second main switching elements connected in series to a DC power source 3; a series circuit of a first capacitor 4 for current resonance, a leakage inductance 5d and a primary winding 5a of a transformer 5 connected in parallel to second main MOS-FET 2; a second capacitor 6 for voltage pseudo resonance connected between drain and source terminals of first main MOS-FET 1; a first output rectifying diode 7 whose anode terminal is connected to one end of a first secondary winding 5b of transformer 5; a first output rectifying capacitor 8 connected between a cathode terminal of first output rectifying diode 7 and the other end of first secondary winding 5b; a second output rectifying diode 15 whose anode terminal is connected to one end of second secondary winding 5c of transformer 5; a second output rectifying capacitor 16 connected between a cathode terminal of second output rectifying diode 15 and the other end of second secondary winding 5c; and a stepdown chopper 30 connected to second output rectifying capacitor 16. First output rectifying diode 7 and first output rectifying capacitor 8 constitute a first rectifying smoother 9 to produce a first DC output voltage $V_{O1}$ from first DC output terminals 10 and 11. Second output rectifying diode 15 and second output smoothing capacitor 16 constitute a second rectifying smoother 17 to produce a second DC output voltage $V_{O2}$ through stepdown chopper 30 from second DC output terminals 18 and 19.

Transformer 5 has an auxiliary winding 5f electromagnetically connected to primary winding 5a which has a leakage inductance 5d and an excitation inductance 5e. Leakage inductance 5d is equivalently in series to primary winding 5a to allow leakage inductance 5d to serve as a current resonance reactor, and excitation inductance 5e is equivalently in parallel to primary winding 5a. Auxiliary winding 5f is connected to a drive power terminal $V_{CC}$ of a main control circuit 14 as a primary control circuit through an auxiliary rectifying smoother 22 which comprises an auxiliary rectifying diode 20 and an auxiliary smoothing capacitor 21 to supply DC power from auxiliary winding 5f to drive power terminal $V_{CC}$. A trigger resistor 23 is connected between a positive terminal of DC power source 3 and auxiliary smoothing capacitor 21 to electrically charge auxiliary smoothing capacitor 21 upon start-up of the converter and therefore start main control circuit 14. Connected between trigger resistor 23 and a junction of first and second primary MOS-FETs 1 and 2 is a bootstrap circuit which comprises a rectifying diode 24 and a rectifying capacitor 25 to supply DC power to high side power terminals $V_B$ and $V_S$ in main control terminal 14. Connected to both ends of first output rectifying capacitor 8 of first rectifying smoother 9 are a first output voltage detector 12 for firstly tracking or discerning first DC output voltage $V_{O1}$ from first rectifying smoother 9, secondly comparing detected first DC output voltage $V_{O1}$ with a first regulatory reference voltage, and thirdly producing an error signal $V_{E1}$, the difference between detected first DC output voltage $V_{O1}$ and first reference voltage to a light emitter 13a of a photo-coupler 13. Light emitter 13a produces a light which has the irradiative intensity corresponding to an amount of error signal $V_{E1}$ to forward the light to a light receiver 13b of photo-coupler 13 which transmits error signal $V_{E1}$ to a feedback input terminal FB of main control circuit 14.

As shown in FIG. 36, main control circuit 14 comprises an oscillator 32 for generating pulse signals $V_{PL}$ of the frequency variable in response to voltage level of error signal $V_{E1}$ from first output voltage detector 12 to feedback signal input terminal FB through photo-coupler 13; an inverter 33 for producing an inverted signal $-V_{PL}$ of pulse signal $V_{PL}$ from oscillator 32; a first adder 34 for combining a constant dead time with pulse signal $V_{PL}$ from oscillator 32 to produce a first drive signal $V_{G1}$; a low side buffer amplifier 35 for applying first drive signal $V_{G1}$ with dead time to a gate terminal of first main MOS-FET 1; a second adder 36 for combining a constant dead time with pulse signal $-V_{PL}$ from inverter 33 to produce a second drive signal $V_{G2}$; a level shifter 37 for adjusting voltage level of second drive signal $V_{G2}$ with dead time; and a high side buffer amplifier 38 for applying second drive signal $V_{G2}$ with dead time from level shifter 37 to a gate terminal of second main MOS-FET 2. As pulse signals $V_{PL}$ are produced with the variable frequency but with the constant pulse duration, main control circuit 14 provides each gate of first and second MOS-FETs 1 and 2 with first and second drive signals $V_{G1}$ and $V_{G2}$ while first drive signal $V_{G1}$ has the on-period of fixed time length and the off-period whose time length is varied in response to voltage level of error signal $V_{E1}$ from output voltage detector 12 whereas second drive signal $V_{G2}$ has the off-period of fixed time length and the on-period whose time length is varied in response to voltage level of error signal $V_{E1}$ from output voltage detector 12. Thus, pulse signals from oscillator 32 serve to alternately turn first and second main MOS-FETs 1 and 2 on and off with the frequency varied in response to voltage level of error signal $V_{E1}$ from first output voltage detector 12.

As shown in FIG. 35, stepdown chopper 30 comprises a chopping MOS-FET 26 whose drain terminal is connected to a junction between second output rectifying diode 15 and second output smoothing capacitor 16; a flywheel diode 27 connected between a source terminal of chopping MOS-FET 26 and a secondary negative output terminal 19; a filter reactor 28 connected between a junction of source terminal of chopping MOS-FET 26 and cathode terminal of flywheel diode 27 and a secondary positive output terminal 18; and a filter capacitor 29 between positive and negative output terminals 18 and 19. A chopping controller 31 comprises an inner generator (not shown) for producing a second regulatory reference voltage, and produces PWM (pulse width modulation) signals $V_{S2}$ whose pulse width is modulated relative to an error signal, the difference between a second DC output voltage $V_{O2}$ across filter capacitor 29 and second regulator reference voltage. Step-down chopper circuit 30 functions to control the on-off operation of chopping MOS-FET 26 by means of PWM signals $V_{S2}$ from chopping controller 31 to produce from second DC output terminals 18 and 19 second DC output voltage $V_{O2}$ of constant level lower than DC voltage from second output smoothing capacitor 16 of second rectifying smoother 17.

In operation of prior art current resonance DC-DC converter of multi-output type shown in FIG. 35, a main power switch not shown is turned on to apply power voltage E from DC power source 3 through trigger resistor 23 to auxiliary smoothing capacitor 21 of auxiliary rectifying smoother 22 and thereby charge auxiliary smoothing capacitor 21. When auxiliary smoothing capacitor 21 is charged up to a start-up voltage, main control circuit 14 starts operation so that main control circuit 14 produces first and second drive signals $V_{G1}$ and $V_{G2}$ to each gate terminal of first and second MOS-FETs 1 and 2 to commence the on-off operation of first and second main MOS-FET 1 and 2. During the on period of first main MOS-FET 1, electric current $I_{Q1}$ flows from DC power source 3 through current resonance capacitor 4, leakage inductance 5d and primary winding 5a of transformer 5 and first main MOS-FET 1 to DC power source 3. At the same time, first secondary electric current flows from first secondary winding 5b of transformer 5 through first output rectifying diode 7 to first output smoothing capacitor 8 of first rectifying smoother 9, and under the influence of first secondary electric current, a first load current flows through current resonance capacitor 4, leakage inductance 5d and primary winding 5a of transformer 5 and first main MOS-FET 1. In addition thereto, a second secondary electric current flows from second secondary winding 5c of transformer 5 through second output rectifying diode 15 to second smoothing capacitor 16 of second rectifying smoother 17, and under the influence of second secondary electric current, a second load current flows through current resonance capacitor 4, leakage inductance 5d and primary winding 5a of transformer 5 and first main MOS-FET 1. Moreover, an excitation current flows through current resonance capacitor 4, leakage inductance 5d and excitation inductance 5e of transformer 5 and first main MOS-FET 1. Accordingly, winding current $I_{Q1}$ flowing through first main MOS-FET 1 is a composite current of first and second load currents and excitation current. First and second load currents are sinusoidal wave-formed resonant currents with the resonance frequency determined by capacitance of current resonance capacitor 4 and leakage inductance 5d of transformer 5. Excitation current is a resonant current with the resonance frequency determined by capacitance of current resonance capacitor 4 and a composite inductance of leakage and excitation inductances 5d and 5e of transformer 5, and resonant current is observed as a triangular wave-formed current which has oblique sides composed essentially of a part of sinusoidal wave because the resonance frequency is lower than switching frequency of first main MOS-FET 1.

When first main MOS-FET 1 is turned off, energy accumulated in transformer 5 by excitation current causes voltage pseudo resonance so that voltages $V_{Q1}$ and $V_{Q2}$ between drain and source terminals of first and second main MOS-FETs 1 and 2 become pseudo resonance voltages with the resonance frequency determined by composite inductance of leakage and excitation inductance 5d and 5e of transformer 5 and composite capacitance of current resonance and voltage pseudo resonance capacitors 4 and 6. Specifically, when first main MOS-FET 1 is turned off, electric current $I_{Q1}$ flowing through first main MOS-FET 1 is diverted to voltage pseudo resonance capacitor 6 so that diverted current electrically charges voltage pseudo resonance capacitor 6 to power voltage E of DC power source 3, and thereafter is commutated toward an inner diode not shown in second main MOS-FET 2. In other words, energy stored in transformer 5 by excitation current causes diverted current to run through inner diode in second main MOS-FET 2 to electrically charge current resonance capacitor 4. Accordingly, second main MOS-FET 2 is turned on during this charging period to accomplish a zero volts switching (ZVS) of second main MOS-FET 2.

When energy stored by excitation current in transformer 5 is completely released, energy stored in current resonance capacitor 4 causes a circulation current to flow from current resonance capacitor 4 through second main MOS-FET 2, excitation and leakage inductances 5e and 5d of transformer 5 to current resonance capacitor 4 to discharge the energy. In other words, excitation current flows in the adverse direction to that during the on-period of first main MOS-FET 1. This excitation current is a resonant current with the resonance frequency determined by a composite inductance of leakage and excitation inductances 5d and 5e of transformer 5 and capacitance of current resonance capacitor 4, and excitation current is observed as a generally triangular shaped current whose oblique sides approximate to a part of sine wave because resonance frequency of excitation current is lower than switching frequency of second main MOS-FET 2.

FIGS. 37(A) and (B) show waveforms of voltage between drain and source terminals of first main MOS-FET 1, electric current $I_{Q1}$ flowing through drain and source terminals of first main MOS-FET 1 and voltage $V_{C2}$ applied on current resonance capacitor 4 when input voltage E from DC power source 3 is respectively high and low with the unchanged on-period of first main MOS-FET 1 and the varied on-period of second main MOS-FET 2. In other words, FIGS. 37(A) and (B) demonstrate variation in voltage $V_{C2}$ across current resonance capacitor 4 under on-duty control of first main MOS-FET 1 by changing the on-period of second main MOS-FET 2 relative to fluctuation in input voltage E. This results in change in voltage applied on primary winding 5a of transformer 5 to control first DC output voltage $V_{O1}$. FIGS. 37(C) and (D) represent waveforms of voltages $V_{Q1}$ and $V_{C2}$ and electric current $I_{Q1}$ under the respectively light and heavy load conditions. As shown, FIGS. 37(C) and (D) indicate electric current $I_{Q1}$ flowing through first main MOS-FET 1, and electric current $I_{Q1}$ of FIG. 37(C) has the generally triangular waveform under the light load condition with less amount of resonant current as a load current, whereas electric current $I_{Q1}$ of FIG. 37(D) contains sinusoidal variation as part of the waveform resulted from resonance current corresponding to load current under the heavy load condition. In this case, the period for supplying electric power from primary to secondary side of transformer 5 is determined by resonance frequency given by current resonance capacitor 4 and leakage inductance 5d of transformer 5 so that the on-period of first main MOS-FET 1, namely the period for furnishing electric power from primary to secondary side of transformer 5 is almost unchanged if load fluctuates. FIGS. 37(C) and (D) prove unchanged on-periods of first main MOS-FET 1 with a same time length while voltage $V_{Q1}$ between drain and source terminals of first main MOS-FET 1 is kept on zero volt.

FIG. 38 is a graph indicating variation of first DC output voltage $V_{O1}$ with change of the on-period ratio or duty ratio of first main MOS-FET 1 to second main MOS-FET 2. As understood from FIG. 38, prior art resonant DC-DC converter of multi-output type shown in FIG. 35 can adjust first DC output voltage $V_{O1}$ from first DC output terminals 10, 11 by varying the on-period ratio of first main MOS-FET 1 to second main MOS-FET 2 in a range from 0.3 to 1.0. In other words, change in the on-period ratio between first and second main MOS-FETs 1 and 2 causes adjusting charged voltage $V_{C2}$ in current resonant capacitor 4 to thereby control voltage on primary winding 5a of transformer 5 and also first DC output voltage $V_{O1}$ produced from first DC output terminals 10 and 11 through first secondary winding 5b of transformer 5 and first rectifying smoother 9.

First output voltage detector 12 picks out first DC output voltage $V_{O1}$ between first DC output terminals 10 and 11 to produce from first output voltage detector 12 an error signal $V_{E1}$, the differential between a reference voltage for regulating the first output voltage value and the detected voltage from first output voltage detector 12 so that error signal $V_{E1}$ is transmitted to a feedback input terminal FB of main control circuit 14 through light emitter and receiver 13a and 13b of photo-coupler 13. Main control circuit 14 produces first and second drive signals $V_{G1}$ and $V_{G2}$ whose pulse frequency is modulated depending on voltage level of error signal $V_{E1}$ applied to feedback input terminal FB from first output voltage detector 12, and supplies them to each gate terminal of first and second main MOS-FET 1 and 2 to alternately turn them on and off with the frequency in response to voltage level of error signal $V_{E1}$ from first output voltage detector 12. This serves to control first DC output voltage $V_{O1}$ from first DC output terminals 10 and 11 toward a substantially constant level.

On-off operation of first and second main MOS-FETs 1 and 2 invites on second secondary winding 5c of transformer 5 a voltage which is impressed on second rectifying smoother 17. At this time, according to turn ratio between first and second secondary windings 5b and 5c of transformer 5, produced across second output smoothing capacitor 16 is a DC voltage which is applied to a stepdown chopper 30. A chopper controller 31 in stepdown chopper 30 compares voltage $V_{O2}$ across a filter capacitor 29 with reference voltage for regulating second output voltage value and produces a PWM (Pulse Width Modulation) signal $V_{S2}$, the differential between voltage $V_{O2}$ and reference voltage. Stepdown chopper 30 utilizes PWM signals $V_{S2}$ from chopper controller 31 to control the on-off operation of a chopper MOS-FET 26 and thereby generate from second DC output terminals 18 and 19 a second DC output voltage $V_{O2}$ of a constant level lower than DC voltage applied to second output rectifying capacitor 16.

A typical flyback or forward DC-DC converter of multi-output type can change an on-off duty ratio of main switching elements provided in primary side to control DC outputs generated in secondary side while varying a period of time for supplying electric power from primary to secondary side of transformer 5. This gives rise to a drawback in that the on-off duty ratio determined by DC output voltage from one of secondary windings concomitantly restricts electric power drawn from the other of secondary windings, thus resulting in reduction in output voltage produced in the other of second windings. On the contrary, a current resonant DC-DC converter of multi-output type has an important advantage of less change in the period of time for transmitting electric power from primary to secondary side of transformer 5 even under variation of electric load connected to first DC output terminals 10 and 11 because the period of time for transmission of electric power is determined by a resonance frequency depended on current resonant capacitor 4 and leakage inductance 5d of transformer 5 in primary side. In this way, second secondary winding 5c of transformer 5 can produce a necessary amount of electric power therefrom without inducing declination in output voltage from second rectifying smoother 17 whether electric load is light or heavy. However, it has been found that second rectifying smoother 17 actually produces fluctuating output voltage because transformer 5 does not have an ideal electromagnetic coupling of windings and also second rectifying smoother 17 is subject to fluctuation in input voltage E from DC power source 3 and impact by voltage drop in first rectifying smoother 9. To avoid these defects, DC-DC converter shown in FIG. 35 employs stepdown chopper 30 for steadying DC voltage from second rectifying smoother 17 to develop a stable second DC output voltage $V_{O2}$ from second DC output terminals 18 and 19. Specifically, stepdown chopper 30 provided at a subsequent stage of second rectifying smoother 17 can provide a current resonant DC-DC converter of multi-output type for an ideal cross-regulation which means an output voltage fluctuation for one of electric loads associated with change in the other of electric loads in a prescribed range.

In addition, Patent Document 2 as below discloses a DC-DC converter of multi-output type which comprises a transformer provided with a primary winding and first and second secondary windings for power conversion, a field effect transistor connected to primary winding of transformer for the switching operation, a first voltage detector for detecting stabilized output voltage from first secondary winding of transformer, a first pulse width regulator for comparing detected output from first voltage detector with a reference voltage to control the pulse width of pulse controlled signals to field effect transistor, a switch circuit connected to one end of second secondary winding of transformer, a second voltage detector for detecting rectified and smoothed output voltage from second secondary winding of transformer, a second pulse width regulator for comparing detected output from second voltage detector with a reference voltage to control the pulse width of pulse controlled signals to the switch circuit and a synchronization circuit for synchronizing outputs from second pulse width regulator with outputs from first pulse width regulator. This DC-DC converter controls the on-period of switch circuit in response to output voltage from and connected to second secondary winding of transformer not for feedback to primary side to stabilize the output voltage while reducing power loss under large fluctuation in load of an output system for feedback to primary side.

[Patent Document 1] Japanese Patent Disclosure No. 3-7062 (Page 5, FIG. 1)

[Patent Document 2] Japanese Patent Disclosure No. 2000-217356 (FIG. 2 on page 4 and FIG. 1 on page 5)

DISCLOSURE OF INVENTION

Problem to be Solved by Invention

Prior art DC-DC converter shown in FIG. 35 is, however, disadvantageous in reduction of power conversion efficiency by power loss in stepdown chopper 30 because it reconverts into a second DC output voltage $V_{O2}$ a DC voltage obtained by rectifying and smoothing through second rectifying smoother 17 AC voltage induced on second secondary winding 5c of transformer 5 wherein second DC output voltage $V_{O2}$ is lower than DC voltage from second rectifying smoother 17. Also, use of stepdown chopper 30 is inconvenient in increased number of necessary components and rise in cost for manufacture because it involves chopper MOS-FET 26, flywheel diode 27, filter reactor 28 and filter capacitor 29. In addition, resonant switching power source shown in Patent Document 1 has a defect of being unable to produce a DC output of high accuracy due to increased pulsating components in DC output voltage because regulatory circuit in secondary side carries out the on-off operation of a switching transistor in response to a given output from secondary winding through a rectifying smoother while thinning out an appropriate amount of voltage from pulse array voltages produced from switching transistor to adjust DC output voltage from rectifying smoother.

Therefore, an object of the present invention is to provide an inexpensive current resonant DC-DC converter of multi-output type for producing DC outputs with high accuracy and improved power conversion efficiency. Another object of the present invention is to provide a current resonant DC-DC converter capable of reducing a switching loss in an output-regulatory switching element in secondary side of a transformer for improvement in power conversion efficiency. A still another object of the present invention is to provide a current resonant DC-DC converter of multi-output type capable of absorbing or alleviating current concentration occurred in secondary side.

Means for Solving the Problem

The current resonant DC-DC converter of multi-output type according to the present invention, comprises first and second switching elements (1, 2) connected in series to a DC power source (3), a series circuit which comprises current resonance capacitor (4), an inductance (5d) and a primary winding (5a) of a transformer (5) connected in parallel to first or second switching element (1 or 2), a first rectifying smoother (9) connected to a first secondary winding (5b) of transformer (5), a second rectifying smoother (17) connected to a second secondary winding (5c) of transformer (5), an output-regulatory switching element (40) connected between secondary winding (5c) of transformer (5) and a smoothing capacitor (16) in second rectifying smoother (17), and an output control circuit (41) for controlling the on-off operation of output-regulatory switching element (40) based on voltage ($V_{O2}$) from smoothing capacitor (16) in second rectifying smoother (17) in synchronization with switching frequency of said first or second switching element (1, 2), The on-off operation of first and second switching elements (1, 2) causes a first DC output voltage ($V_{O1}$) to develop from first secondary winding (5b) of transformer (5) through first rectifying smoother (9) and simultaneously a second DC output voltage ($V_{O2}$) to develop from second secondary winding (5c) of transformer (5) through second rectifying smoother (17).

The converter is excellent in the immovable period of time for transmitting electric power from primary to secondary side of transformer (5) even under the fluctuation in a secondary load because the transmission period of time is determined by resonance frequency depending on current resonance capacitor (4) and inductance (5d). Consequently, the converter can provide a necessary DC power from second secondary winding (5c) of transformer (5) through second rectifying smoother (17) despite load fluctuation interfacing with first secondary winding (5b) of transformer (5). Also, the converter can control with high accuracy a level of second DC output voltage ($V_{O2}$) generated from second rectifying smoother (17) since output-regulatory circuit (41) performs the on-off operation of output-regulatory switching element (40) based on the level of voltage ($V_{O2}$) on second smoothing capacitor (16) and in synchronization with a switching frequency of first or second switching element (1 or 2) to control the period of time for allowing electric current to flow from second secondary winding (5c) of transformer (5) to smoothing capacitor (16) in second rectifying smoother (17). Thus, the on-off operation of output-regulatory switching element (40) can make it possible to directly control second DC output voltage ($V_{O2}$) from second rectifying smoother (17) with less loss in electric power conversion. In addition, with no more and very simple alteration to a secondary circuit than only a switching element (40) is added to second rectifying smoother (17), the present invention can accomplish an inexpensive current resonant DC-DC converter of multi-output type that produces highly stabilized second DC output voltage ($V_{O2}$) with improved power conversion efficiency and highly precise DC outputs generated.

The current resonant DC-DC converter of multi-output type according to the present invention further comprises a voltage change detector (42) for detecting rising and falling pulses of voltages emerging on any of secondary windings of transformer (5) to produce respectively first and second detection signals, and a drive control circuit (44) for turning output-regulatory switching element (40) on and off after voltage change detector (42) produced first and second detection signals. Accordingly, output-regulatory switching element (40) can be switched not independently, but substantially in synchronization with switching operation of first or second switching element (1, 2) to attain the zero current switching (ZCS) for reduction in switching loss in output-regulatory switching element (40).

In addition, the current resonant DC-DC converter of multi-output type according to the present invention further comprises a reactor (100) connected in a closed circuit which includes second secondary winding (5c), second rectifying smoother (17) and output-regulatory switching element (40) to absorb or alleviate current concentration or inrush current in specific outputs.

Effect of Invention

According to the present invention, output-regulatory switching element (40) connected to second secondary winding of transformer is turned on and off synchronously with switching frequency of switching elements in primary side of transformer independently of DC output magnitude from any of rectifying smoothers to directly control DC output from second rectifying smoother with high accuracy for the ideal cross regulation among respective DC outputs. Moreover, the invention can absorb or loosen current constriction or inrush current in specific outputs to extend service life of related elements and improve power conversion efficiency.

EXPLANATION OF SYMBOLS

Figure 1:
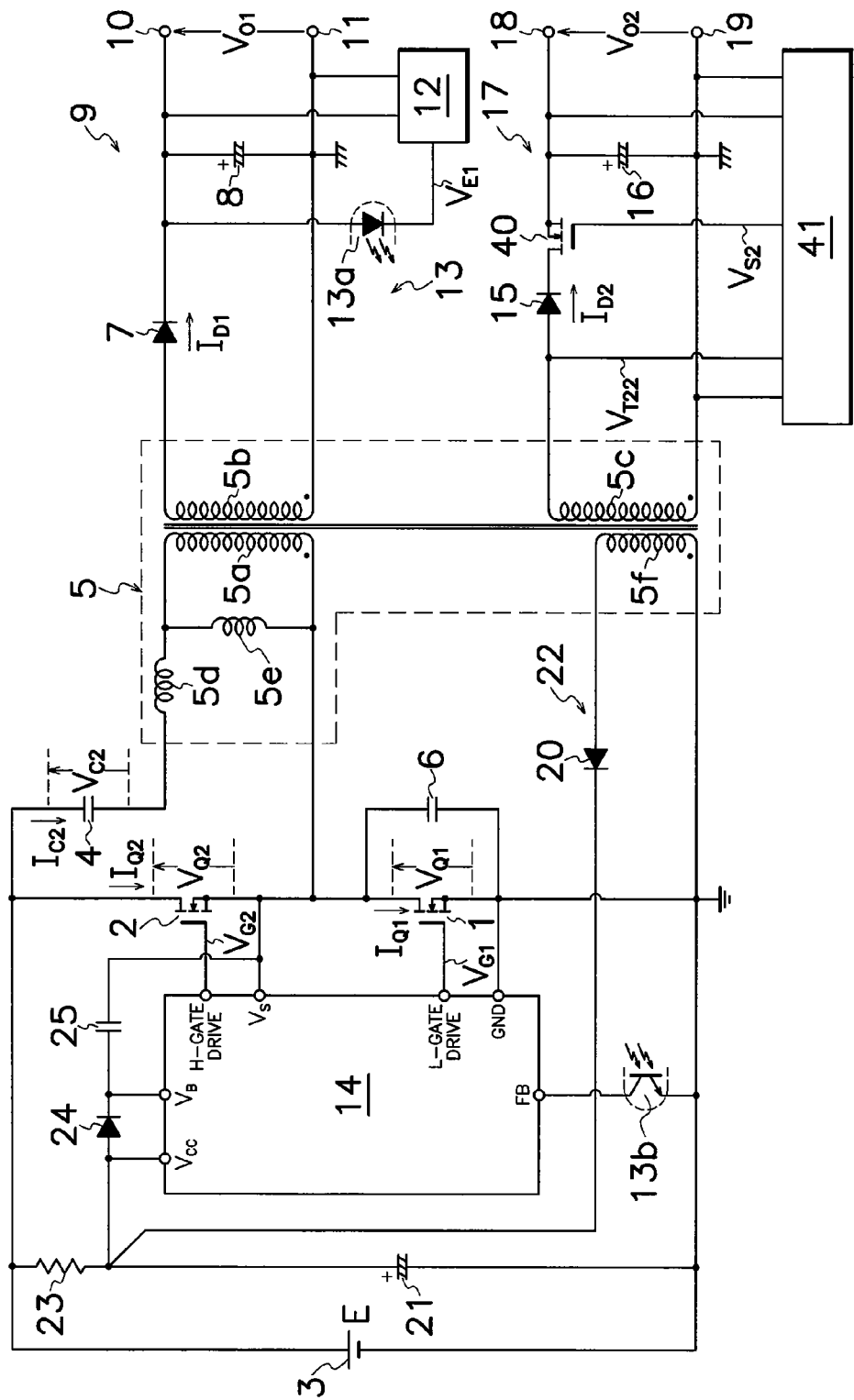
FIG. 1 An electric circuit diagram showing a first embodiment of the current resonant DC-DC converter of multi-output type according to the present invention.

1 . . . a first main MOS-FET (a first switching element), 2 . . . a second main MOS-FET (a second switching element), 3 . . . a DC power source, 4 . . . a current resonance capacitor, 5 . . . a transformer, 5a . . . a primary winding, 5b . . . a first secondary winding, 5c . . . a second secondary winding, 5d . . . a leakage inductance (a current resonance inductance), 5e . . . an excitation inductance, 5f . . . a drive winding, 5g . . . a third secondary winding (an additional secondary winding, 5h, 5i . . . intermediate taps, 6 . . . a voltage pseudo-resonance capacitor, 7, 7a to 7d . . . first output rectifying diodes, 8 . . . a first output rectifying capacitor, 9 . . . a first rectifying smoother, 10, 11 . . . first DC output terminals, 12 . . . a first output voltage detector, 13 . . . a photo-coupler, 13a . . . a light emitter, 13b . . . a light receiver, 14 . . . a main control circuit, 15, 15a, 15b . . . a second output rectifying diodes, 16 . . . a second output rectifying capacitor, 17 . . . a second rectifying smoother, 18, 19 . . . second DC output terminals, 20 . . . an auxiliary rectifying diode, 21 . . . an auxiliary smoothing capacitor, 22 . . . an auxiliary rectifying smoother, 23 . . . a trigger resistor, 24 . . . a rectifying diode, 25 . . . a smoothing capacitor, 26 . . . a chopper MOS-FET, 27 . . . a flywheel diode, 28 . . . a filter reactor, 29 . . . a filter capacitor, 30 . . . a stepdown chopper, 31 . . . a chopper controller, 32 . . . an oscillator, 33 . . . an inverter, 34 . . . a first dead time adder, 35 . . . a low side buffer amplifier, 36 . . . a second dead time adder, 37 . . . a level shifter, 38 . . . a high side buffer amplifier, 40 . . . an output-regulatory MOS-FET (an output-regulatory switching element), 41 . . . an output control circuit, 42 . . . a voltage change detector, 43 . . . a second output voltage detector, 44 . . . a PWM control circuit (a drive control circuit), 45 . . . an RS flip flop (RSF/F), 46 . . . a drive circuit, 47 . . . a third output rectifying diode, 48 . . . a third output rectifying capacitor, 49 . . . a third rectifying smoother (an additional rectifying smoother), 50 . . . an additional output-regulatory MOS-FET (an additional switching element), 51, 52 . . . third DC output terminals, 53 . . . an additional control circuit, 54 . . . a second output-regulatory MOS-FET, 55 . . . a second output control circuit, 56a, 56b . . . voltage detecting diode, 57 . . . a D-flip flop (DF/F), 58a, 58b . . . second voltage detecting diodes, 59, 60 . . . resistors, 61 . . . a Zener diode, 62, 63 . . . dividing resistors, 64 . . . a shunt regulator, 65, 66 . . . resistors, 67 . . . a phase correcting capacitor, 68 . . . a photo-coupler, 68a . . . a light emitter, 68b . . . a light receiver, 69 . . . a rectifying diode, 70 . . . a smoothing capacitor, 71, 72 . . . dividing resistors, 73 . . . a diode, 74 . . . a detective transistor (a detective switching element), 75 . . . a discharging resistor, 76 . . . a comparator, 77 . . . an accumulation capacitor, 78 . . . a charging resistor, 79 . . . a discharging diode, 80 . . . a current limiting resistor, 81 . . . an NPN transistor, 82 . . . a PNP transistor, 83 . . . a bias resistor, 84 . . . an output resistor, 85 . . . a second voltage change detector, 86 . . . a third output voltage detector, 87 . . . a second PWM controller, 88 . . . a second drive circuit, 89 . . . a photo-coupler, 89a . . . a light emitter, 89b . . . a light receiver, 90 . . . a second current resonance capacitor, 91 . . . a second voltage pseudo resonance capacitor, 92 . . . a base resistor, 100 . . . a reactor, 101 . . . a recovery diode, 102 . . . a holding circuit, 103 . . . a rectifying diode, 104 . . . a smoothing capacitor, 105, 106 . . . dividing resistors, 107 . . . a level shift transistor, 108 . . . a charging resistor, 109 . . . a discharging resistor, 110 . . . a holding capacitor, 111 . . . a delayed drive transistor,

BEST MODE FOR CARRYING OUT THE INVENTION

First to seventeenth embodiments of the current resonant DC-DC converter of multi-output type according to the present invention are described hereinafter in reference to FIGS. 1 to 34. Same reference numerals as those used in FIG. 35 are applied in FIGS. 1 to 34 to denote same or similar components therein as those in FIG. 35, and explanation thereon is omitted herein.

Figure 35:
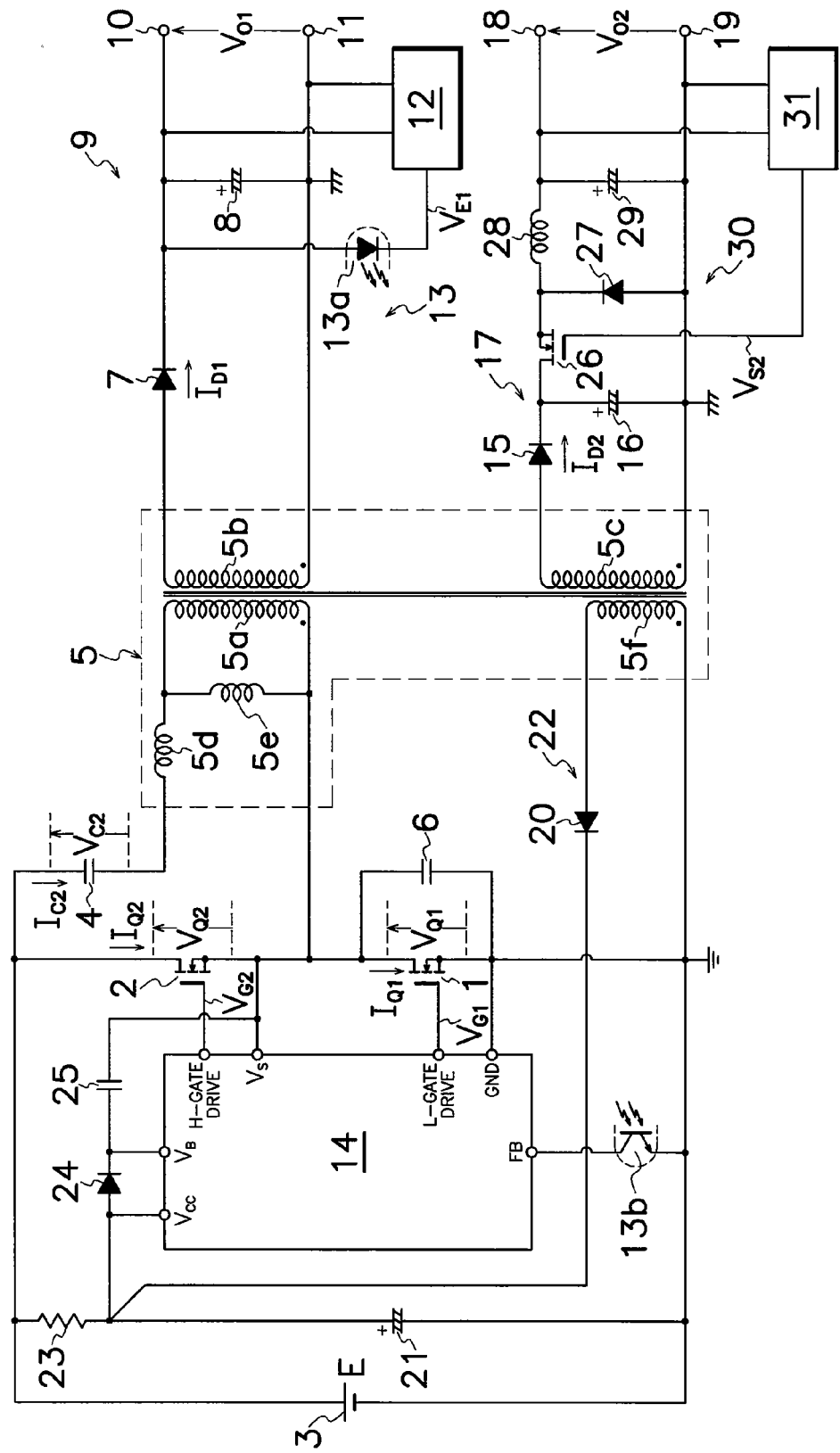
FIG. 35 An electric circuit diagram showing a prior art current resonant DC-DC converter of multi-output type.
Figure 36:
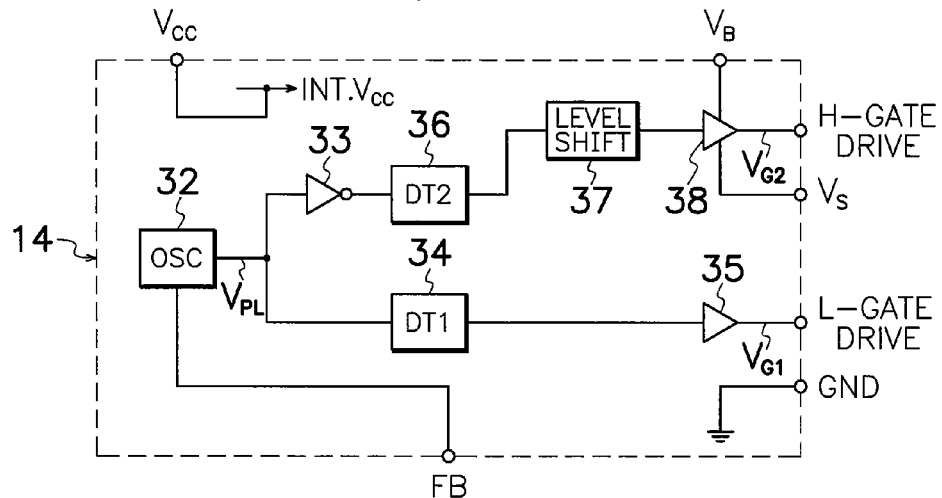
FIG. 36 A block circuit diagram indicating an inner configuration of a main control circuit shown in FIG. 35.
Figure 37:
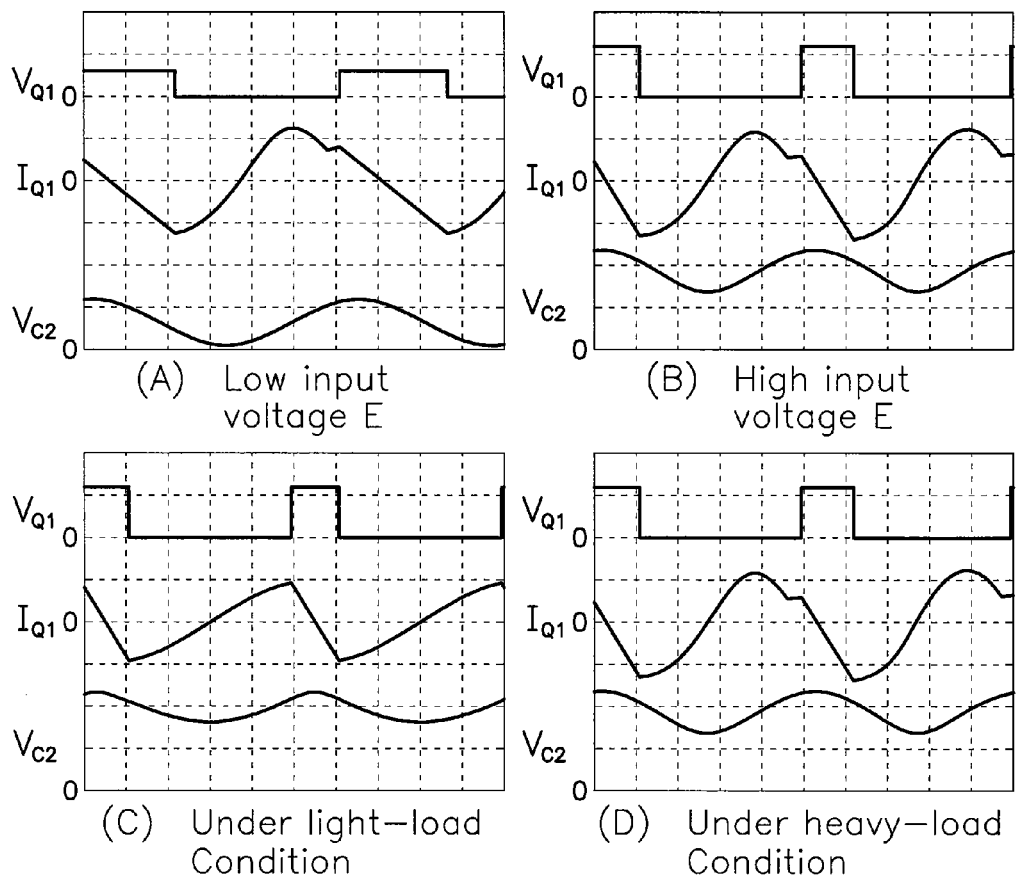
FIG. 37 A wave form chart showing voltages and electric currents at selected locations with fluctuations in input voltage and load in the circuit shown in FIG. 35.
Figure 38:
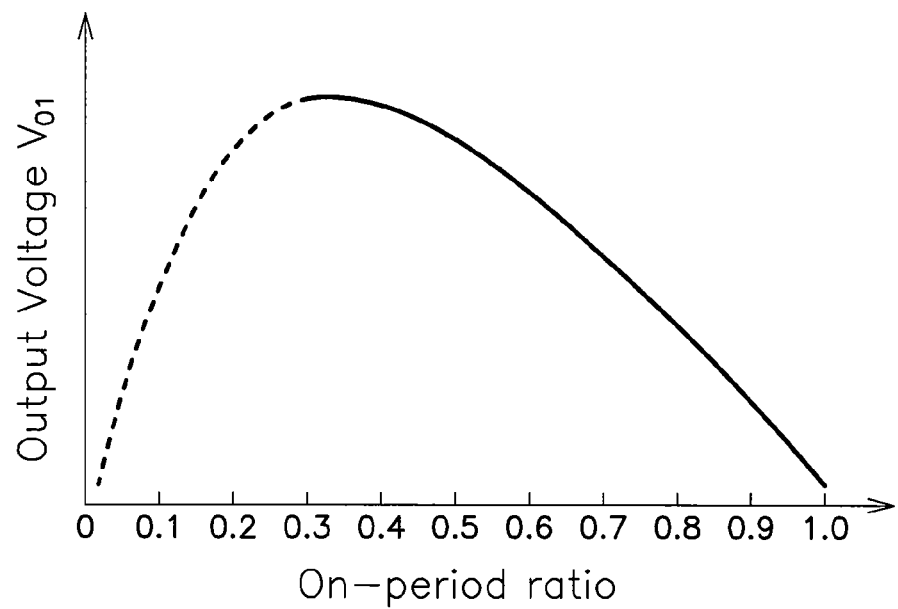
FIG. 38 A graph showing a relationship between the first DC output voltage and the on-period ratio of main MOS-FETs shown in FIG. 35.

FIG. 1 illustrates an electric circuit diagram of a first embodiment according to the present invention's current resonant DC-DC converter of multi-output type which comprises an output-regulatory MOS-FET 40 as an output-regulatory switching element connected between a cathode terminal of second output rectifying diode 15 in second rectifying smoother 17 and second output smoothing capacitor 16, and an output control circuit 41 connected to second DC output terminals 18 and 19 and a gate terminal of output-regulatory MOS-FET 40 for controlling the on-off operation of MOS-FET 40 based on voltage $V_{O2}$ in second output rectifying capacitor 16, while omitting stepdown chopper 30 and chopper controller 31 shown in FIG. 35. In operation, output-regulatory MOS-FET 40 is turned on and off with the same switching frequency of first main MOS-FET 1 and in synchronization with the on-period of first main MOS-FET 1. Simultaneously, main control circuit 14 produces drive signals $V_{G1}$ and $V_{G2}$ to first and second main MOS-FETs 1 and 2 to accomplish the fixed on-period of first main MOS-FET 1 and concurrently vary the on-period of second main MOS-FET based on output voltage $V_{O1}$ from first rectifying smoother 9 for adjustment of on-duty for first main MOS-FET 1.

Figure 2:
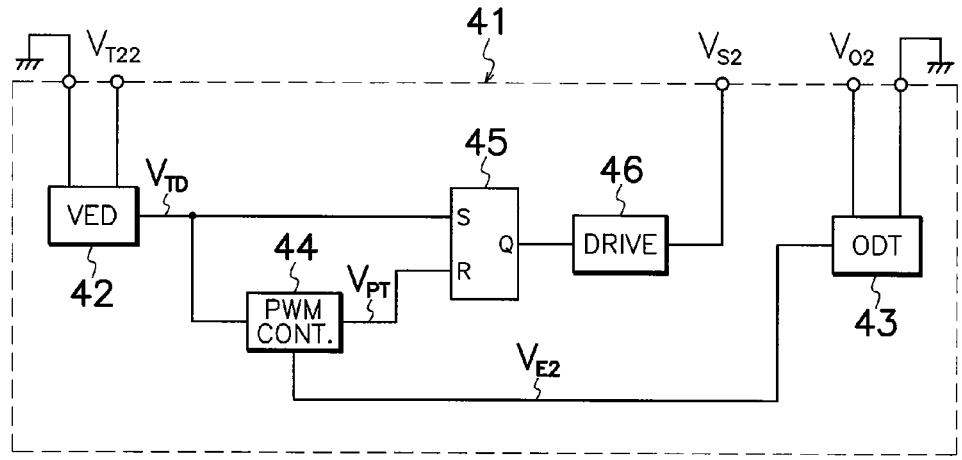
FIG. 2 A block diagram indicating an inner configuration of an output control circuit shown in FIG. 1.

As shown in FIG. 2, output control circuit 41 comprises a voltage change detector 42 for detecting voltage $V_{T22}$ on second secondary winding 5c of transformer 5 during on-period of first main MOS-FET 1, a second output voltage detector 43 for detecting voltage $V_{O2}$ on second output smoothing capacitor 16 to produce an error signal $V_{E2}$, the differential between the detected voltage $V_{O2}$ and a reference voltage for prescribing a second output voltage value, a PWM controller 44 activated by detected signals $V_{TD}$ from voltage change detector 42 to produce pulse array signals $V_{PT}$ of duty-ratio controlled based on error signals $V_{E2}$ from second output voltage detector 43, an RS flip flop (RSF/F) 45 which is set by detected signals $V_{TD}$ from voltage change detector 42 and reset by pulse array signal $V_{PT}$ from PWM controller 44, and a drive circuit 46 for receiving output signals from RSF/F 45 to provide a gate terminal of output-regulatory MOS-FET 40 with operation signals $V_{S2}$. Other configurations in the circuit shown in FIGS. 1 and 2 are similar to those in the DC-DC converter shown in FIG. 35.

In operation, when first main MOS-FET 1 is turned on, voltage is induced on primary winding 5a of transformer 5, and at the same time, voltage $V_{T22}$ is induced on second secondary winding 5c. Voltage $V_{T22}$ induced on second secondary winding 5c is applied on second rectifying smoother 17 and also voltage change detector 42 in output control circuit 41. At this time, voltage change detector 42 produces a detection signal $V_{TD}$ of high voltage level to set terminal S of RSF/F 45 and PWM controller 44 to set RSF/F 45 and start driving of PWM controller 44. Then, RSF/F 45 generates an output from output terminal Q to drive circuit 46 to cause drive circuit 46 to produce an operation signal $V_{S2}$ to gate terminal of output-regulatory MOS-FET 40 which therefore is turned on. Accordingly, electric current flows from second secondary winding 5c of transformer 5 through second output rectifying diode 15 in second rectifying smoother 17 to second output smoothing capacitor 16 to raise voltage $V_{O2}$ in second output smoothing capacitor 16.

When output-regulatory MOS-FET 40 is turned on, voltage $V_{T22}$ on second secondary winding 5c of transformer 5 is clamped at voltage $V_{O2}$ on second output smoothing capacitor 16, and therefore, applied on leakage inductance 5d is a voltage which is the difference between a first voltage applied on leakage inductance 5d and excitation inductance 5e of transformer 5 and a second voltage corresponding to turn ratio of primary winding 5a and second secondary winding 5c. In other words, the voltage applied on leakage inductance 5d is the value resulted by deducting the second voltage from the first voltage. Transformer 5 shown in FIG. 1 has leakage inductance 5d which can absorb noise arising from switching operation or any other cause. Then, when output-regulatory MOS-FET 40 is turned off, voltage clamp is released from second secondary winding 5c of transformer 5, applied on first secondary winding 5b of transformer 5 is an ordinary voltage clamped at voltage $V_{O1}$ on first output smoothing capacitor 8.

Figure 3:
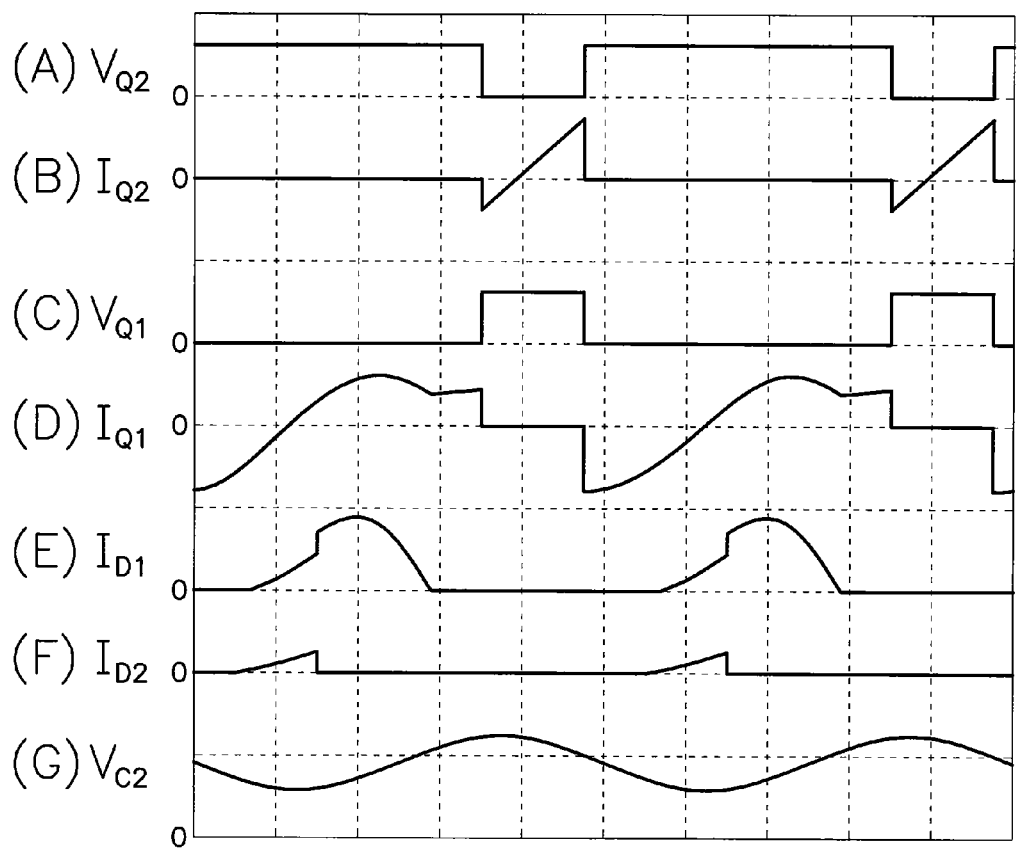
FIG. 3 A wave form chart indicating voltages and electric currents at selected locations in the circuit shown in FIG. 1.

Accordingly, in the DC-DC converter shown in FIG. 1, electric current $I_{D2}$ flows through second output rectifying diode 15 during the on-period of first main MOS-FET 1, and electric current $I_{D1}$ flows through first output rectifying diode 7 after output-regulatory MOS-FET 40 is turned off. When there is a slight difference between first and second DC output voltages $V_{O1}$ and $V_{O2}$, ripple voltages by first and second output smoothing capacitors 8 and 16 may cause electric currents $I_{D1}$ and $I_{D2}$ to coincidentally flow respectively through first and second output rectifying diodes 7 and 15. FIGS. 3 (A) to (G) represent wave forms at this time of drain-source voltage $V_{Q2}$ of second main MOS-FET 2, drain-source current $I_{Q2}$, drain-source voltage $V_{Q1}$ of first main MOS-FET 1, drain-source current $I_{Q1}$, electric current $I_{D1}$ through first output rectifying diode 7, electric current $I_{D2}$ through second output rectifying diode 15 and voltage $V_{C2}$ across current resonance capacitor 4.

On the other hand, second output voltage detector 43 in output control circuit 41 detects voltage $V_{O2}$ on second output smoothing capacitor 16 and compares detected voltage $V_{O2}$ with reference voltage for prescribing second output voltage value to produce an error signal $V_{E2}$ to PWM controller 44 which is activated by detection signal $V_{TD}$ of high voltage level from voltage change detector 42. PWM controller 44 controls the duty ratio of pulse array signals $V_{PT}$ depending on voltage level of error signal $V_{E2}$ from second output voltage detector 43, specifically, when voltage $V_{O2}$ on second output smoothing capacitor 16 is higher and lower than reference voltage, PWM controller 44 produces pulse array signals $V_{PT}$ of respectively smaller and greater duty ratio. Pulse array signal $V_{PT}$ from PWM controller 44 is sent to reset terminal R of RSF/F 45 which therefore is reset. In this way, when second DC output voltage $V_{O2}$ from second rectifying smoother 17 is higher than a predetermined value, that is, reference voltage, pulse array signal $V_{PT}$ of smaller duty ratio is forwarded from PWM controller 44 to reset terminal R of RSF/F 45 which then produces operation signal $V_{S2}$ of narrower pulse width from output terminal Q through drive circuit 46 to gate terminal of output-regulatory MOS-FET 40. This reduces the on-period of output-regulatory MOS-FET 40 to shorten the period of sending electric current through second output smoothing capacitor 16, lowering voltage $V_{O2}$ on second output smoothing capacitor 16. Adversely, when second DC output voltage $V_{O2}$ from second rectifying smoother 17 is lower than the predetermined value, PWM controller 44 creates pulse array signal of greater duty ratio to reset terminal R of RSF/F 45 which then generates operation signal $V_{S2}$ of wider pulse width from output terminal Q through drive circuit 46 to gate terminal of output-regulatory MOS-FET 40. This extends the on-period of output-regulatory MOS-FET 40 to widen the period of sending electric current through second output smoothing capacitor 16 in second rectifying smoother 17, thereby causing voltage $V_{O2}$ on second output smoothing capacitor 16 to rise. In this way, the on-period of output-regulatory MOS-FET 40 can be controlled based on the level of output voltage $V_{O2}$ from second rectifying smoother 17 and synchronously with on-period of first main MOS-FET 1 to draw approximately consistent second DC output voltage $V_{O2}$ from second DC output terminals 18 and 19. Description is omitted with respect to a basic operation of the DC-DC converter shown in FIG. 1 as it is substantially similar to that of prior art DC-DC converter shown in FIG. 35.

The period for supplying electric power from primary to secondary side of transformer 5 is determined by resonant frequency given by current resonance capacitor 4 and leakage inductance 5d of transformer 5, and the period barely changes under the fluctuation of load connected to first DC output terminals 10 and 11. Accordingly, despite the variation in load connected to first DC output terminals 10 and 11, necessary DC power can be taken from second DC output terminals 18 and 19. Also, as output-regulatory MOS-FET 40 is turned on and off synchronously with the on-period of first main MOS-FET to control the period for passing electric current through second output smoothing capacitor 16, output control circuit 41 can operate to turn output-regulatory MOS-FET 40 on and off depending on the level of voltage $V_{O2}$ on second smoothing capacitor 16 to control second DC output $V_{O2}$ from second rectifying smoother 17 with high accuracy. Thus, the on-off operation of output-regulatory MOS-FET 40 causes the direct control of second DC output voltage $V_{O2}$ from second rectifying smoother 17 with less power conversion loss. Also, with no more and very simple alteration to a secondary circuit than only a switching element 40 is added to second rectifying smoother 17, the converter can produce highly steady second DC output voltage $V_{O2}$ to provide an inexpensive current resonant DC-DC converter of multi-output type with improved power conversion efficiency and highly precise DC outputs generated.

The DC-DC converter shown in FIG. 1 can be modified in various ways. For example, the current resonant DC-DC converter of multi-output type according to a second embodiment of the present invention comprises a third secondary winding 5g as an additional secondary winding provided in transformer 5 shown in FIG. 4, a third rectifying smoother 49 as an additional rectifying smoother which comprises a third output rectifying diode 47 and a third output smoothing capacitor 48 connected to third secondary winding 5g, an additional output-regulatory MOS-FET 50 as an additional switching element connected between a cathode terminal of third output rectifying diode 47 and third output smoothing capacitor 48, and an additional control circuit 53 for controlling the on-off operation of additional output-regulatory MOS-FET 50 based on the level of voltage $V_{O3}$ on third output smoothing capacitor 48 connected between third DC output terminals 51 and 52 and additional output-regulatory MOS-FET 50. Third secondary winding 5g of transformer 5 is connected to first and second secondary winding 5b and 5c with the anti-polarity, and additional output-regulatory MOS-FET 50 is turned on and off in synchronization with the on-period of second main MOS-FET 2. Other configurations and operations are similar to those in the DC-DC converter shown in FIG. 1.

Figure 4:
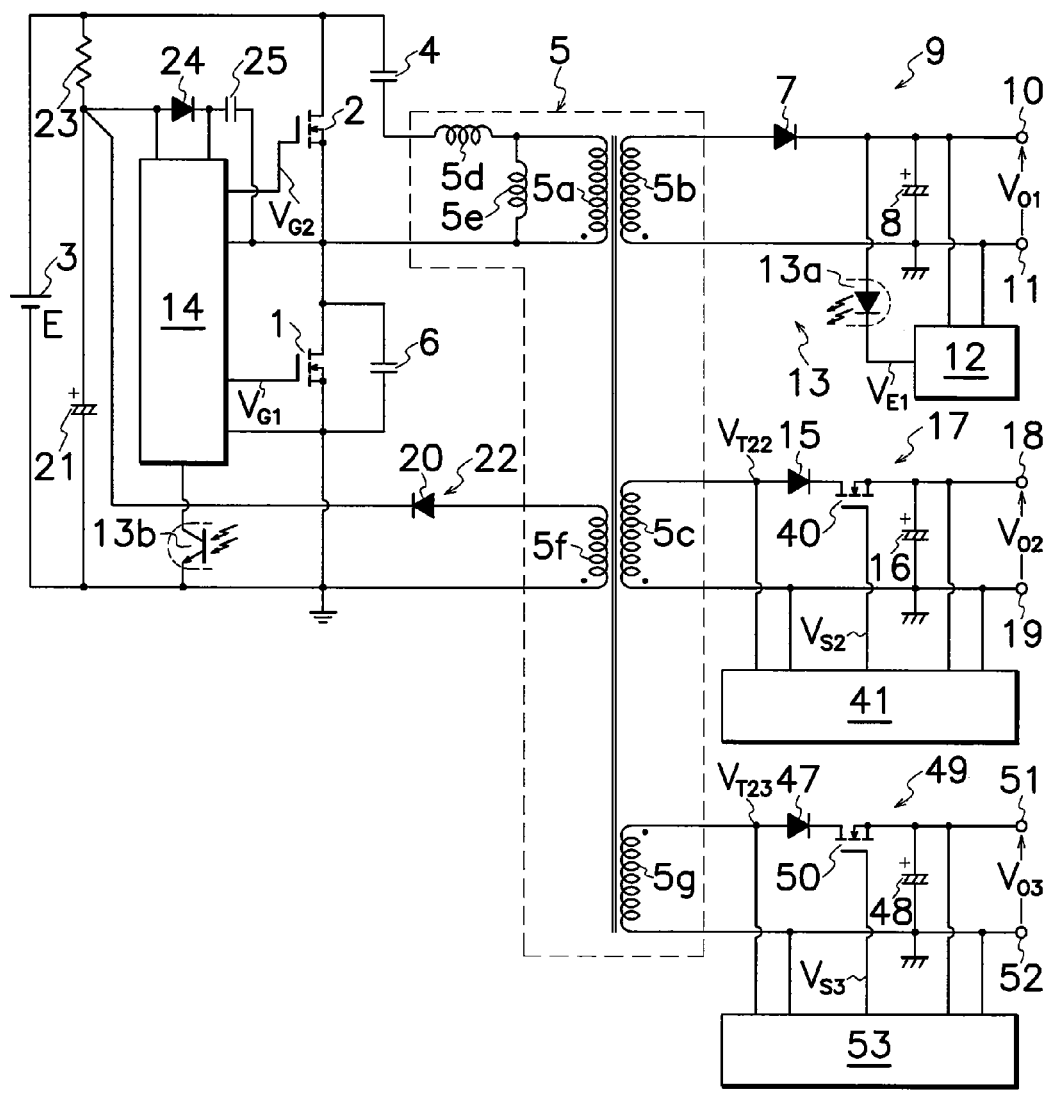
FIG. 4 An electric circuit diagram showing a second embodiment of the present invention.

Like the first embodiment shown in FIG. 1, the second embodiment of the instant invention shown in FIG. 4 has the almost unchanged period for supplying electric power from primary to secondary side of transformer 5 even under fluctuation of load, and therefore, stabilized second and third DC output voltages $V_{O2}$ and $V_{O3}$ can independently be provided from second and third DC output terminals 18, 19 and 51, 52 without impact by fluctuation of load connected to first DC output terminals 10 and 11. Under the circumstances, for example, if (1) one or more of first to third secondary windings 5b, 5c and 5g of transformer 5 is connected with the adverse or changed polarity, (2) one or more of first to third output rectifying diodes 7, 15 and 47 is connected with the adverse or changed polarity in first to third rectifying smoothers 9, 17 and 49 to make a reverse or changed current flow in the secondary circuit or circuits through the anti-polarized diode or diodes or (3) different control criterion or criteria is adopted for output control circuit 41 or additional control circuit 53, the invention can provide a current resonant DC-DC converter of multi-output type which produces three DC output voltages $V_{O1}$, $V_{O2}$ and $V_{O3}$ of different polarities or different voltage values from each other. Also, in case third secondary winding 5g of transformer 5 has the reverse polarity to those of first and second secondary windings 5b and 5c, third secondary winding 5g can produce stable third DC output voltage $V_{O3}$ corresponding to turn ratio between primary winding 5a to third secondary winding 5g of voltage applied on leakage and excitation inductances 5d and 5e of transformer 5 during the on-period of second main MOS-FET 2.

Figure 5:
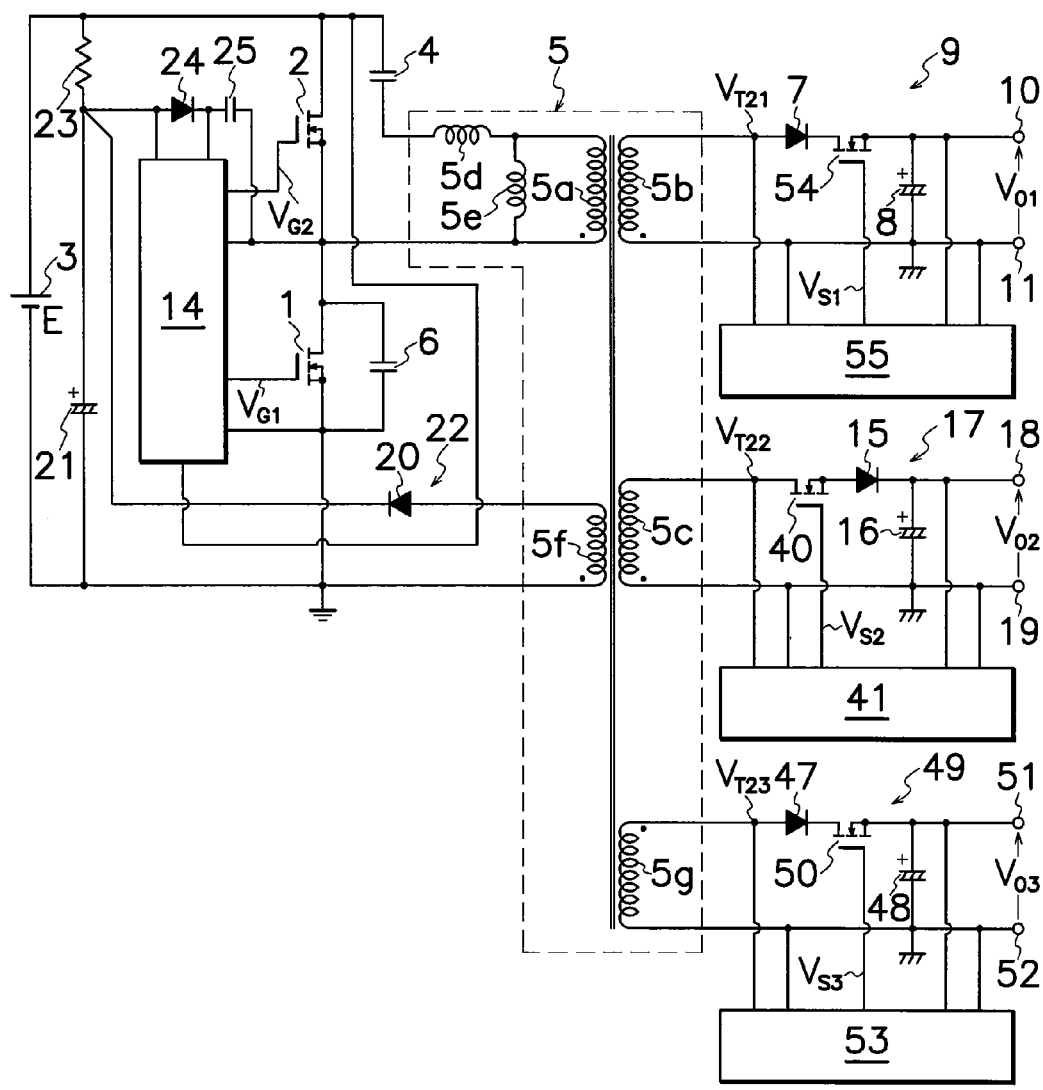
FIG. 5 An electric circuit diagram showing a third embodiment of the present invention.

FIG. 5 illustrates an electric circuit diagram of the current resonant DC-DC converter of multi-output type according to a third embodiment of the invention. The third embodiment is characterized in that first and second main MOS-FETs 1 and 2 are turned on and off based on fluctuation of input voltage E from DC power source 3. The third embodiment comprises a second output-regulatory MOS-FET 54 connected between cathode terminal of first output rectifying diode 7 and first output smoothing capacitor 8, and a second output control circuit 55 connected between first DC output terminals 10 and 11 and gate terminal of second output-regulatory MOS-FET 54 for controlling the on-off operation of second output-regulatory MOS-FET 54 based on the level of voltage $V_{O1}$ on first output smoothing capacitor 8 with deletion of first output voltage detector 12 and photo-coupler 13 shown in FIG. 4. In addition, connection of output-regulatory MOS-FET 40 is moved to a location between second secondary winding 5c of transformer 5 and anode terminal of second output rectifying diode 15. Main control circuit 14 shown in FIG. 5 is operated to control on-duty of first main MOS-FET 1 by varying the on-period of second main MOS-FET 2 based on fluctuation of input voltage E from DC power source 3 with the fixed on-period of first main MOS-FET 1. Other configurations in FIG. 5 are similar to those in the DC-DC converter shown in FIG. 4. Also, operation in FIG. 5 is similar to those in the DC-DC converter shown in FIG. 1 except the on-off operation of second output-regulatory MOS-FET 54 based on the level of voltage $V_{O1}$ on first output smoothing capacitor 8 to control first DC output voltage $V_{O1}$ between first DC output terminals 10 and 11 for a constant level.

As the period for supplying electric power from primary to secondary side of transformer 5 is not almost changed under fluctuation of load in FIG. 5, voltage on primary winding 5a of transformer 5 can be maintained at a constant level by main control circuit 14 that controls the on-off operation of first and second main MOS-FETs 1 and 2 based on variation in input voltage E from DC power source 3. Consequently, if output-regulatory MOS-FETs 54, 40 and 50 are provided in first to third rectifying smoothers 9, 17 and 49 in secondary side to individually control the on-off operation of each output-regulatory MOS-FETs 54, 40 and 50 based on the level of output voltages $V_{O1}$, $V_{O2}$ and $V_{O3}$ from first to third rectifying smoothers 9, 17 and 49, first to third DC output voltages $V_{O1}$, $V_{O2}$ and $V_{O3}$ of different levels each other can be generated from first to third DC output terminals 10, 11, 18, 19 and 51, 52. In this case, DC output circuits of secondary side can be formed of same components or in a same configuration to reduce the number of required elements, lower cost for manufacture and improve compatibility in manufacture and maintenance.

Figure 6:
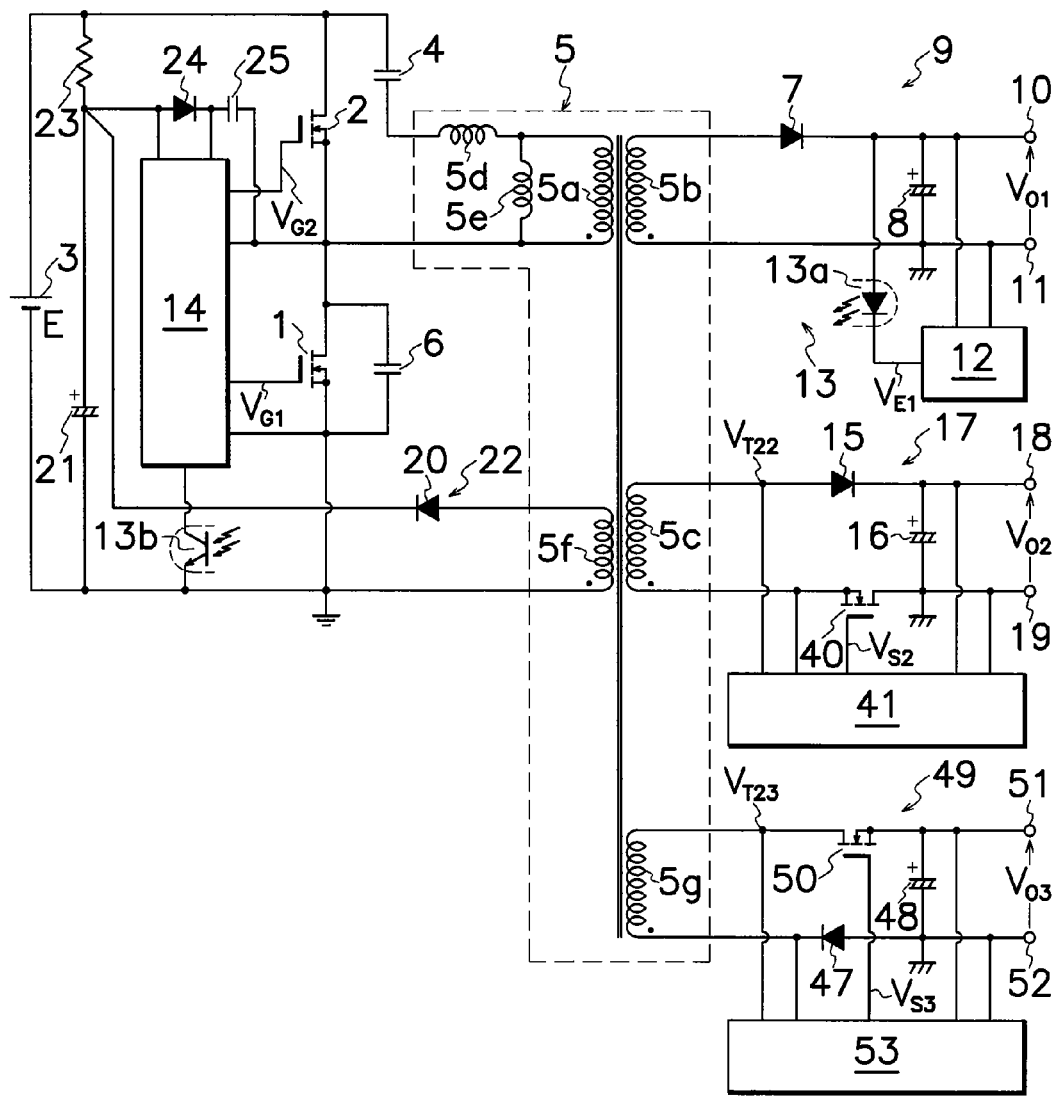
FIG. 6 An electric circuit diagram showing a fourth embodiment of the present invention.

A fourth embodiment of the current resonant DC-DC converter of multi-output type shown in FIG. 6 according to the invention, comprises output-regulatory MOS-FET 40 moved from a positive line shown in FIG. 4 to a ground line between second secondary winding 5c of transformer 5 and second output smoothing capacitor 16, third secondary winding 5g of transformer 5 provided in the adverse polarity to FIG. 4, and third output rectifying diode 47 moved from positive line of FIG. 4 to ground line between third secondary winding 5g of transformer 5 and third output smoothing capacitor 48. Other configurations are similar to those in the DC-DC converter shown in FIG. 4, and operation of the converter shown in FIG. 6 is substantially similar to that in the converter shown in FIG. 1.

The converter shown in FIG. 6 can attain the almost unchanged period of supplying electric energy from primary to secondary side of transformer 5 although load fluctuates, while obtaining similar functions and effects to those in FIG. 4 with change in the polarity of third secondary winding 5g of transformer 5 or movement of connected locations of third output rectifying diode 47 and output-regulatory MOS-FET 40.

In place of each rectifying smoother 9, 17 and 49 of half-wave rectification which comprises output rectifying diode 7, 15 and 47 and output smoothing capacitor 8, 16 and 48 in first to third embodiments, rectifying smoother of two-wave or full-wave rectification can be used. For example, a fifth embodiment of the invention shown in FIG. 7 comprises intermediate taps 5h and 5i of respectively first and second secondary windings 5b and 5c of transformer 5 shown in FIG. 1, a pair of output rectifying diodes 7a, 7b and 15a, 15b at opposite ends of first and second secondary windings 5b and 5c, output smoothing capacitors 8 and 16 connected between a junction of paired output rectifying diodes 7a, 7b and 15a, 15b and intermediate taps in first and second secondary windings 5b and 5c to convert rectifying smoothers 9 and 17 of FIG. 4 into a double wave rectification type, and a pair of voltage detecting diodes 56a and 56b connected between output control circuit 41 and anode terminals of second output rectifying diodes 15a and 15b in second rectifying smoother 17 for detecting voltage $V_{T22}$ on second secondary winding 5c of transformer 5. Main control circuit 14 shown in FIG. 7 comprises a D-flip flop (DF/F) 57 shown in FIG. 8, whose input terminal D is connected to output terminal of an oscillator 32. An inverted and non-inverted output terminals –Q and Q of DF/F 57 are connected respectively to second and first dead time adders 36 and 34. In this arrangement, DF/F 57 alternately switches inverted and non-inverted output terminals –Q and Q to produce output signals of different levels each time DF/F 57 receives from oscillator 32 a pulse signal of the frequency varied depending on voltage level of error signal $V_{E1}$ from first output voltage detector 12 to alternately turn first and second main MOS-FETs 1 and 2 with the 50% duty ratio. Other configurations are similar to those in the DC-DC converter shown in FIG. 1.

Figure 7:
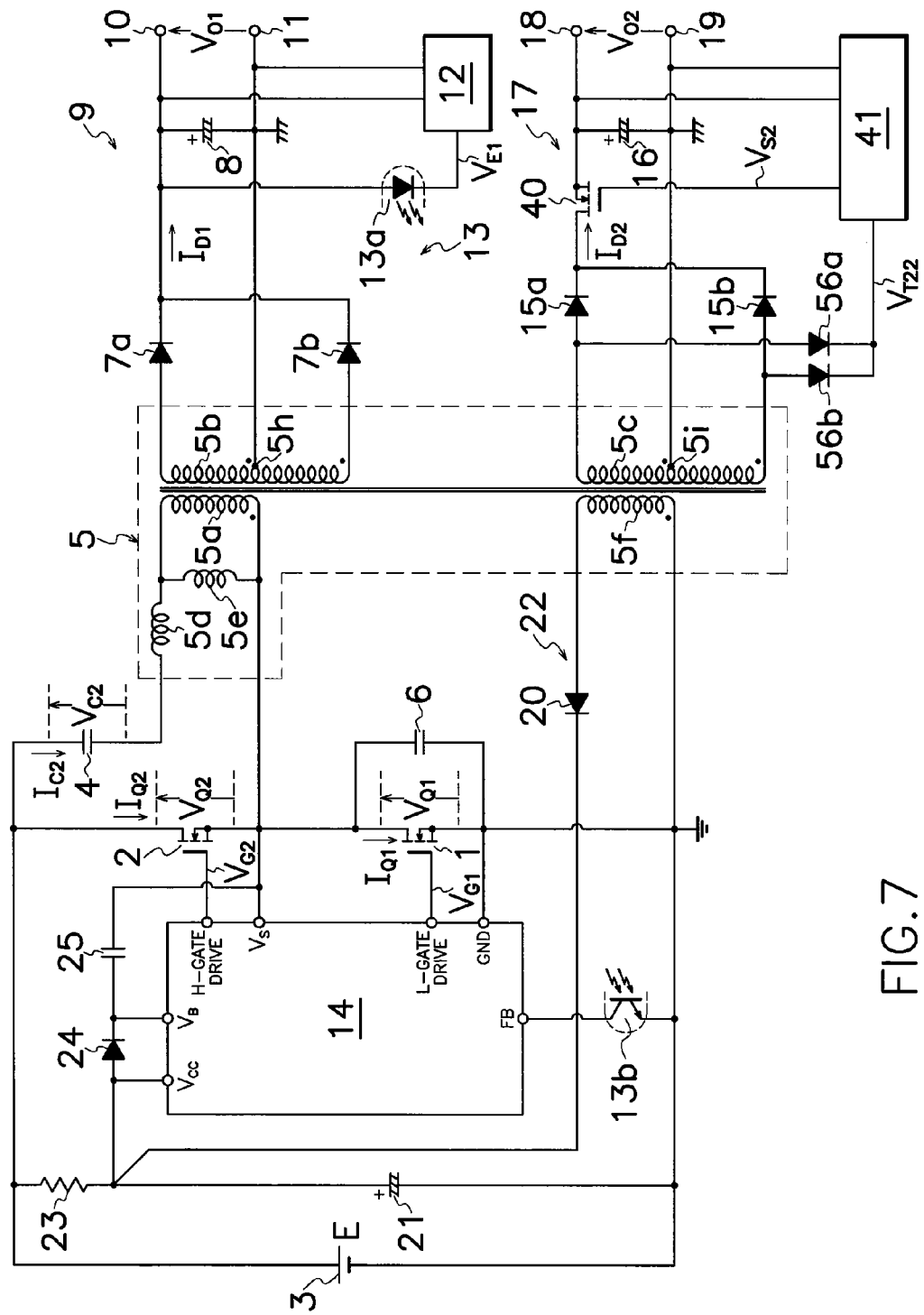
FIG. 7 An electric circuit diagram showing a fifth embodiment of the present invention.
Figure 8:
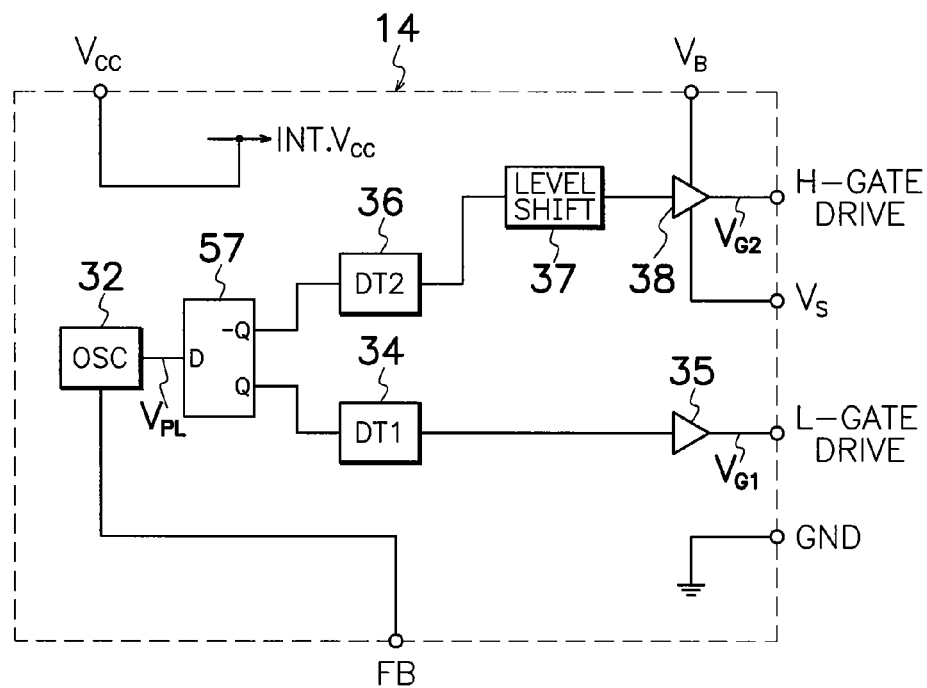
FIG. 8 A block diagram indicating an inner configuration of a main control circuit shown in FIG. 7.

When a power switch not shown in FIG. 7 is turned on, voltage E is applied from DC power source 3 through a trigger resistor 23 on an auxiliary smoothing capacitor 21 in an auxiliary rectifying smoother 22 to electrically charge auxiliary smoothing capacitor 21 with electric current therethrough. When charged voltage on auxiliary smoothing capacitor 21 comes up to an activation level, main control circuit 14 starts operation to supply first and second drive signals $V_{G1}$ and $V_{G2}$ to gate terminals of first and second main MOS-FETs 1 and 2 which therefore begin the on-off operation. During the on-period of first main MOS-FET 1, electric current flows from DC power source 1 through current resonance capacitor 4, leakage inductance 5d and primary winding 5a of transformer 5 and first main MOS-FET 1 to DC power source 3.

At this time, by virtue of or due to a first secondary current flowing through first secondary winding 5b of transformer 5, one of first output rectifying diode 7a and first output smoothing capacitor 8, a first load current flows through current resonance capacitor 4, leakage inductance 5d and primary winding 5a of transformer 5 and first main MOS-FET 1. Also, by virtue of or due to a second secondary current flowing through second secondary winding 5c of transformer 5, one of second output rectifying diode 15a and second output smoothing capacitor 16, a second load current flows through current resonance capacitor 4, leakage inductance 5d and primary winding 5a of transformer 5 and first main MOS-FET 1. Moreover, an excitation current flows through current resonance capacitor 4, leakage and excitation inductances 5d and 5e of transformer 5 and first main MOS-FET 1. Electric current $I_{Q1}$ flowing through first main MOS-FET 1 is a composite current of first and second load currents and excitation current. Each of first and second load currents is a sinusoidal resonance current of resonance frequency determined by capacitance in current resonance capacitor 4 and leakage inductance 5d of transformer 5. Excitation current is a resonance current of resonance frequency determined by a composite inductance of leakage and excitation inductances 5d and 5e of transformer 5 and capacitance in current resonance capacitor 4, however, excitation current can be observed as a triangular current whose hypotenuse is formed by a part of a sine wave because resonance frequency is lower than that of the on-period of first main MOS-FET 1.

Then, when first main MOS-FET 1 is turned off, electric energy accumulated in transformer 5 by the above excitation current produces voltage pseudo resonance similarly as in the circuit shown in FIG. 35. Accordingly, when turned on during this period, second main MOS-FET 2 can be switched as zero voltage switching (ZVS).

When release of energy stored in transformer 5 by excitation current is finished, energy accumulated in current resonance capacitor 4 causes electric current to flow through current resonance capacitor 4, second main MOS-FET 2, primary winding 5a, leakage inductance 5d and current resonance capacitor 4. Accordingly, first load current flows through first secondary winding 5b of transformer 5, the other first output rectifying diode 7b and first output smoothing capacitor 8; second load current flows through second secondary winding 5c of transformer 5, the other second output rectifying diode 15b, and second output smoothing capacitor 16; and excitation current flows through current resonance capacitor 4, second main MOS-FET 2, excitation and leakage inductances 5e and 5d of transformer 5 and current resonance capacitor 4 while excitation current cycles through transformer 5 in the adverse direction to that during the on-period of first main MOS-FET 1 to discharge energy stored in current resonance capacitor 4. In this case, excitation current can be observed as a triangular current whose hypotenuse is formed by a part of a sine wave because resonance frequency is lower than that of the on-period of second main MOS-FET 2.

Figure 9:
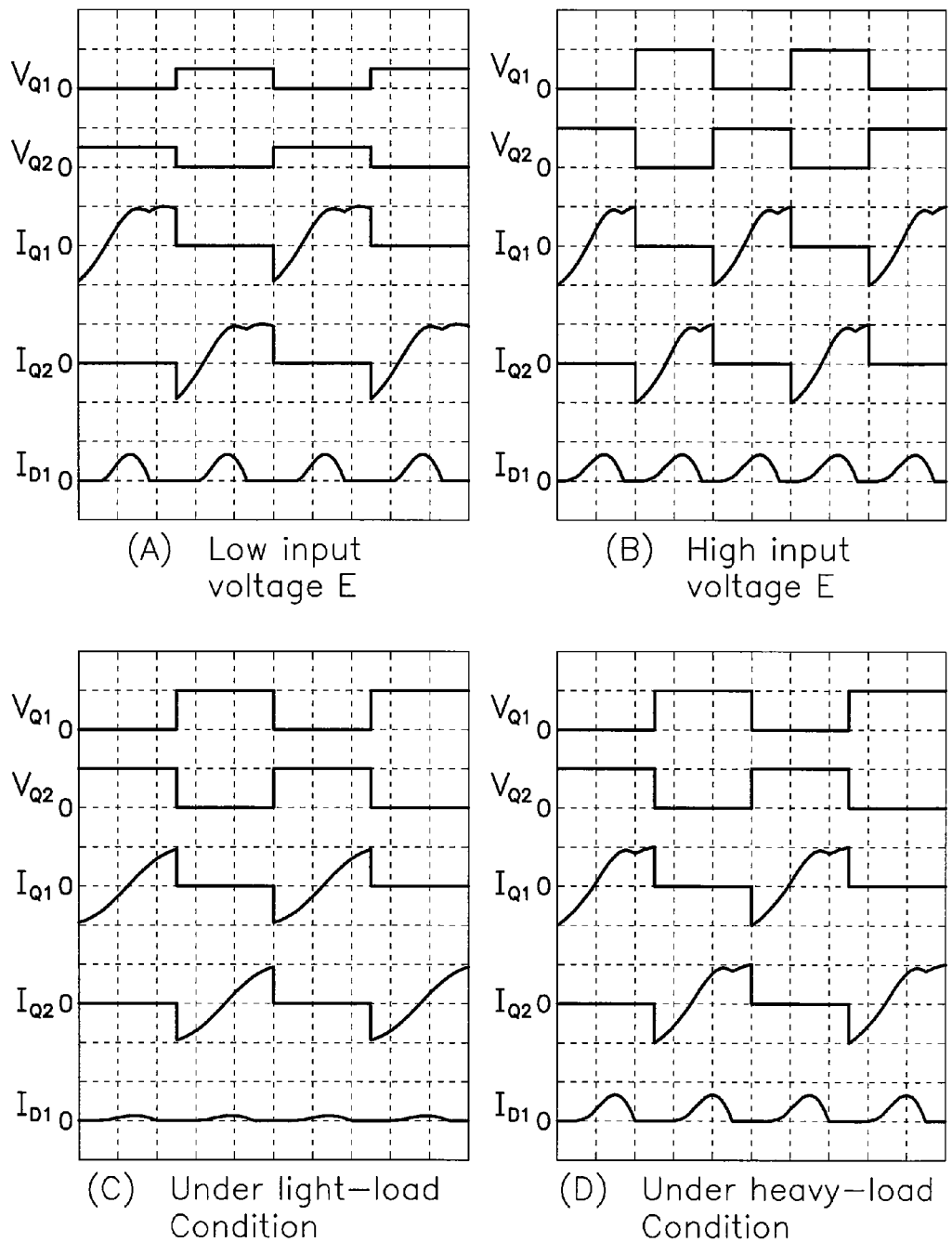
FIG. 9 A wave form chart of voltages and electric currents at selected locations with changes in input voltage and load in the circuit shown in FIG. 7.

FIGS. 9 (A) and (B) illustrate charts indicating wave forms of drain-source voltages $V_{Q1}$ and $V_{Q2}$ of first and second main MOS-FETs 1 and 2, electric currents $I_{Q1}$ and $I_{Q2}$ flowing through first and second main MOS-FETs 1 and 2 and electric current $I_{D1}$ flowing through first rectifying smoother 9. These wave forms can be formed when first and second main MOS-FETs 1 and 2 are alternately turned on and off with the 50% duty ratio and fixed dead time for first and second main MOS-FETs 1 and 2 under frequency control of first and second drive signals $V_{G1}$ and $V_{G2}$ during low and high input voltage E from DC power source 3. In other words, FIGS. 9 (A) and (B) indicate that when excitation current flows through current resonance capacitor 4, second main MOS-FET 2, excitation and leakage inductances 5e and 5d of transformer 5 and current resonance capacitor 4, excitation current can be varied by changing the on-period of first and second main MOS-FETs 1 and 2 with frequency control of first and second drive signals $V_{G1}$ and $V_{G2}$ in response to fluctuation in input voltage E. Consequently, first DC output voltage $V_{O1}$ can be controlled with adjustment of voltage $V_{C2}$ across current resonance capacitor 4. FIGS. 9 (C) and (D) represent charts indicating wave forms of voltages $V_{Q1}$, $V_{Q2}$ and electric currents $I_{Q1}$, $I_{Q2}$ and $I_{D1}$ under light-load and heavy load conditions. As shown in FIG. 9 (C) under light-load condition, electric current $I_{Q1}$ and $I_{Q2}$ flowing through first and second main MOS-FETs 1 and 2 are expressed in the approximately triangular form with almost no resonance current as load current. However, in FIG. 9 (D) under heavy-load condition, electric currents $I_{Q1}$ and $I_{Q2}$ flow with the partial sinusoidal variation through first and second main MOS-FETs 1 and 2 while resonance current also flows as load current. Also, it should be appreciated that switching frequency of first and second main MOS-FETs 1 and 2 is almost unchanged under fluctuation in load in comparing with drain-source voltages $V_{Q1}$ and $V_{Q2}$ of first and second main MOS-FETs 1 and 2 as shown in FIGS. 9 (C) and (D).

During the on-period of first main MOS-FET 1, voltage appears on primary winding 5a of transformer 5, and at the same time, voltage $V_{T22}$ emerges on cathode terminal of one voltage detecting diode 56a through second secondary winding 5c. Also, during the on-period of second main MOS-FET 2, voltage appears on primary winding 5a of transformer 5, and at the same time, voltage $V_{T22}$ emerges on cathode terminal of the other voltage detecting diode 56b through second secondary winding 5c. Voltage $V_{T22}$ on cathode terminals of paired voltage detecting diodes 56a and 56b is also impressed on voltage change detector 42 in output control circuit 41; detection signal $V_{TD}$ of high voltage level is supplied from voltage change detector 42 to set terminal S of RSF/F 45 and PWM controller 44; and RSF/F 45 is set, and PWM controller 44 is activated.

For that reason, RSF/F 45 produces an output at output terminal Q to drive circuit 46 which then issues an operation signal $V_{S2}$ of high voltage level to gate terminal of output-regulatory MOS-FET 40 to turn it on. Thus, each time first and second main MOS-FETs 1 and 2 are alternately turned on and off, electric current flows from second secondary winding 5c of transformer 5 through one 15a or the other 15b of second output rectifying diodes in second rectifying smoother 17 into second output smoothing capacitor 16 to elevate voltage $V_{O2}$ in second output smoothing capacitor 16.

When output-regulatory MOS-FET 40 is turned off, voltage on upper or bottom end of second secondary winding 5c in transformer 5 is clamped at voltage $V_{O2}$ on second output smoothing capacitor 16 in second rectifying smoother 17 every half cycle. Accordingly, applied on leakage inductance 5d is a voltage which is the value of voltage applied on leakage and excitation inductances 5d and 5e of transformer 5 minus the following (1) or (2):

(1) a voltage corresponding to a product of voltage $V_{O2}$ on second output smoothing capacitor 16 and turn ratio of primary winding 5a to an upper portion of second secondary winding 5c or (2) a voltage corresponding to a product of voltage $V_{O2}$ on second output smoothing capacitor 16 and turn ratio of primary winding 5a to a bottom portion of secondary winding 5c.

The circuit shown in FIG. 7 utilizes transformer 5 of leakage inductance 5d which can absorb unnecessary voltage components in output voltage.

After that, when output-regulatory MOS-FET 40 is turned off, voltage clamp on upper or bottom end of second secondary winding 5c of transformer 5 is released every half cycle to produce at upper or bottom end of first secondary winding 5b an ordinary voltage clamped at voltage $V_{O1}$ on first output smoothing capacitor 8 in first rectifying smoother 9 every half cycle. Therefore, in the circuit shown in FIG. 7, electric current $I_{D2}$ flows through one 15a of second output rectifying diode in second rectifying smoother 17 during the on-period of first main MOS-FET 1, and after output-regulatory MOS-FET 40 is turned off, electric current $I_{D1}$ flows through one 7a of first output rectifying diode in first rectifying smoother 9. Also, during the on-period of second main MOS-FET 2, electric current $I_{D2}$ flows through the other 15b of second output rectifying diode in second rectifying smoother 17, and after output-regulatory MOS-FET 40 is turned off, electric current $I_{D1}$ flows through the other 7b of first output rectifying diode in first rectifying smoother 9.

Figure 10:
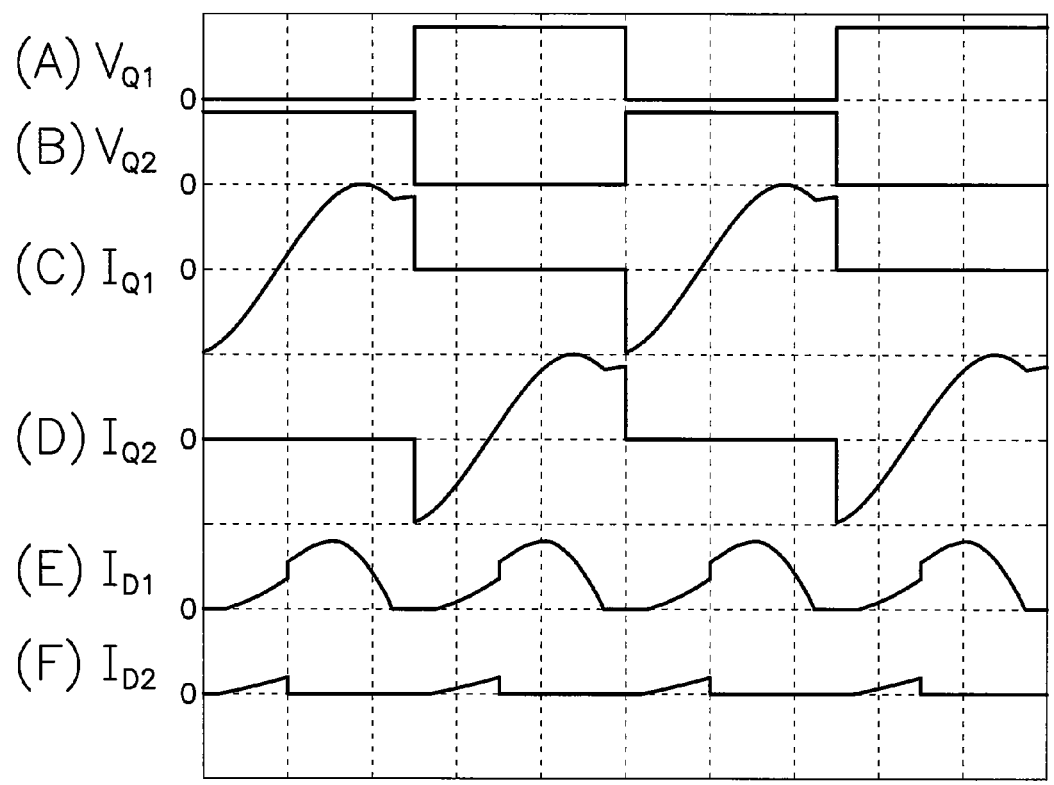
FIG. 10 A wave form chart of voltages and electric currents at selected locations in the circuit shown in FIG. 7.

In addition, when the difference between first and second DC output voltages $V_{O1}$ and $V_{O2}$ is small, sometimes electric currents $I_{D1}$ and $I_{D2}$ simultaneously may flow through one 7a, 15a or the other 7b, 15b of first and second output rectifying diodes every half cycle due to ripple voltage on first output smoothing capacitor 8 in first rectifying smoother 9 and second output smoothing capacitor 16 in second rectifying smoother 17. FIG. 10 (A) to (F) illustrate wave forms at the time of drain-source voltages $V_{Q1}$ and $V_{Q2}$ of respectively first and second main MOS-FETs 1 and 2, electric currents $I_{Q1}$ and $I_{Q2}$ respectively through first and second main MOS-FETs 1 and 2, and electric currents $I_{D1}$ and $I_{D2}$ through respectively first and second output rectifying diodes 7a, 7b and 15a, 15b.

Meanwhile, second output voltage detector 43 in output control circuit 41 detects voltage $V_{O2}$ on second output smoothing capacitor 16 in second rectifying smoother 17 to produce a detection signal, and compares the detection signal with reference voltage for prescribing second output voltage value to produce an error signal $V_{E2}$, a difference between the detection signal and reference voltage and furnishes the error signal to PWM controller 44 which adjusts duty ratio of pulse array signal $V_{PT}$ based on voltage level of error signal $V_{E2}$ and produces pulse array signal $V_{PT}$ to RSF/F 45. Specifically, when voltage $V_{O2}$ on second output smoothing capacitor 16 is higher and lower than reference voltage, PWM controller 44 produces pulse array signals $V_{PT}$ of smaller and larger duty ratio. Pulse array signal $V_{PT}$ from PWM controller 44 is forwarded to reset terminal R of RSF/F 45 which then is reset. Thus, when second DC output voltage $V_{O2}$ from second rectifying smoother 17 is higher than the predetermined value, PWM controller 44 develops pulse array signals $V_{PT}$ of small duty ratio to set terminal of RSF/F 45 which creates at output terminal Q an output to give gate terminal of output-regulatory MOS-FET 40 an operation signal $V_{S2}$ of narrow pulse width. This reduces the on-period of output-regulatory MOS- FET 40 to shorten the period of letting electric current flow through second output smoothing capacitor 16 in second rectifying smoother 17 and thereby decrease voltage $V_{O2}$ on second output smoothing capacitor 16.

When second DC output voltage $V_{O2}$ on second rectifying smoother 17 is lower than a predetermined value, PWM controller 44 produces pulse array signals $V_{PT}$ of large duty ratio to set terminal of RSF/F 45 which sends an output from output terminal Q to drive circuit 46 to provide an operation signal $V_{S2}$ of wide pulse width for gate terminal of output-regulatory MOS-FET 40. This elongates the on-period of output-regulatory MOS-FET 40 to extend the period of flowing electric current through second output smoothing capacitor 16 in second rectifying smoother 17, and raise voltage $V_{O2}$ on second output smoothing capacitor 16. In this way, the on-period of output-regulatory MOS-FET 40 can be controlled based on output voltage $V_{O2}$ from second rectifying smoother 17 to synchronize it with switching frequency of first and second main MOS-FETs 1 and 2 in primary side, and thereby offer second DC output voltage $V_{O2}$ of substantially constant value from second DC output terminals 18 and 19.

In the circuit shown in FIG. 7, as first and second main MOS-FETs 1 and 2 make almost no change in the switching frequency under fluctuated load, and there is almost no change in the period of supplying electric power from primary to secondary side of transformer 5. Accordingly, despite variation in load connected to first DC output terminals 10 and 11 of first secondary winding 5b of transformer 5, necessary DC power can be obtained from second DC output terminals 18 and 19 through second rectifying smoother 17 connected to second secondary winding 5c of transformer 5. Also, the period of electric current flowing through second output smoothing capacitor 16 can be controlled by turning output-regulatory MOS-FET 40 on and off synchronously with switching frequency of first and second main MOS-FETs 1 and 2. In this case, output control circuit 41 can control second DC output voltage $V_{O2}$ with high accuracy by turning output-regulatory MOS-FET 40 on and of depending on the level of voltage $V_{O2}$ on second smoothing capacitor 16. In this way, the on-off operation of output-regulatory MOS-FET 40 allows direct control of second DC output voltage $V_{O2}$ with less power conversion efficiency. Moreover, with very simple addition of only a switching element 40 to second rectifying smoother 17, the converter can produce highly steady second DC output voltage $V_{O2}$ to provide an inexpensive current resonant DC-DC converter of multi-output type with improved power conversion efficiency and highly precise DC outputs generated.

Figure 11:
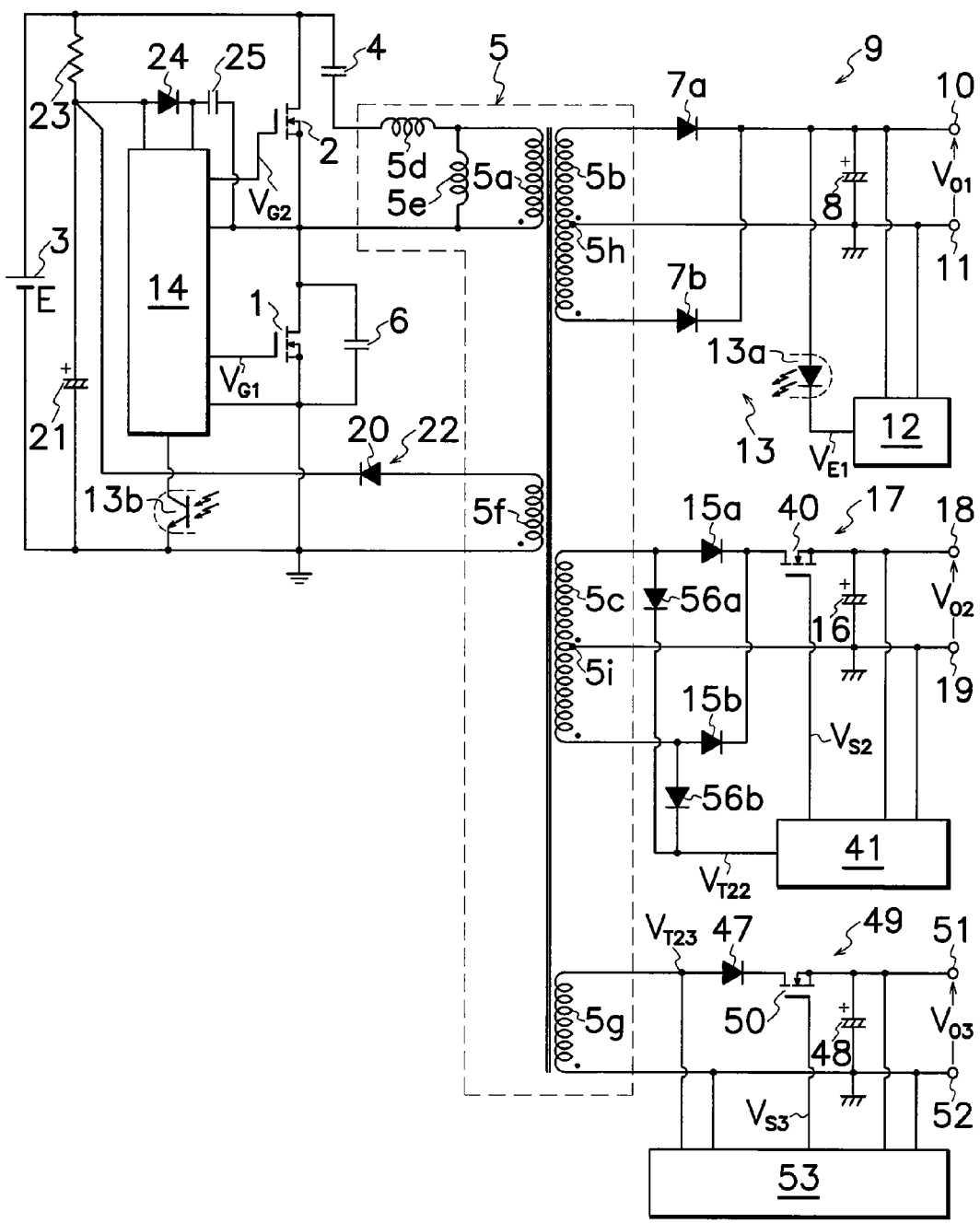
FIG. 11 An electric circuit diagram showing a sixth embodiment of the present invention.

FIG. 11 indicates a sixth embodiment of the current resonant DC-DC converter of multi-output type according to the present invention, which comprises a third second winding 5g as an additional secondary winding provided in transformer 5 shown in FIG. 7, a third rectifying smoother 49 as an additional rectifying smoother provided with a third output rectifying diode 47 and a third smoothing capacitor 48 connected to third secondary winding 5g, an additional output-regulatory MOS-FET 50 as an additional switching element connected between a cathode terminal of third output rectifying diode 47 and third output smoothing capacitor 48, and an additional control circuit 53 connected between third DC output terminals 51 and 52 and gate terminal of additional output-regulatory MOS-FET 50 for controlling the on-off operation of additional output-regulatory MOS-FET 50 based on the level of voltage $V_{O3}$ on third output smoothing capacitor 48. Inner configurations in additional control circuit 53 are similar to those in output control circuit 41 shown in FIG. 2, and other configurations are similar to those in the DC-DC converter shown in FIG. 7.

The DC-DC converter shown in FIG. 11 comprises third rectifying smoother 49 of half wave rectification comprised of one output rectifying diode 47 and one output smoothing capacitor 48 to turn additional output-regulatory MOS-FET 50 on and off in synchronization with the on-period of first main MOS-FET 1, and thereby produce third DC output voltage $V_{O3}$ from third rectifying smoother 49 through third DC output terminals 51 and 52. Additional control circuit 53 detects voltage $V_{O3}$ on third output smoothing capacitor 48 in third rectifying smoother 49 to produce a detection signal, and compares the detection signal with a reference voltage for prescribing third output voltage value to produce an error signal $V_{S3}$, the difference between the detection signal and reference voltage, and forwards the error signal $V_{S3}$ to gate terminal of additional output-regulatory MOS-FET 50 which is turned on and off in synchronization with switching frequency of first main MOS-FET 1 for pulse width modulation of additional output-regulatory MOS-FET 50. This serves to stabilize third DC output voltage $V_{O3}$ to be generated from third rectifying smoother 49 through third DC output terminals 51 and 52. Basic operation other than the above is substantially similar to that in the DC-DC converter shown in FIG. 7.

Like the DC-DC converter of FIG. 7, the converter shown in FIG. 11 indicates the essentially constant period of transporting electric power from primary to secondary side even under the change in load to separately generate stable second and third DC output voltages $V_{O2}$ and $V_{O3}$ from second and third DC output terminals 18, 19 and 51, 52. Accordingly, if:

(1) one or more of first to third secondary windings 5b, 5c and 5g of transformer 5 is connected with the adverse or changed polarity, (2) one or more of first to third output rectifying diodes 7a, 7b, 15a, 15b and 47 is connected with the adverse or changed polarity in first to third rectifying smoothers 9, 17 and 49 to make a reverse or changed current flow in the secondary circuit or circuits through the anti-polarized diode or diodes or (3) different control criterion or criteria is adopted for output control circuit 41 or additional control circuit 53, the invention can provide a current resonant DC-DC converter of multi-output type which produces three DC output voltages $V_{O1}$, $V_{O2}$ and $V_{O3}$ of different polarities or different voltage values from each other.

Figure 12:
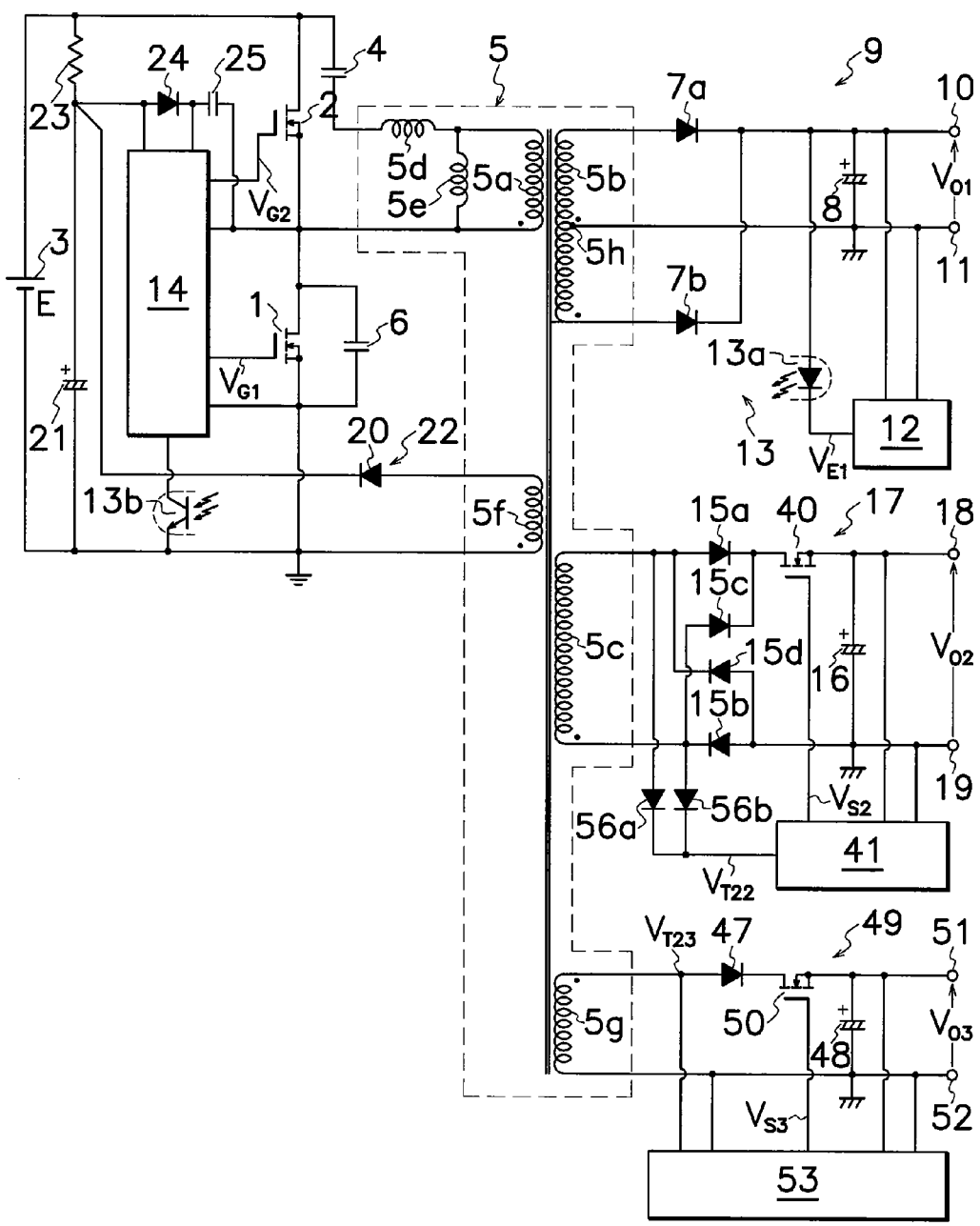
FIG. 12 An electric circuit diagram showing a seventh embodiment of the present invention.

FIG. 12 shows a seventh embodiment of the present invention, which comprises a second rectifying smoother 17 of full wave rectification, a pair of voltage detecting diodes 56a and 56b between upper and bottom ends of second secondary winding 5c of transformer 5 and output control circuit 41, and a third secondary winding 5g in transformer 5 in the adverse polarity to that in FIG. 11. Second rectifying smoother 17 comprises four second output rectifying diodes 15a to 15d in bridge connection and a second output smoothing capacitor 15 in lieu of second rectifying smoother 17 shown in FIG. 11 which includes two second output rectifying diodes 15a and 15b and a second output smoothing capacitor 16. In an example shown in FIG. 12, third secondary winding 5g is electro-magnetically coupled to first and second secondary windings 5b and 5c with the reverse polarity to turn additional output-regulatory MOS-FET 50 on and off in synchronization with the on-period of second main MOS-FET 2. Other configurations are similar to those in the DC-DC converter shown in FIG. 11.

In the converter shown in FIG. 12, four second output rectifying diodes 15a to 15d in bridge connection commutate full wave of AC voltage applied on both ends of second secondary winding 5c of transformer 5, and smoothed second DC output voltage $V_{O2}$ can be taken through output-regulatory MOS-FET 40, second output smoothing capacitor 16 and second DC output terminals 18 and 19. Output control circuit 41 detects voltage $V_{O2}$ on second output smoothing capacitor 15 in second rectifying smoother 17 to produce a detection signal, and compares the detection signal with reference voltage for prescribing second output voltage value to calculate an error signal, the difference between the detection signal and reference voltage and produces the error signal $V_{S2}$ to gate terminal of output-regulatory MOS-FET 40 so that the on-off operation of output-regulatory MOS-FET 40 can be controlled under pulse width modulation by error signal $V_{S2}$ in synchronization with switching frequency of first and second main MOS-FETs 1 and 2. This can produce consistent second DC output voltage $V_{O2}$ through second rectifying smoother 17 and second DC output terminals 18 and 19.

Also, additional output-regulatory MOS-FET 50 is turned on and off in synchronization with the on-period of second main MOS-FET 2 while producing third DC output voltage $V_{O3}$ through third rectifying smoother 49 and third DC output terminals 51 and 52. Additional control circuit 53 detects voltage $V_{O3}$ on third output smoothing capacitor 48 to produce a detection signal, and compares the detection signal with reference voltage for prescribing the third output voltage value to produce an error signal $V_{S3}$, the difference between the detection signals and reference voltage to gate terminal of additional output-regulatory MOS-FET 50 so that additional output-regulatory MOS-FET 50 can be turned on and off under pulse width modulation by error signal $V_{S3}$ in synchronization with switching frequency of first main MOS-FET 1. This makes third DC output voltage $V_{O3}$ stabilized and outputs it through third rectifying smoother 49 and third DC output terminals 51 and 52. Basic operation other than the above is essentially similar to that in the DC-DC converter shown in FIG. 7.

Similar functions and effects to those in FIG. 11 are obtained in the seventh embodiment shown in FIG. 12 since the period of supplying electric power from primary to secondary side of transformer 5 is almost invariable under change in load with changeover of second rectifying smoother 17 from double wave rectification to full wave rectification or with the adverse polarity of third secondary winding 5g to those of first and second secondary windings 5b and 5c.

Figure 13:
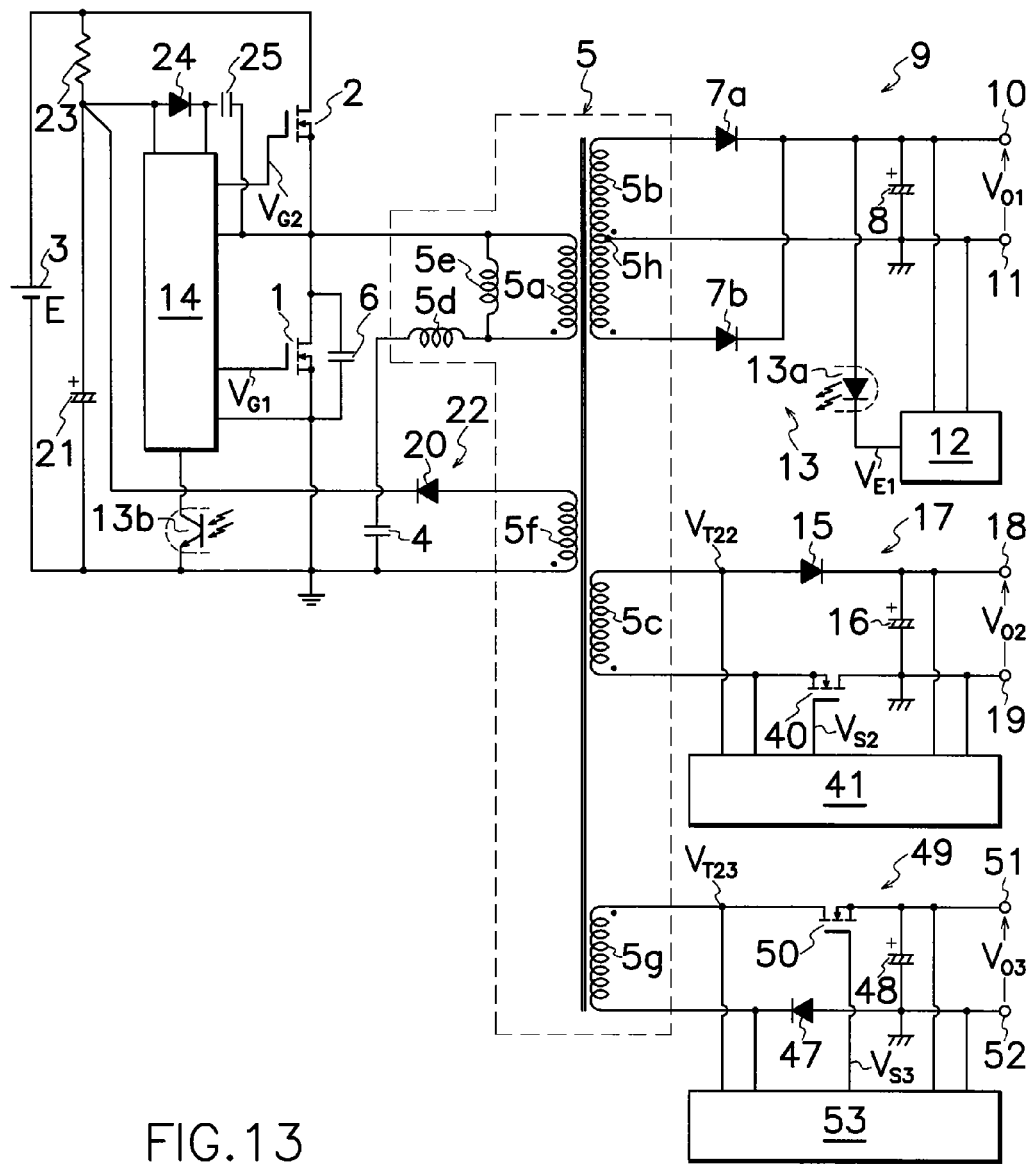
FIG. 13 An electric circuit diagram showing an eighth embodiment of the present invention.

FIG. 13 exhibits an eighth embodiment of the current resonant DC-DC converter of multi-output according to the present invention wherein first main MOS-FET 1 is connected in parallel to a series circuit of primary winding 5a, leakage inductance 5d and current resonance capacitor 4 shown in FIG. 12; exchange is made of second rectifying smoother 17 of full wave rectification comprised of four second output rectifying diodes 15a to 15d in bridge connection and one second output smoothing capacitor 16 with second rectifying smoother 17 of half wave rectification comprised of one second output rectifying diode 15 and one second output smoothing capacitor 16; output-regulatory MOS-FET 40 is connected on a ground line between second secondary winding 5c of transformer 5 and second output smoothing capacitor 16; and connection of third output rectifying diode 47 in third rectifying smoother 49 shown in FIG. 12 is moved to on ground line between third secondary winding 5g of transformer 5 and third output smoothing capacitor 48. Other configurations are generally similar to the DC-DC converter shown in FIG. 12.

In the DC-DC converter shown in FIG. 13, output-regulatory MOS-FET 40 is turned on and off synchronously with the on-period of second main MOS-FET 2, and second DC output voltage $V_{O2}$ is generated from second rectifying smoother 17 through second DC output terminals 18 and 19. Output control circuit 41 detects voltage $V_{O2}$ on second output smoothing capacitor 16 in second rectifying smoother 17 to produce a detection signal, and compares the detection signal with a reference voltage for prescribing second output voltage value to produce an error signal, a difference between the detection signal and reference voltage so that output-regulatory MOS-FET 40 is turned on and off under pulse width modulation based on error signal in synchronization with switching frequency of second main MOS-FET 2 to make second DC output voltage $V_{O2}$ stable and consistent when it comes up through second rectifying smoother 17 and second DC output terminals 18 and 19. Meanwhile, additional output-regulatory MOS-FET 50 is turned on and off in synchronization with the on-period of first main MOS-FET 1, and third DC output voltage $V_{O3}$ is developed through third rectifying smoother 49 and third DC output terminals 51 and 52. Additional control circuit 53 detects voltage $V_{O3}$ on third output smoothing capacitor 48 in third rectifying smoother 49 to produce a detection signal, and compares the detection signal with a reference voltage for prescribing third output voltage value to produce an error signal, a difference between the detection signal and reference voltage so that additional output-regulatory MOS-FET 50 is turned on and off under pulse width modulation based on error signal in synchronization with switching frequency of second main MOS-FET 2 to stabilize and produce third DC output voltage $V_{O3}$ through third rectifying smoother 49 and third DC output terminals 51 and 52. Basic operation other than the above is essentially similar to that in the DC-DC converter shown in FIG. 7.

Similar functions and effects to those in FIG. 12 are obtained in the seventh embodiment shown in FIG. 13 since the period of supplying electric power from primary to secondary side of transformer 5 is almost invariable under change in load with changeover of second rectifying smoother 17 from full wave rectification to half wave rectification and movement of connected location for output-regulatory MOS-FET 40 or with movement of connected location for third output rectifying diode 47 in third rectifying smoother 49.

Figure 14:
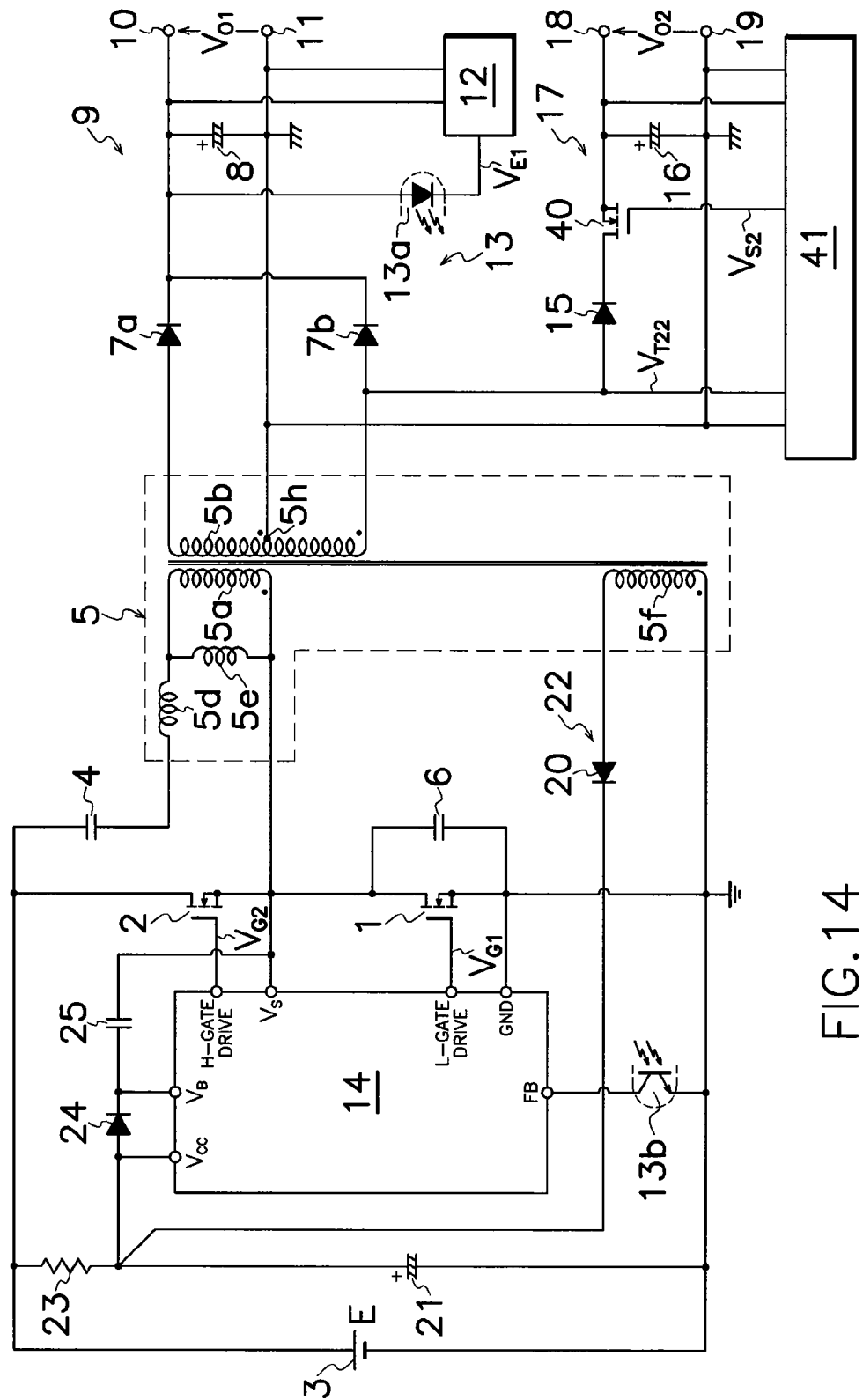
FIG. 14 An electric circuit diagram showing a ninth embodiment of the present invention.

FIG. 14 illustrates a ninth embodiment of the current resonant DC-DC converter of multi-output type according to the present invention wherein second secondary winding 5c of transformer 5 with intermediate tap 5i shown in FIG. 7 is omitted; connected between intermediate tap 5h and bottom end of first secondary winding 5b is second rectifying smoother 17 of half wave rectification which includes second output rectifying diode 15 and second output smoothing capacitor 16; output-regulatory MOS-FET 40 is connected between cathode terminal of second output rectifying diode 15 and second output smoothing capacitor 16; connected between second DC output terminals 18 and 19 and output-regulatory MOS-FET 40 is output control circuit 41 for controlling the on-off operation of output-regulatory MOS-FET 40 based on the level of voltage $V_{O2}$ on second output smoothing capacitor 16. Configurations other than the above are generally similar to those in the DC-DC converter shown in FIG. 7.

In the DC-DC converter shown in FIG. 14, when second main MOS-FET 2 is turned on, voltage $V_{T22}$ appears between bottom end and intermediate tap 5h of first secondary winding 5b with positive polarity at bottom end of the winding 5b, and output-regulatory MOS-FET 40 is turned on. Accordingly, output-regulatory MOS-FET 40 is turned on and off in synchronization with the on-period of second main MOS-FET 2 to produce second DC output voltage $V_{O2}$ through second rectifying smoother 17 and second DC output terminals 18 and 19. Output control circuit 41 detects voltage $V_{O2}$ on second output smoothing capacitor 16 in second rectifying smoother 17 to produce a detection signal, and compares the detection signal with a reference voltage for prescribing the second output voltage value to produce an error signal, the difference between the detection signal and reference voltage so that output-regulatory MOS-FET 40 is turned on and off under the pulse width modulation by the error signal in synchronization with switching frequency of second main MOS-FET 2. This ensures stabilization of second DC output voltage $V_{O2}$ taken from second DC output terminals 18 and 19 through second rectifying smoother 17. Basic operation other than the above is substantially same as that in the DC-DC converter shown in FIG. 7.

In a similar manner to the DC-DC converter of FIG. 7, the converter shown in FIG. 14 indicates the generally constant period of supplying electric power from primary to secondary side even under the change in load connected to first DC output terminals 10 and 11 for first secondary winding 5b to gain necessary DC power from second DC output terminals 18 and 19 through second rectifying smoother 17 connected to second secondary winding 5c of transformer 5. Accordingly, equivalent functions and effects to those in FIG. 7 are obtained in FIG. 14. In particular, with less number of secondary windings in FIG. 14 than that in FIG. 7, the converter can advantageously accomplish transformer 5 of lighter weight and smaller size.

Figure 15:
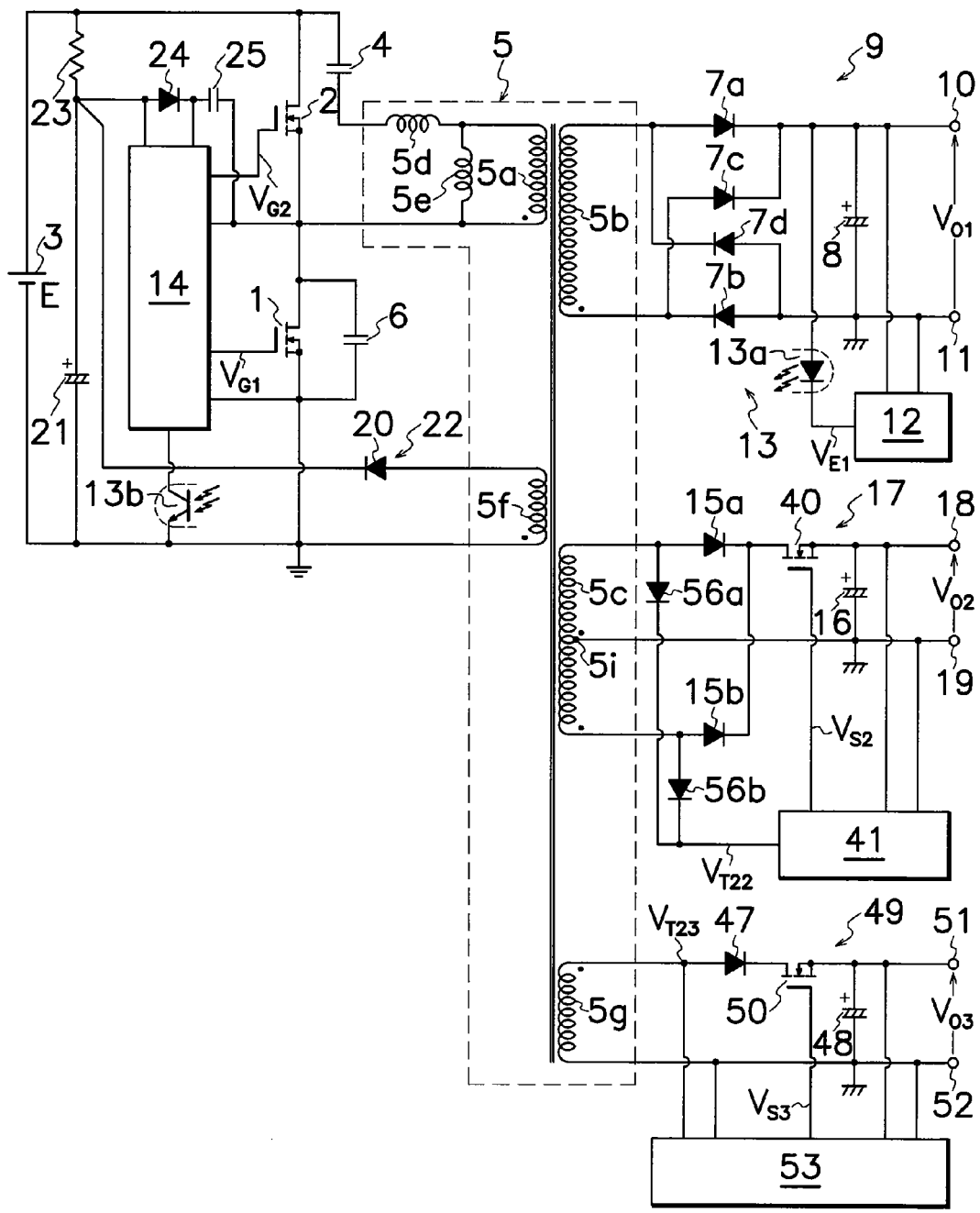
FIG. 15 An electric circuit diagram showing a tenth embodiment of the present invention.

FIG. 15 shows a tenth embodiment of the current resonant DC-DC converter of multi-output type according to the present invention wherein first rectifying smoother 9 of full wave rectification having four first output rectifying diodes 7a to 7d in bridge connection and one first output smoothing capacitor 8 is substituted for first rectifying smoother 9 of FIG. 11 having two first output rectifying diodes 7a and 7b and one first output smoothing capacitor 8; and third second winding 5g of transformer 5 is connected in the reverse polarity to that in FIG. 11. In an example shown in FIG. 15, due to reverse polarity in third secondary winding 5g to first and second secondary winding 5b and 5c in transformer 5, additional output-regulatory MOS-FET 50 can be turned on and off in synchronization with the on-period of second main MOS-FET 2. Electric constructions other than the above are generally similar to the DC-DC converter shown in FIG. 11.

In the DC-DC converter shown in FIG. 15, four first output rectifying diodes 7a to 7d in bridge connection perform full wave rectification of AC voltage induced at opposite ends of first secondary winding 5b of transformer 5, and first output smoothing capacitor 8 generates smoothed first DC output voltage $V_{O1}$ through first DC output terminals 10 and 11. First output voltage detector 12 picks out voltage $V_{O1}$ on first output smoothing capacitor 8 in first rectifying smoother 9 to produce a detection signal, and compares the detection signal with reference voltage for prescribing first output voltage value to produce an error signal $V_{E1}$, the difference between the detection signal and reference voltage so that error signal $V_{E1}$ is transmitted to feedback signal input terminal FB of main control circuit 14 through light emitter 13a and light receiver 13b of photo-coupler 13. Main control circuit 14 prepares first and second drive signals $V_{G1}$ and $V_{G2}$ whose pulse frequency is modulated based on voltage level of error signal $V_{E1}$ forwarded from first output voltage detector 12 to feedback signal input terminal FB, and applies first and second drive signals $V_{G1}$ and $V_{G2}$ to each gate terminal of first and second main MOS-FETs 1 and 2 to alternately turn first and second MOS-FETs 1 and 2 on and off with frequency corresponding to voltage level of error signal $V_{E1}$ from first output voltage detector 12. This ensures reliable control of first DC output voltage $V_{O1}$ produced from first DC output terminals 10 and 11 for a substantially constant value of first DC output voltage $V_{O1}$. At the same time, additional output-regulatory MOS-FET 50 is turned on and off in synchronization with the on-period of second main MOS-FET 2 to generate third DC output voltage $V_{O3}$ from third rectifying smoother 49 through third DC output terminals 51 and 52. Additional control circuit 53 detects voltage $V_{O3}$ on third output smoothing capacitor 48 in third rectifying smoother 49 to produce a detection signal, and compares the detection signal with a reference voltage for prescribing third output voltage value to produce an error signal, the difference between the detection signal and reference voltage so that additional output-regulatory MOS-FET 50 is turned on and off under pulse width modulation by error signal in synchronization with switching frequency of second main MOS-FET 2 while stabilizing third DC output voltage $V_{O3}$ taken from third rectifying smoother 49 through third DC output terminals 51 and 52. Basic operation other than the above is substantially similar to that in the converter shown in FIG. 7.

Like the sixth embodiment shown in FIG. 11, the converter shown in FIG. 15 indicates almost no change of the period for supplying electric power from primary to secondary side of transformer 5 even in case of variability in load, and therefore, similar behaviors and effects to those in FIG. 11 can be obtained in the converter of FIG. 15 even with modification of first rectifying smoother 9 from double wave rectification to full wave rectification in bridge connection or with the reverse polarity of third secondary winding 5g of transformer 5 to those of first and second secondary windings 5b and 5c.

Figure 16:
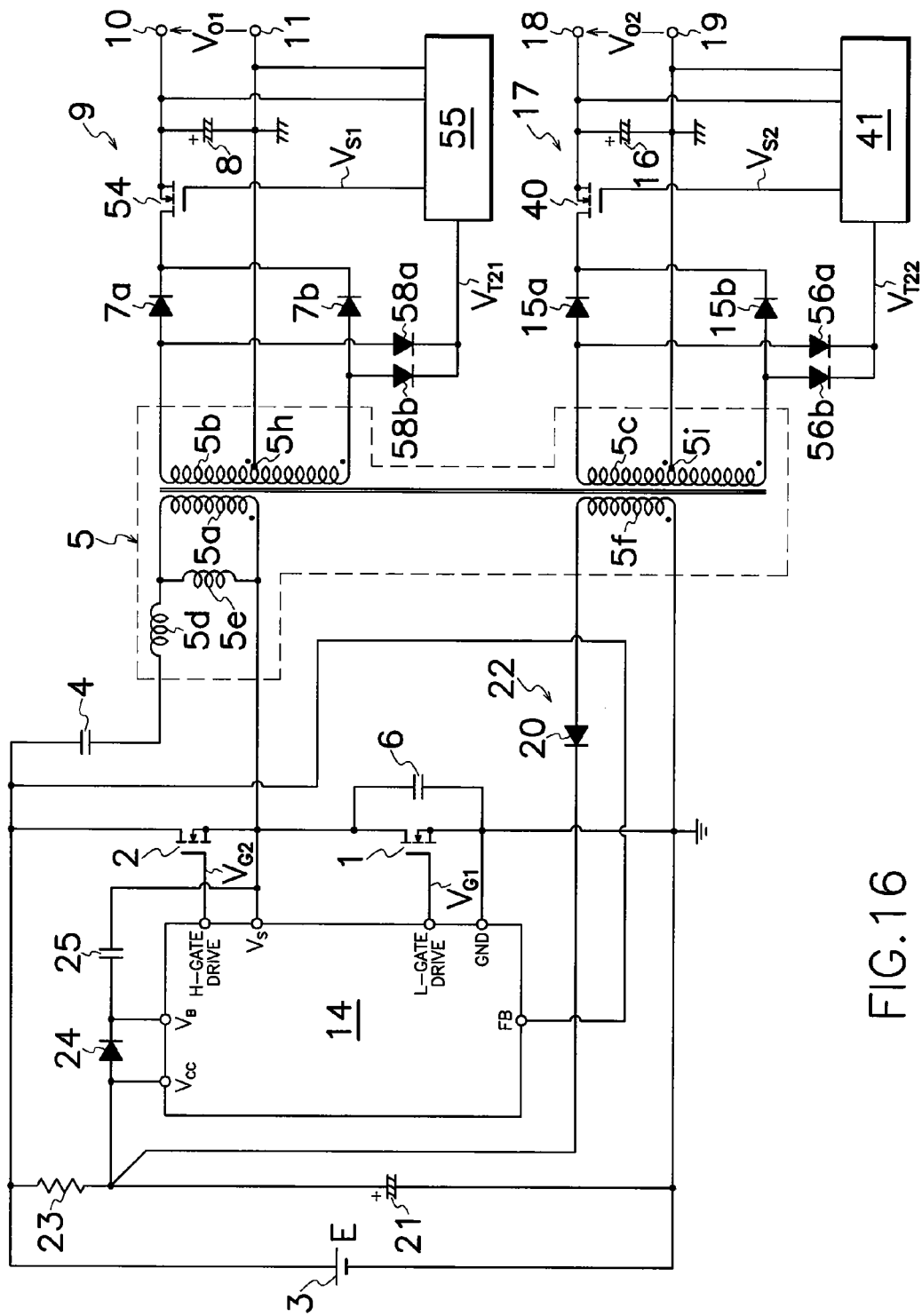
FIG. 16 An electric circuit diagram showing an eleventh embodiment of the present invention.
Figure 17:
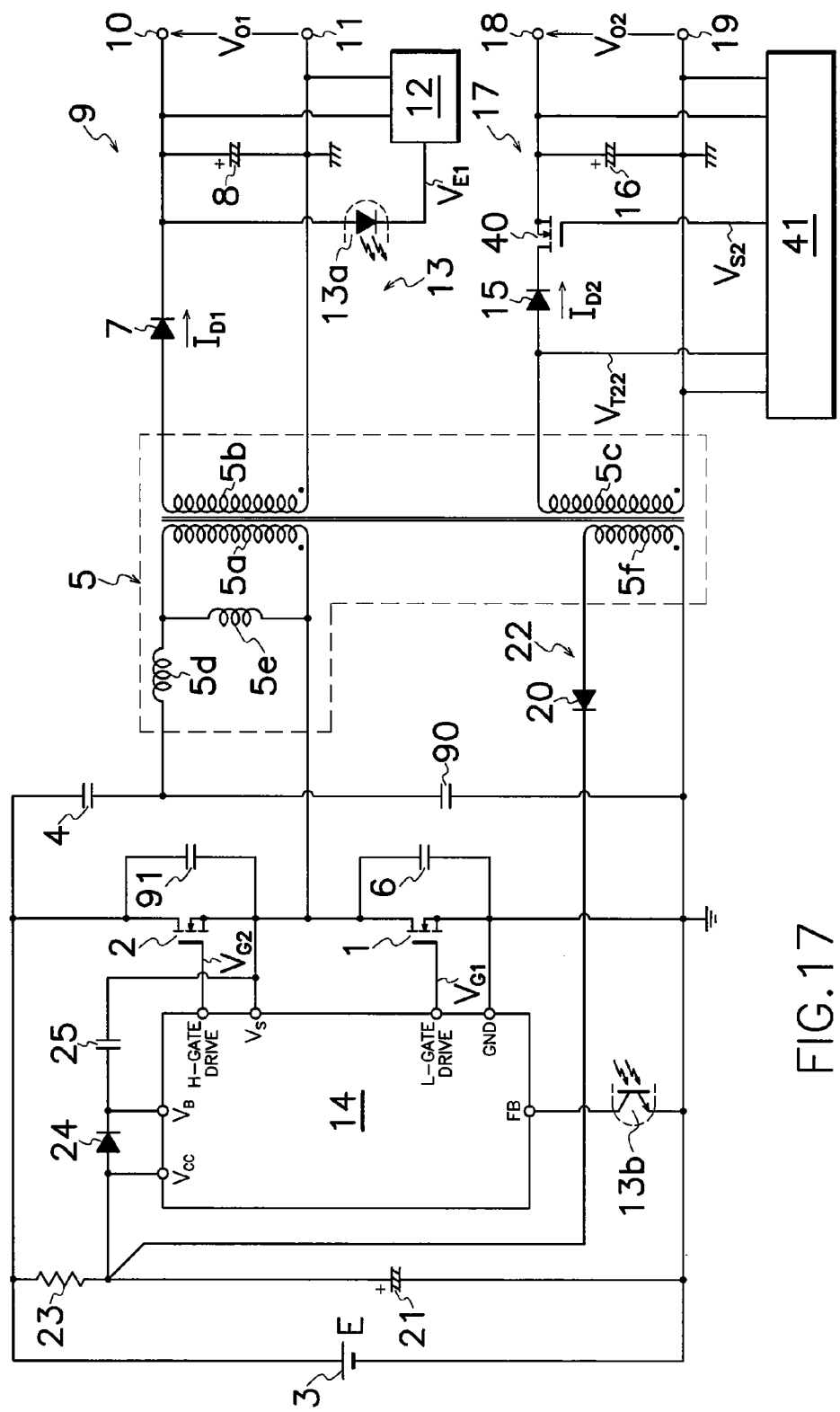
FIG. 17 An electric circuit diagram indicating a varied embodiment of FIG. 1.

FIG. 16 shows an eleventh embodiment of the current resonant DC-DC converter of multi-output type according to the present invention wherein main control circuit 14 controls the on-off operation of first and second MOS-FETs 1 and 2 based on input voltage E in lieu of DC power source 3; first output voltage detector 12 and photo-coupler 13 in FIG. 7 are omitted; second output-regulator MOS-FET 54 is connected between cathode terminal of first output rectifying diodes 7a and 7b and first output smoothing capacitor 8 shown in FIG. 7; connected between first DC output terminals 10 and 11 and gate terminal of second output-regulatory MOS-FET 54 is second output control circuit 55 for controlling the on-off operation of second output-regulatory MOS-FET 54 based on voltage $V_{O1}$ on first output smoothing capacitor 8; and connected between each anode terminal of first output rectifying diodes 7a and 7b and second output control circuit 55 is a pair of second voltage detecting diodes 58a and 58b for detecting voltage $V_{T21}$ on first secondary winding 5b of transformer 5. Configurations other than the above are entirely similar to those in the DC-DC converter in FIG. 7.

In the DC-DC converter shown in FIG. 16, main control circuit 14 produces to each gate terminal of first and second main MOS-FETs 1 and 2 first and second drive signals $V_{G1}$ and $V_{G2}$ whose pulse frequency is modulated based on variation in input voltage E from DC power source 3 to alternately turn first and second main MOS-FETs 1 and 2 with frequency in response to variation in input voltage E from DC power source 3. This causes AC voltage to develop in primary winding 5a of transformer 5 and therefore to induce in first secondary winding 5b AC voltage corresponding to turn ratio of primary and first secondary windings 5a and 5b. AC voltage caused on first secondary winding 5b of transformer 5 is commutated through two first output rectifying diodes 7a and 7b in first rectifying smoother for double wave rectification and smoothed through first output smoothing capacitor 8 to generate first DC output voltage $V_{O1}$ between first DC output terminals 10 and 11. Second output control circuit 55 detects voltage $V_{O1}$ on first output smoothing capacitor 8 in first rectifying smoother 9 to produce a detection signal, and compares the detection signal with a reference voltage for prescribing first output voltage value to produce an error signal, the difference between the detection signal and reference voltage so that second output control circuit 55 turns second output-regulatory MOS-FET 54 on and off with pulse width modulation synchronously with switching frequency of first and second main MOS-FETs 1 and 2 while steadying first DC output voltage $V_{O1}$ generated from first rectifying smoother 9 through first DC output terminals 10 and 11. Basic operation other than the foregoing is substantially similar to that in the DC-DC converter in FIG. 7.

Like the fifth embodiment shown in FIG. 7, the converter shown in FIG. 16 involves no substantial change in the period for supplying electric power from primary to secondary side of transformer 5 even under variation in load, main control circuit 14 can turn first and second main MOS-FETs 1 and 2 on and off based on variation in input voltage E from DC power source 3 to apply constant voltage on primary winding 5a of transformer 5. In this way, output control circuits 55 and 41 can independently turn output-regulatory MOS-FETs 54 and 40 on and off based on respective output voltages $V_{O1}$ and $V_{O2}$ from first and second rectifying smoothers 9 and 17 to produce first and second DC output voltages $V_{O1}$ and $V_{O2}$ of different voltage values from each other through first and second DC output terminals 10, 11 and 18, 19. Also, secondary DC output circuits may comprise electric components of same or similar kind or type to cut down the number of components for reduction in manufacturing cost and improvement in maintenance and compatibility of components.

By the way, the DC-DC converter shown in FIG. 1 is operated such that secondary output-regulatory MOS-FET 40 is turned on at the same time primary first main MOS-FET 1 is turned on, and output-regulatory MOS-FET 40 is turned off based on output voltage $V_{O2}$ from second rectifying smoother 17 during the on-period of first main MOS-FET 1. Consequently, when output-regulatory MOS-FET 40 is switched from on to off, sinusoidal electric current $I_{D2}$ flowing through output-regulatory MOS-FET 40 in the on condition rapidly decreases to zero, and simultaneously, drain-source voltage in output-regulatory MOS-FET 40 abruptly rises from zero volt. Accordingly, the DC-DC converter in FIG. 1 has a defect of incurring a large switching loss in output-regulatory MOS-FET 40, resulting in reduction in power conversion efficiency of the converter because drain-source voltage in output-regulatory MOS-FET 40 sharply rises before electric current $I_{D2}$ flowing through output-regulatory MOS-FET 40 well reaches zero when it is turned from on to off. Likewise, current resonant DC-DC converter shown in Patent Document 2 has a similar disadvantage in that terminal voltage of a switch circuit rapidly rises before electric current flowing through the switch circuit sufficiently drops to zero when it is turned from on to off because a secondary switch circuit is turned on in synchronization with the on operation of a primary field effect transistor to control the on time of the switch circuit in response to output voltage in an output system without main feedback. For that reason, the prior art converter undesirably incurs a large power loss in switch circuit to totally result in reduction in power conversion efficiency of the converter.

Figure 19:
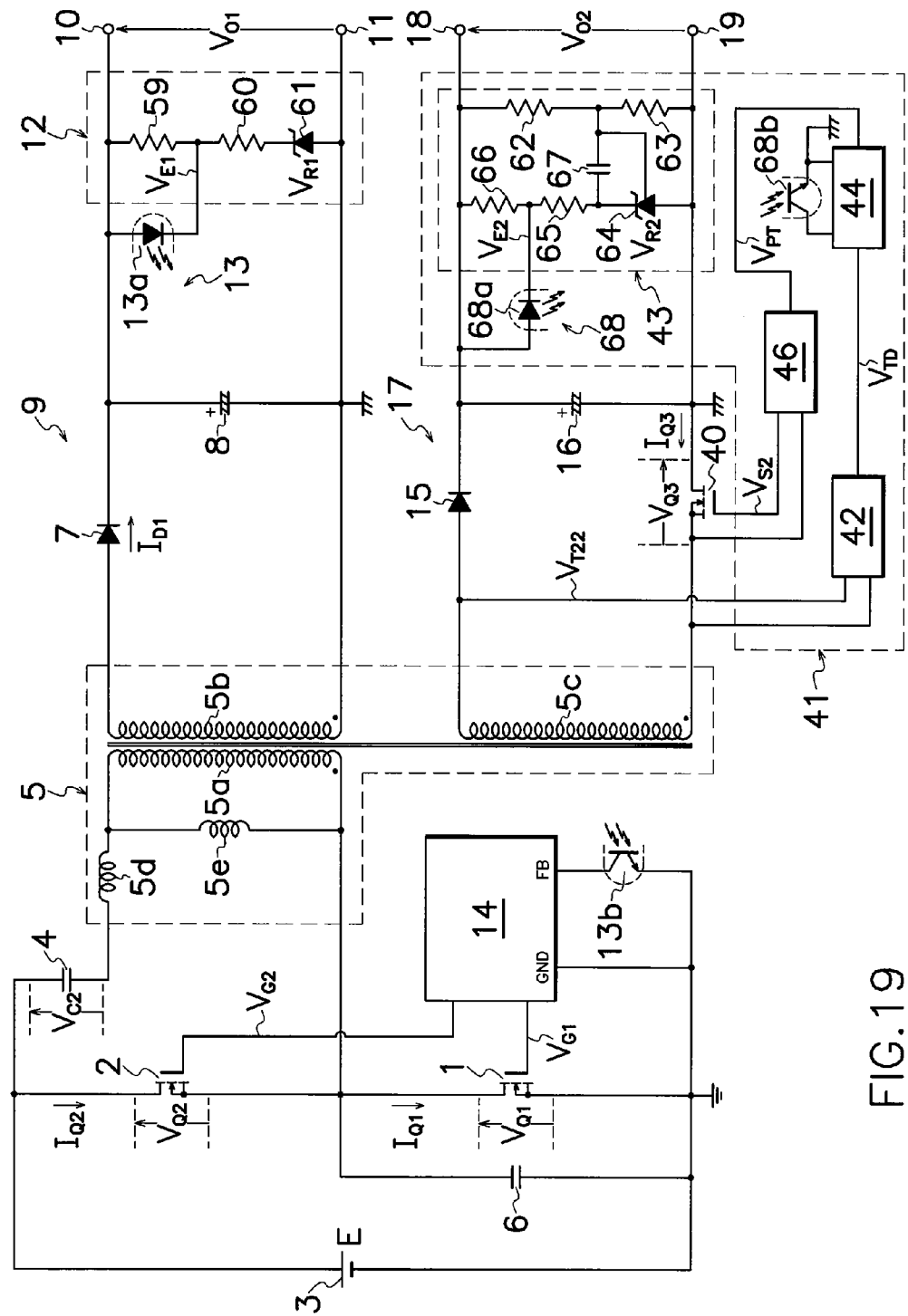
FIG. 19 An electric circuit diagram showing a twelfth embodiment of the present invention.

FIG. 19 illustrates a twelfth embodiment of the current resonant DC-DC converter of multi-output type according to the present invention wherein connected location of output-regulatory MOS-FET 40 in FIG. 1 is moved to on a ground line between second secondary winding 5c of transformer 5 and second output smoothing capacitor 16 to diminish switching loss occurring upon switching of output-regulatory MOS-FET 40 from on to off. First output voltage detector 12 comprises two resistors 59 and 60 and a Zener diode 61 connected in series between first DC output terminals 10 and 11 to produce from a junction of two resistors 59 and 60 a first error signal $V_{E1}$, the difference between detection voltage on first output smoothing capacitor 8 and Zener voltage $V_{R1}$ for prescribing first output voltage value. Accordingly, first error signal $V_{E1}$ causes a controlled electric current to flow through light emitter 13a of photo-coupler 13, and it is transmitted to feedback signal input terminal FB of main control circuit 14 from first output voltage detector 12 through light emitter 13a and receiver 13b in photo-coupler 13.

Output control circuit 41 comprises a voltage change detector 42 for detecting rising and falling pulses in voltage $V_{T22}$ induced on second secondary winding 5c to produce respectively first and second detection signals $V_{TD}$, a second output voltage detector 43 for detecting voltage $V_{O2}$ on second output smoothing capacitor 16 and comparing detected voltage with a reference voltage $V_{R2}$ for prescribing second output voltage value to produce a second error signal $V_{E2}$, a PWM controller 44 as a drive controller for switching output-regulatory MOS-FET 40 on after voltage change detector 42 produces first detection signal $V_{TD}$ and producing an output signal $V_{PT}$ to turn output-regulatory MOS-FET 40 off after voltage change detector 42 produces second detection signal $V_{TD}$, and a drive circuit 46 for receiving output signal $V_{PT}$ from PWM controller 44 to produce an operation signal $V_{S2}$ to gate terminal of output-regulatory MOS-FET 40.

Second output voltage detector 43 comprises dividing resistors 62 and 63 connected in series between second DC output terminals 18 and 19, a series circuit which includes a shunt regulator 64 and two resistors 65 and 66 connected in parallel to second output smoothing capacitor 16, and a phase correcting capacitor 67 connected between a junction of shunt regulator 64 and one resistor 65 and a branched junction of dividing resistors 62 and 63. An REF terminal of shunt regulator 64 is connected to junction of dividing resistors 62 and 63, and a light emitter 68a of photo-coupler 68 is connected between one second DC output terminal 18 and junction of two resistors 65 and 66.

Figure 20:
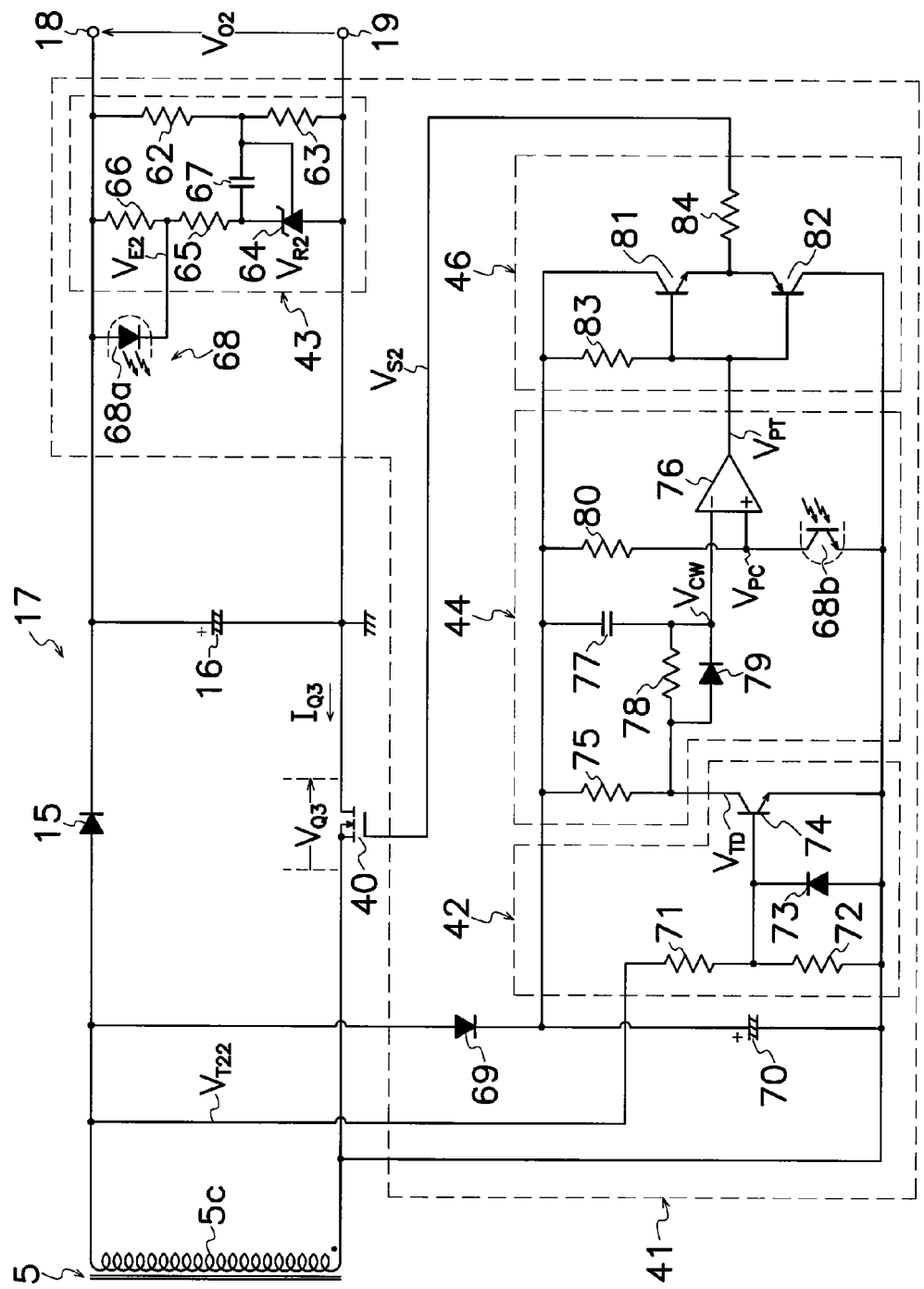
FIG. 20 A detailed electric circuit diagram of an output control circuit shown in FIG. 19.

As shown in FIG. 20, connected to opposite ends of second secondary winding 5c is an auxiliary power supply circuit which includes a rectifying diode 69 and a smoothing capacitor 70 to supply drive power through a cathode terminal of rectifying diode 69 and smoothing capacitor 70 to output control circuit 41 inclusive of voltage change detector 42, PWM controller 44 and drive circuit 46.

Voltage fluctuation detector 42 comprises dividing resistors 71 and 72 connected in series to the opposite ends of second secondary winding 5c, a diode 73 connected in parallel to the other dividing resistor 72, and a detecting transistor 74 as a detecting switching element having a base terminal (control terminal) connected to a branched junction of dividing resistors 71 and 72. Detecting transistor 74 has a collector terminal (one main terminal) connected to PWM controller 44 and an emitter terminal (the other main terminal) connected to smoothing capacitor 70 to produce first and second detection signals $V_{TD}$ at collector terminal when detecting transistor 74 is respectively turned on and off. In detail, when a rising pulse of voltage $V_{T22}$ appears on second secondary winding 5c, voltage of positive polarity is induced at branched junction of dividing resistors 71 and 72 to bias diode 73 in the adverse direction while electric current flows from base to emitter terminal in detecting transistor 74 which is therefore turned on to create first detection signal $V_{TD}$ at collector terminal of detecting transistor 74. When a falling pulse of voltage $V_{T22}$ appears on second secondary winding 5c, voltage of negative polarity is induced at branched junction of dividing resistors 71 and 72 to bias diode 73 in the forward direction so that no electric current flows from base to emitter terminal in detecting transistor 74 which is therefore turned off to create second detection signal $V_{TD}$ at collector terminal of detecting transistor 74.

PWM controller 44 comprises a discharge resistor 75 connected between a junction of rectifying diode 69 and smoothing capacitor 70 and collector terminal of detecting transistor 74, a comparator 76, an accumulation capacitor 77 connected between a junction of rectifying diode 69 and smoothing capacitor 70 and an inverted input terminal − of comparator 76, a charge resistor 78 connected between a junction of discharge resistor 75 and detecting transistor 74 and a junction of accumulation capacitor 77 and inverted input terminal − of comparator 76, a discharge diode 79 connected in parallel to charge resistor 78, and a series circuit which includes a current limiting resistor 80 and a light receiver 68b of a photo-coupler 68 connected in parallel to smoothing capacitor 70. A non-inverted input terminal + of comparator 76 is connected to a junction of current limiting resistor 80 and light receiver 68b of photo-coupler 68, and an output terminal of comparator 76 is connected to drive circuit 46. An accumulation circuit incorporates discharge resistor 75, accumulation capacitor 77, charge resistor 78 and discharge diode 79, and when detecting transistor 74 is turned on, first detection signal $V_{TD}$ appears at collector terminal of transistor 74, charge current flows from smoothing capacitor 70 through accumulation capacitor 77, charge resistor 78 and detecting transistor 74 and accumulation capacitor 77 is electrically charged. By virtue of charge current through accumulation capacitor 77 and charge resistor 78, voltage at a junction of accumulation capacitor 77 and charge resistor 78 indicates a first accumulation output signal $V_{CW1}$ (FIG. 21 (B)) corresponding to an accumulated value of voltage $V_{T22}$ induced on second secondary winding 5c.

Figure 21:
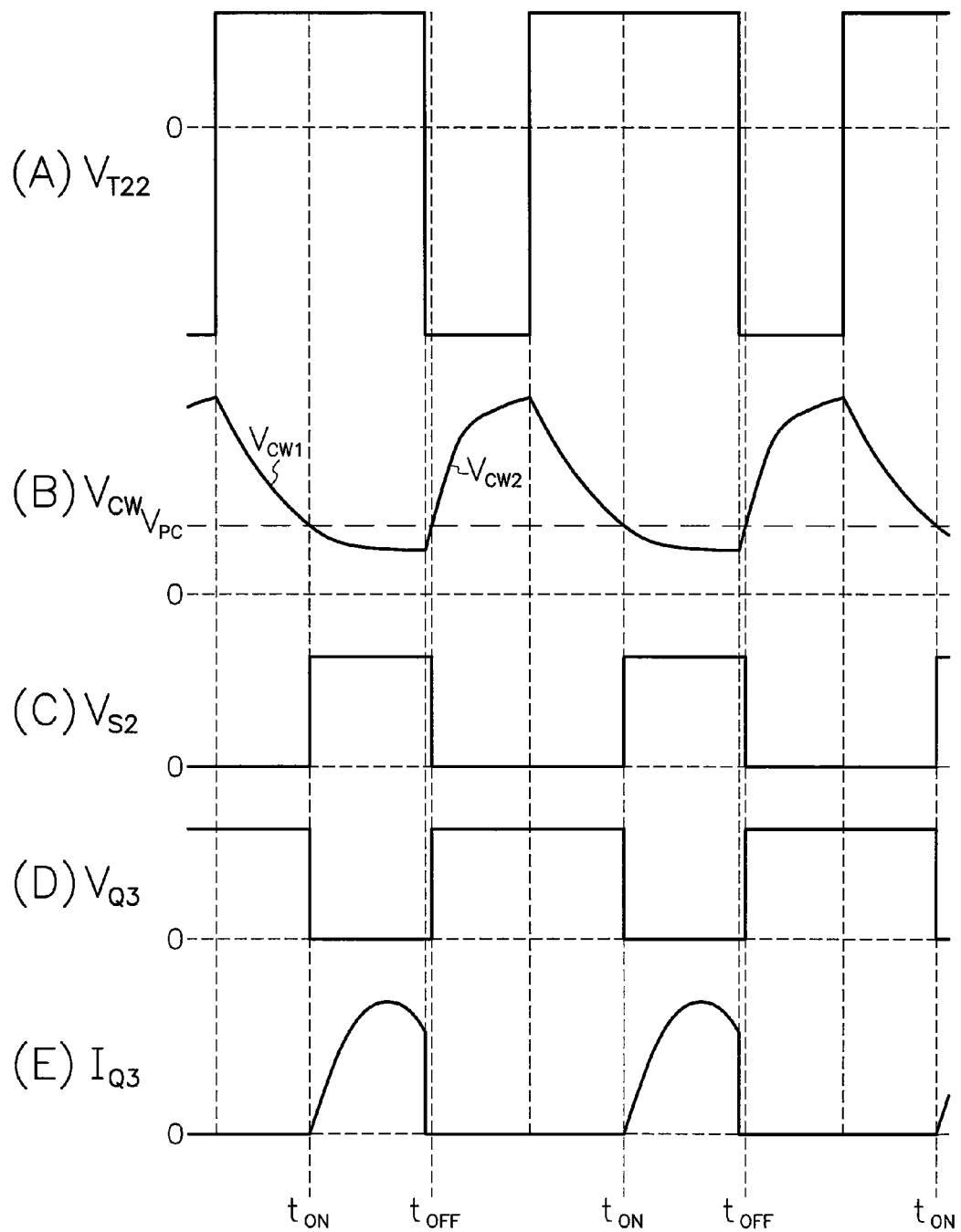
FIG. 21 A wave form diagram indicating voltages and electric currents at selected locations in the circuits shown in FIGS. 19 and 20.

When detecting transistor 74 is turned off, a second detection signal $V_{TD}$ emerges at collector terminal of detecting transistor 74, electric charge amassed in accumulation capacitor 77 is discharged because discharge current flows from accumulation capacitor 77 through discharge resistor 75 and diode 79 while voltage at junction of discharge resistor 77 and diode 79 indicates a second accumulation output signal $V_{CW2}$ (FIG. 21 (B)) corresponding to an accumulated value of voltage $V_{T22}$ emerged on second secondary winding 5c. An error voltage generator incorporates a current limiting resistor 80 and light receiver 68b of photo-coupler 68, and an error voltage $V_{PC}$ (FIG. 21 (B)) is produced at a junction of current limiting resistor 80 and light receiver 68b of photo-coupler 68 so that error voltage $V_{PC}$ has the level corresponding to second error signal $V_{E2}$ of second output voltage detector 43. Comparator 76 compares error voltage $V_{PC}$ inputted at non-inverted input terminal + with charge/discharge voltage $V_{CW}$ which is first or second accumulation output signal $V_{CW1}$ or $V_{CW2}$ inputted at inverted input terminal − from accumulation capacitor 77, and produces an output signal $V_{PT}$ of high and low voltage level when charge/discharge voltage $V_{CW}$ on accumulation capacitor 77 is respectively lower and higher than error voltage $V_{PC}$.

Drive circuit 46 comprises a NPN transistor 81 for high voltage output and a PNP transistor 82 for low voltage output connected in parallel to smoothing capacitor 70, a bias resistor 83 connected between a junction of rectifying diode 69 and smoothing capacitor 70 and both base terminals (control terminals) of NPN and PNP transistors (switch elements) 81 and 82, and an output resistor 84 connected to both emitter terminals (one main terminals) of NPN and PNP transistors 81 and 82. Collector terminal (the other main terminal) of NPN transistor 81 is connected to a junction of rectifying diode 69 and smoothing capacitor 70, and collector terminal (the other main terminal) of PNP transistor 82 is connected to ground end (bottom end) of smoothing capacitor 70.

In operation, when comparator 70 produces output signal $V_{PT}$ of high voltage level, NPN and PNP transistors 81 and 82 are respectively turned on and off, and electric current runs through emitter terminal of NPN transistor 81 and output resistor 84 to turn output-regulatory MOS-FET 40 on because operation signal $V_{S2}$ of high voltage level is applied to gate terminal of MOS-FET 40. To the contrary, when comparator 76 produces output signal $V_{PT}$ of low voltage level, NPN and PNP transistors 81 and 82 are respectively turned off and on, and electric current runs through output resistor 84 and emitter terminal of PNP transistor 82 to turn output-regulatory MOS-FET 40 off because operation signal $V_{S2}$ of low voltage level is applied to gate terminal of MOS-FET 40. Configurations other than the above is substantially similar to those in the DC-DC converter shown in FIG. 35.

When first main MOS-FET 1 is turned on, electric current $I_{Q1}$ goes from DC power source 3 through current resonance capacitor 4, leakage inductance 5d and primary winding 5a of transformer 5 and first main MOS-FET 1, while voltage is induced on primary winding 5a of transformer 5 and simultaneously voltage $V_{T22}$ of positive polarity shown in FIG. 21 (A) is also induced on second secondary winding 5c. Voltage $V_{T22}$ induced on second secondary winding 5c is applied to second rectifying smoother 17, and voltage change detector 42 in output control circuit 41 discerns rising pulse of voltage $V_{T22}$. At this time, voltage of positive polarity is derived at branched junction of dividing resistors 71 and 72 to bias diode 73 in the adverse direction while electric current flows through base and emitter terminals of detection transistor 74 so that detection transistor 74 is turned on to make first detection signal $V_{TD}$ at collector terminal of detection transistor 74. This ensures electric charge of accumulation capacitor 77 with electric current flowing from smoothing capacitor 70 through charge resistor 78 and detection transistor 74 to produce first accumulation output signal $V_{CW1}$ shown in FIG. 21 (B) at junction of accumulation capacitor 77 and charge resistor 78. In this case, as shown by a solid line in FIG. 21 (B), charge voltage $V_{CW}$ on accumulation capacitor 77 exponentially decreases with time course, and is applied to inverted input terminal − of comparator 76. On the other hand, second output voltage detector 43 picks out voltage $V_{O2}$ on second output smoothing capacitor 16, and shunt regulator 64 controls detection voltage on branched junction of dividing resistors 62 and 63 and second output voltage value in a predetermined manner to produce at junction of two resistors 65 and 66 second error signal $V_{E2}$, the different between detected voltage $V_{O2}$ and reference voltage $V_{R2}$ from shunt regulator 64, and therefore, control electric current flowing through light emitter 68a of photo-coupler 68. Thus, electric current controlled by second error signal $V_{E2}$ flows through light receiver 68b of photo-coupler 68, and error voltage $V_{PC}$ is applied to non-inverted input terminal + of comparator 76 from junction of current limiting resistor 80 and light receiver 68b of photo-coupler 68 while the level of error voltage $V_{PC}$ is variable as shown by a dotted line in FIG. 21 (B) in response to the level of voltage $V_{O2}$ on second output smoothing capacitor 16.

When charged voltage $V_{CW}$ on accumulation capacitor 77 applied on inverted input terminal − of comparator 76 comes up to error voltage $V_{PC}$ applied on non-inverted input terminal + at a point $t_{ON}$ in time of FIG. 21 (B), comparator 76 inverts the output voltage $V_{PT}$ from low to high voltage level to turn NPN and PNP transistors 81 and 82 in drive circuit 46 respectively on and off. Therefore, operation signal $V_{S2}$ of high voltage level shown in FIG. 21 (C) is applied through output resistor 84 to gate terminal of output-regulatory MOS-FET 40 to switch it from off to on. At this moment, as shown in FIGS. 21 (D) and (E), drain-source voltage $V_{Q3}$ of output-regulatory MOS-FET 40 drops to approximately zero (volt) to allow sinusoidal electric current $I_{Q3}$ to begin flowing through output-regulatory MOS-FET 40.

Then, when first main MOS-FET 1 is turned off, voltage $V_{T22}$ of negative polarity shown in FIG. 21 (A) is induced on second secondary winding 5c and directed to second rectifying smoother 17 and voltage change detector 42. When voltage change detector 42 detects falling pulse of voltage $V_{T22}$, voltage of negative polarity is induced at junction of dividing resistors 71 and 77 to bias diode 73 in the forward direction, therefore cut off electric current flowing through base and emitter terminals of detection transistor 74, turn it off and produce second detection signal $V_{TD}$ at collector terminal of transistor 74. Consequently, discharge current flows through discharge resistor 75 and diode 79 to discharge accumulation capacitor 77 and thereby create second accumulation output signal $V_{CW2}$ shown in FIG. 21 (B) at junction of accumulation capacitor 77 and discharge diode 79. As shown by a solid line in FIG. 21 (B), second accumulation output signal $V_{CW2}$ is a voltage exponentially increasing with time course and impressed on inverted input terminal − of comparator 76. In another aspect, voltage $V_{T22}$ of negative polarity is induced on second secondary winding 5c to bias second output rectifying diode 15 in the adverse direction so that sinusoidal electric current $I_{Q3}$ flowing through output-regulatory MOS-FET 40 is cut off to nearly zero as shown in FIG. 21 (E).

Thereafter, when discharge voltage $V_{CW}$ on accumulation capacitor 77 and applied on inverted input terminal − of comparator 76, becomes equal to error voltage $V_{PC}$ applied to non-inverted input terminal + of comparator 76 at a point $t_{OFF}$ as shown in FIG. 21 (B), comparator 76 inverts output signal $V_{PT}$ to low voltage level to turn NPN and PNP transistors 81 and 82 respectively off and on so that operation signal $V_{S2}$ of low voltage level shown in FIG. 21 (C) is forwarded through output resistor 84 to gate terminal of output-regulatory MOS-FET 40 which therefore is switched from on to off. At this time, as shown in FIG. 21 (D), drain-source voltage $V_{Q3}$ of output-regulatory MOS-FET 40 increases from zero (volt) to a high level. In this way, when a predetermined period of time has elapsed after voltage change detector 42 in output control circuit 41 detects falling pulse in voltage $V_{T22}$ on second secondary winding 5c of transformer 5, second output rectifying diode 15 is biased in the adverse direction to cut off sinusoidal electric current $I_{Q3}$ flowing through output-regulatory MOS-FET 40 to approximately zero, and afterward, operation signal $V_{S2}$ of low voltage level turns output-regulatory MOS-FET 40 off for perfect zero current switching.

As above-mentioned, PWM controller 44 switches output-regulatory MOS-FET 40 from off to on at a point $t_{ON}$ and from on to off at a point $t_{OFF}$. Point $t_{ON}$ is the time when charged voltage $V_{CW}$ on accumulation capacitor 77 reaches error voltage $V_{PC}$ of light receiver 68b of photo-coupler 68 after first main MOS-FET 1 is turned on. Point $t_{OFF}$ is the time when discharged voltage $V_{CW}$ on accumulation capacitor 77 becomes equal to error voltage $V_{PC}$ on light receiver 68b of photo-coupler 68 after first main MOS-FET 1 is turned off. When voltage $V_{O2}$ on second output smoothing capacitor 16 is higher than reference voltage $V_{R2}$ on shunt regulator 64, level of error voltage $V_{PC}$ on light receiver 68b of photo-coupler 68 becomes low. Accordingly, the point $t_{ON}$ of charged voltage $V_{CW}$ on accumulation capacitor 77 reaching error voltage $V_{PC}$ on light receiver 68b of photo-coupler 68 is delayed or retarded, and the point $t_{OFF}$ of discharged voltage $V_{CW}$ on accumulation capacitor 77 becoming equal to error voltage $V_{PC}$ on light receiver 68b of photo-coupler 68 is quickened or accelerated. Thus, output control circuit 41 produces operation signal $V_{S2}$ of narrowed pulse width to gate terminal of output-regulatory MOS-FET 40 to shorten the on-period of output-regulatory MOS-FET 40 so that the period of time is reduced to let electric current flow through second output smoothing capacitor 16 in second rectifying smoother 17 while lowering voltage $V_{O2}$ on second output smoothing capacitor 16.

To the contrary, when voltage $V_{O2}$ on second output smoothing capacitor 16 is lower than reference voltage $V_{R2}$ on shunt regulator 64, level of error voltage $V_{PC}$ on light receiver 68b of photo-coupler 68 becomes high. Accordingly, the point $t_{ON}$ of charged voltage $V_{CW}$ on accumulation capacitor 77 reaching error voltage $V_{PC}$ on light receiver 68b of photo-coupler 68 is accelerated, and the point $t_{OFF}$ of discharged voltage $V_{CW}$ on accumulation capacitor 77 becoming equal to error voltage $V_{PC}$ on light receiver 68b of photo-coupler 68 is delayed. Thus, output control circuit 41 produces operation signal $V_{S2}$ of widened pulse width to gate terminal of output-regulatory MOS-FET 40 to extend the on-period of output-regulatory MOS-FET 40 so that the period of time is prolonged to let electric current flow through second output smoothing capacitor 16 in second rectifying smoother 17 while elevating voltage $V_{O2}$ on second output smoothing capacitor 16. In this way, output control circuit 41 can control the on-period of output-regulatory MOS-FET 40 in response to the level of voltage $V_{O2}$ on second output smoothing capacitor 16 in second rectifying smoother 17 to take second DC output voltage $V_{O2}$ of approximately constant level from second DC output terminals 18 and 19. Basic operation other than the above in the twelfth embodiment shown in FIG. 19 is substantially analogous to that of the DC-DC converter shown in FIG. 1.

In the twelfth embodiment shown in FIG. 19, voltage change detector 42 senses rising pulse in excitation voltage $V_{T22}$ in second secondary winding 5c when first main MOS-FET 1 is turned on to produce first detection signal $V_{TD}$. Then, at the time $t_{ON}$ charged voltage $V_{CW}$ on accumulation capacitor 77 in PWM controller 44 has reached error voltage $V_{PC}$ on light receiver 68b of photo-coupler 68, output-regulatory MOS-FET 40 is turned on to send resonance current as load current through second secondary winding 5c of transformer 5.

As excitation current through first main MOS-FET 1 is blocked when first main MOS-FET 1 is turned off, voltage change detector 42 detects falling pulse of voltage $V_{T22}$ on second secondary winding 5c of transformer 5 to produce second detection signal $V_{TD}$. Voltage $V_{T22}$ of negative polarity induced on second secondary winding 5c cuts off sinusoidal current $I_{Q3}$ through output-regulatory MOS-FET 40 to zero level. After electric current $I_{Q3}$ through second secondary winding 5c fully drops to zero, output-regulatory MOS- FET 40 is turned off at the point $t_{OFF}$ when discharge voltage $V_{CW}$ on accumulation capacitor 77 becomes equal to error voltage $V_{PC}$ on light receiver 68b of photo-coupler 68 to accomplish zero current switching (ZCS) of output-regulatory MOS-FET 40. Thus, the switching operation of output-regulatory MOS-FET 40 is substantially synchronous with switching operation of first main MOS-FET 1 without independent switching operation of output-regulatory MOS-FET 40 to reduce switching loss in MOS-FET 40. Even though switching current increases upon turning-off of first main MOS-FET 1, power loss associated with cutoff of resonance current is of a substantially similar level to that in prior art converter, and as increase in switching loss thereby would be very little, power conversion efficiency can be extremely improved in the current resonant DC-DC converter of multi-output type according to the present invention.

When first main MOS-FET 1 is turned on, excitation current flows from DC power source 3 through primary winding 5a of transformer 5 and first or second main MOS-FET 1 or 2 to derive excitation voltage on first and second secondary windings 5b and 5c of transformer 5. The excitation voltage simultaneously appears on each winding 5a, 5b and 5c of transformer 5, and any of excitation voltage can be measured. For example, voltage change detector 42 connected to second secondary winding 5c detects rising pulse of voltage $V_{T22}$ on second secondary winding 5c to produce first detection signal $V_{TD}$, and subsequently, PWM controller 44 turns output-regulatory MOS-FET 40 on to send resonance current as load current through second secondary winding 5c. When first main MOS-FET 1 is turned off, excitation current through first main MOS-FET 1 is interrupted, and voltage change detector 42 detects falling pulse of voltage $V_{T22}$ on second secondary winding 5c of transformer 5 to produce second detection signal $V_{TD}$. Then, PWM controller 44 turns output-regulatory MOS-FET 40 off.

In this manner, output-regulatory MOS-FET 40 is turned off for zero current switching (ZCS) after electric current $I_{Q3}$ through second secondary winding 5c is fully decreased. Avoiding independent switching operation of output-regulatory MOS-FET 40, it is essentially synchronized with switching operation of first or second main MOS-FET 1 or 2 while diminishing switching loss in output-regulatory MOS-FET 40. In this case, although switching current increases upon turning-off of first or second main MOS-FET 1 or 2, power loss incurred upon switching of resonance current by first or second main MOS-FET 1 or 2 would be of nearly same level as that in prior art converter, with very little increase of switching loss in first or second main MOS-FET 1 or 2 and totally remarkable improvement in power conversion efficiency can be obtained in the DC-DC converter according to the present invention.

One of the features according to the present invention is in switching operation of output-regulatory MOS-FET in secondary side substantially synchronously with switching operation of a switching element in primary side for reduction in switching loss of output-regulatory MOS-FET. Also, changing of switching element from on to off in primary side provides very little increase in switching loss for generally significant improvement in power conversion efficiency of the DC-DC converter.

The DC-DC converter shown in FIG. 19 may be modified in various ways. By way of example, the DC-DC converter shown in FIG. 22 according to a thirteenth embodiment of the invention, includes a variation by movement of the connected location of output-regulatory MOS-FET 40 between second output rectifying diode 15 and second output smoothing capacitor 16 in second rectifying smoother 17. Circuitry other than the above is substantially similar to that in the DC-DC converter shown in FIG. 19. Also, operation of the converter shown in FIG. 22 is essentially similar to that in the converter shown in FIG. 19.

Figure 22:
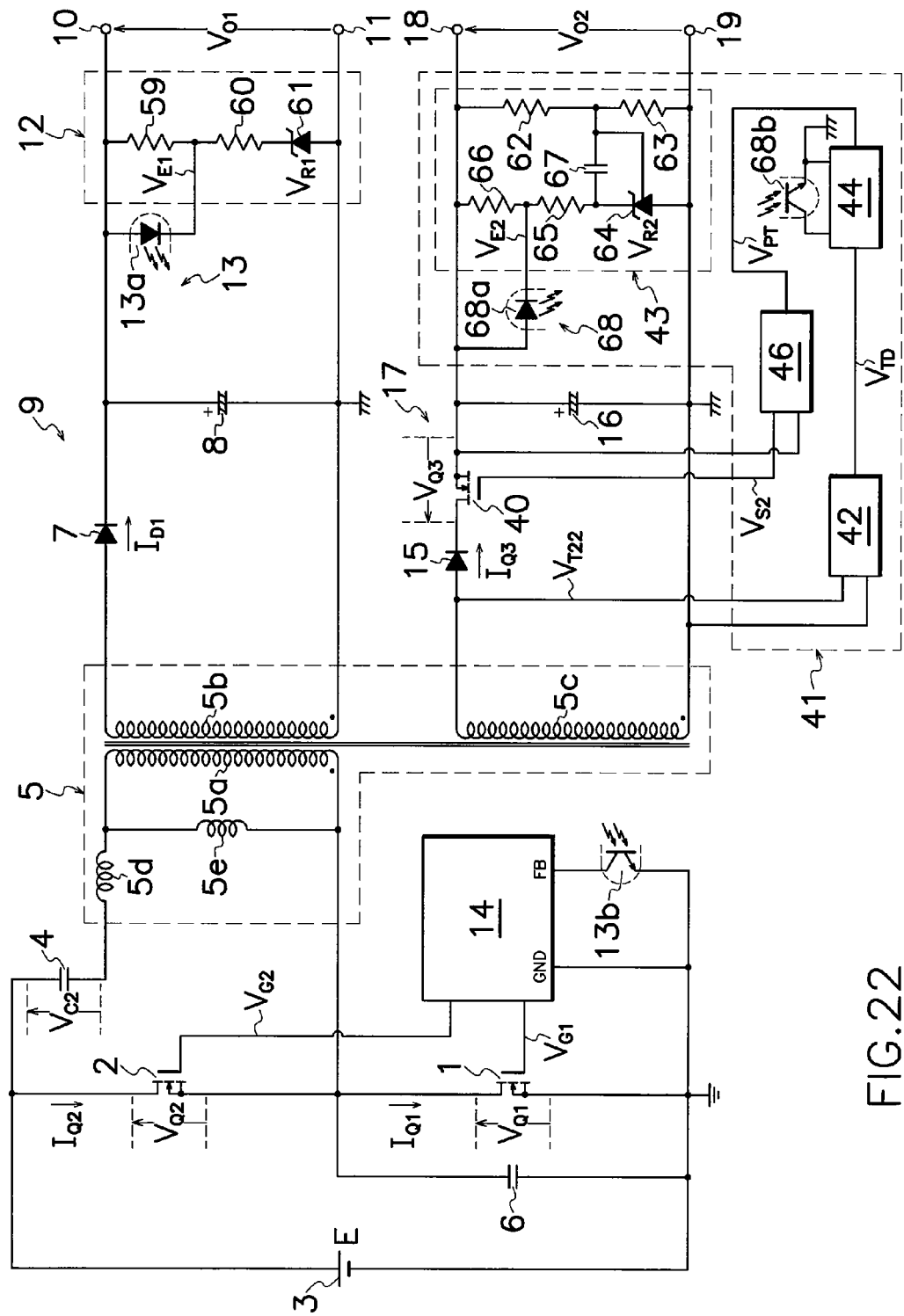
FIG. 22 An electric circuit diagram showing a thirteenth embodiment of the present invention.

As with the converter shown in FIG. 19, in FIG. 22, after voltage change detector 42 detects rising pulse in excitation voltage $V_{T22}$ on second secondary winding 5c of transformer 5 during the on-period of first main MOS-FET 1, output control circuit 41 turns output-regulatory MOS-FET 40 on at point $t_{ON}$ when charge voltage $V_{CW}$ on accumulation capacitor 77 has come up to error voltage $V_{PC}$ on light receiver 68b of photo-coupler 68 to send resonance current as load current through second secondary winding 5c of transformer 5. Also, voltage change detector 42 detects falling pulse of voltage $V_{T22}$ on second secondary winding 5c when first main MOS-FET 1 is turned off, and after negative voltage $V_{T22}$ is induced on second secondary winding 5c, output control circuit 41 switches output-regulatory MOS-FET 40 off at point $t_{OFF}$ when discharge voltage $V_{CW}$ on accumulation capacitor 77 becomes equal to error voltage $V_{PC}$ on light receiver 68b of photo-coupler 68. Accordingly, after electric current $I_{Q3}$ through second secondary winding 5c is fully reduced to zero, output-regulatory MOS-FET 40 can be turned off for zero current switching of MOS-FET 40. Thus, similarly to the twelfth embodiment, the thirteenth embodiment can control switching loss of output-regulatory MOS-FET 40 for totally significant improvement in power conversion efficiency of the converter.

Figure 23:
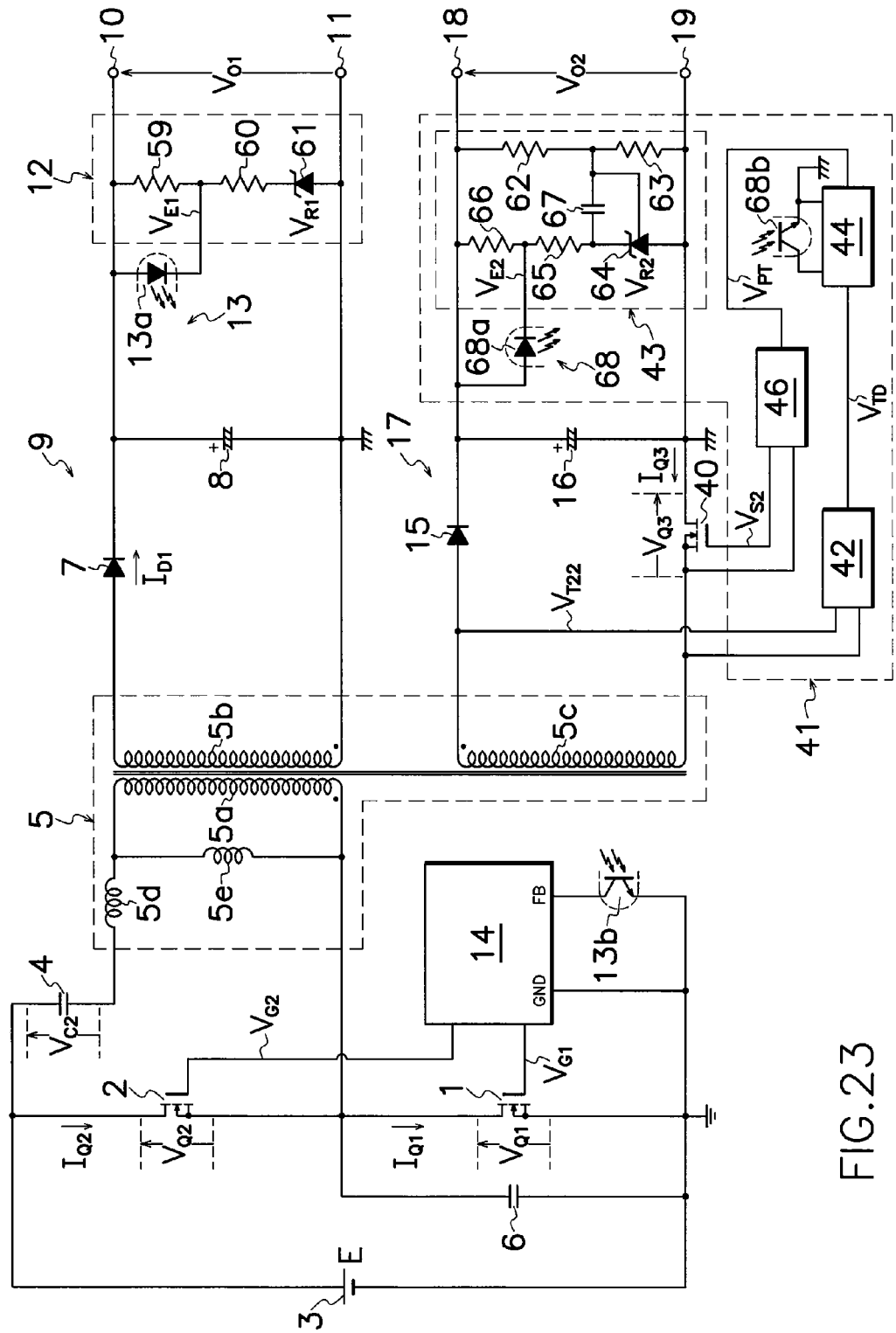
FIG. 23 An electric circuit diagram showing a fourteenth embodiment of the present invention.

Second secondary winding 5c of a fourteenth embodiment shown in FIG. 23 is inverted in polarity from that in FIG. 19. Therefore, the fourteenth embodiment is designed such that voltage change detector 42 detects rising pulse in excitation voltage $V_{T22}$ on second secondary winding 5c upon turning-on of second main MOS-FET 2 to produce first detection signal $V_{TD}$, and then, output control circuit 41 switches output-regulatory MOS-FET 40 on at point $t_{ON}$ when charged voltage $V_{CW}$ on accumulation capacitor 77 in PWM controller 44 has reached error voltage $V_{PC}$ on light receiver 68b of photo-coupler 68. In addition, when second main MOS-FET 2 is turned off, voltage change detector 42 detects falling pulse in voltage $V_{T22}$ on second secondary winding 5c to produce second detection signal $V_{TD}$, and then, output control circuit 41 switches output-regulatory MOS-FET 40 off at point $t_{OFF}$ when discharge voltage $V_{CW}$ on accumulation capacitor 77 has become error voltage $V_{PC}$ on light receiver 68b of photo-coupler 68. Circuitry other than the above is similar to that in the converter of the first embodiment. Also, operation other than the above in the converter shown in FIG. 23 is substantially similar to that in the converter shown in FIG. 19.

In the fourteenth embodiment, after voltage change detector 42 detects rising pulse in excitation voltage $V_{T22}$ on second secondary winding 5c upon turning-on of second main MOS-FET 2, output control circuit 41 switches output-regulatory MOS-FET 40 on at point $t_{ON}$ when charged voltage $V_{CW}$ on accumulation capacitor 77 in PWM controller 44 reaches error voltage $V_{PC}$ on light receiver 68b of photo-coupler 68 to send resonance current as load current through second secondary winding 5c of transformer 5. Also, after voltage change detector 42 detects falling pulse in voltage $V_{T22}$ on second secondary winding 5c upon turning-off of second main MOS-FET 2, output control circuit 41 switches output-regulatory MOS-FET 40 off at point $t_{OFF}$ when discharge voltage $V_{CW}$ on accumulation capacitor 77 in PWM control circuit 44 has become equal to error voltage $V_{PC}$ on light receiver 68b of photo-coupler 68. Thus, after electric current $I_{Q3}$ through second secondary winding 5c of transformer 5 is lowered well to zero, output control circuit 41 turns output-regulatory MOS-FET 40 off for zero current switching of MOS-FET 40. In this way, as switching loss in output-regulatory MOS-FET 40 can be reduced, the embodiment shown in FIG. 14 can considerably and comprehensively improve the power conversion efficiency of the DC-DC converter.

Moreover, in the fourteenth embodiment, stable first DC output voltage $V_{O1}$ can be taken from first secondary winding 5b through first rectifying smoother 9 during the on-period of first main MOS-FET 1, and second DC output voltage $V_{O2}$ can be taken from second secondary winding 5c through second rectifying smoother 17 during the on-period of second main MOS-FET 2 while the value of second DC output voltage $V_{O2}$ is controlled by the on-off operation of output-regulatory MOS-FET 40. Accordingly, the fourteenth embodiment is superior in more efficient operation to the twelfth and thirteenth embodiments for concurrently producing first and second DC output voltages $V_{O1}$ and $V_{O2}$ during the on-period of first main MOS-FET 1.

Figure 24:
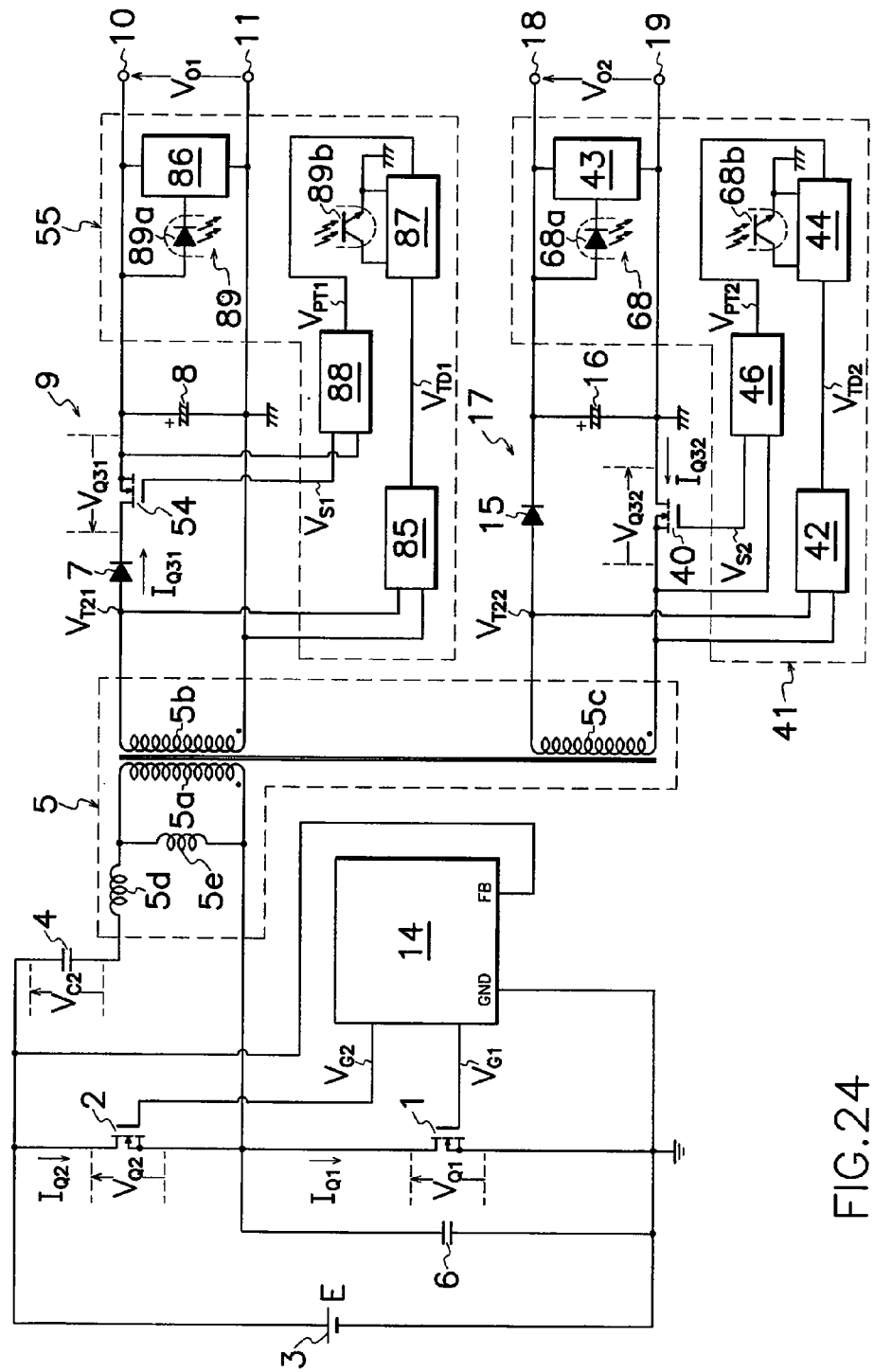
FIG. 24 An electric circuit diagram showing a fifteenth embodiment of the present invention.

FIG. 24 shows a fifteenth embodiment of the DC-DC converter according to the present invention wherein first output voltage detector 12 and photo-coupler 13 shown in FIG. 19 are omitted; control mode is changed to that for controlling the on-off operation of first and second main MOS-FETs 1 and 2 based on fluctuation of input voltage E from DC power source 3; second output-regulatory MOS-FET 54 is connected between cathode terminal of first output rectifying diode 7 and first output smoothing capacitor 8; and a second output control circuit 55 is connected between first DC output terminals 10 and 11 and gate terminal of second output-regulatory MOS-FET 54 for controlling the on-off operation of second output-regulatory MOS-FET 54 based on the level of voltage $V_{O1}$ on first output smoothing capacitor 8.

Main control circuit 14 shown in FIG. 24 can control on-duty of first main MOS-FET 1 by varying the on-period of second main MOS-FET 2 based on fluctuation in input voltage E from DC power source 3 with a fixed on-period of first main MOS-FET 1. Second output control circuit 55 comprises a second voltage change detector 85 for detecting rising and falling pulses in voltage $V_{T21}$ on first secondary winding 5b of transformer 5 to produce respectively first and second detection signals $V_{TD1}$, a third output voltage detector 86 for detecting voltage $V_{O1}$ on first output smoothing capacitor 8 in first rectifying smoother 9 to produce a detection signal and comparing the detection signal with a reference voltage $V_{R1}$ for prescribing first output voltage value to produce a first error signal $V_{E1}$, the difference between the detection signal and reference voltage $V_{R1}$, a second PWM controller 87 for producing output signals $V_{PT1}$ to turn second output-regulatory MOS-FET 54 on after second voltage change detector 85 produces first detection signal $V_{TD1}$ and turn second output-regulatory MOS-FET 54 off after second voltage change detector 85 produces second detection signal $V_{TD1}$, a second drive circuit 88 for producing second operation signal $V_{S1}$ to gate terminal of second output-regulatory MOS-FET 54 pursuant to an output signal $V_{PT1}$ from second PWM controller 87, and a photo-coupler 89 having a light emitter 89a and a light receiver 89b for transmitting therethrough first error signal $V_{E1}$ to second PWM controller 87. Detailed construction in each circuit 85 to 89 in second output control circuit 55 is similar to that in each circuit 42 to 44, 46 and 68 in output control circuit 41 shown in FIG. 20. Configuration other than the above is generally similar to that in the DC-DC converter shown in FIG. 19.

The DC-DC converter shown in FIG. 24 is substantially similar to that shown in FIG. 19 except maintaining constant first DC output voltage $V_{O1}$ by controlling the on-off operation of second output-regulatory MOS-FET 54 by second output control circuit 55 based on the level of voltage $V_{O1}$ on first output smoothing capacitor 8.

In FIG. 24, upon turning-on of first main MOS-FET 1, each voltage change detectors 85, 42 detect each rising pulse in excitation voltages $V_{T21}$ and $V_{T22}$ on first and second secondary windings 5b and 5c of transformer 5 to produce first and second detection signals $V_{TD1}$ and $V_{TD2}$, and then output control circuits 41 and 55 turn output-regulatory MOS-FETs 40 and 54 on at point $t_{ON}$ when charge voltage $V_{CW}$ on accumulation capacitor 77 in PWM controllers 87 and 44 reach error voltage $V_{PC}$ on light receivers 89b and 68b of photo-couplers 89 and 68 so that resonance current as load current flows through first and second secondary windings 5b and 5c of transformer 5. In addition, during the off-period of first main MOS-FET 1, voltage change detectors 85 and 42 detect falling pulses in voltages $V_{T21}$ and $V_{T22}$ on first and second secondary windings 5b and 5c of transformer 5 to produce second detection signals $V_{TD1}$ and $V_{TD2}$, and then output control circuits 41 and 55 turn output-regulatory MOS-FETs 40 and 54 off at point $t_{OFF}$ when discharge voltage $V_{CW}$ on accumulation capacitor 77 in PWM controllers 87 and 44 reaches error voltage $V_{PC}$ on light receivers 89b and 68b of photo-couplers 89 and 68. In this way, output control circuits 41 and 55 turn each output-regulatory MOS-FETs 40 and 54 off after electric currents $I_{Q31}$ and $I_{Q32}$ through first and second secondary windings 5b and 5c of transformer 5 sufficiently decrease to zero, and therefore, zero current switching of each output-regulatory MOS-FETs 40 and 54 can be accomplished. Accordingly, the converter can reduce switching loss in each output-regulatory MOS-FETs 40 and 54 and comprehensively and greatly improve power conversion efficiency of the converter.

The converter shown in FIG. 24 can be operated with almost no change in the period of supplying electric power from primary to secondary side of transformer 5 even under fluctuation in load connected to first and second DC output terminals 10, 11 and 18, 19, and main control circuit 14 can turn first and second main MOS-FETs 1 and 2 on and off based on fluctuation in input voltage E from DC power source 3 to maintain voltage on primary winding 5a of transformer 5 at a constant level. In this way, output control circuits 41 and 55 can separately control the on-off operation of output-regulatory MOS-FETs 40 and 54 in first and second rectifying smoothers 9 and 17 based on respectively output voltages $V_{O1}$ and $V_{O2}$ to produce from first and second DC output terminals 10, 11 and 18, 19 first and second DC output voltage $V_{O1}$ and $V_{O2}$ of different levels from each other. Also, secondary DC output circuits may comprise electric components of same or similar kind or type to cut down the number of components for reduction in manufacturing cost and improvement in maintenance and compatibility of components.

Figure 25:
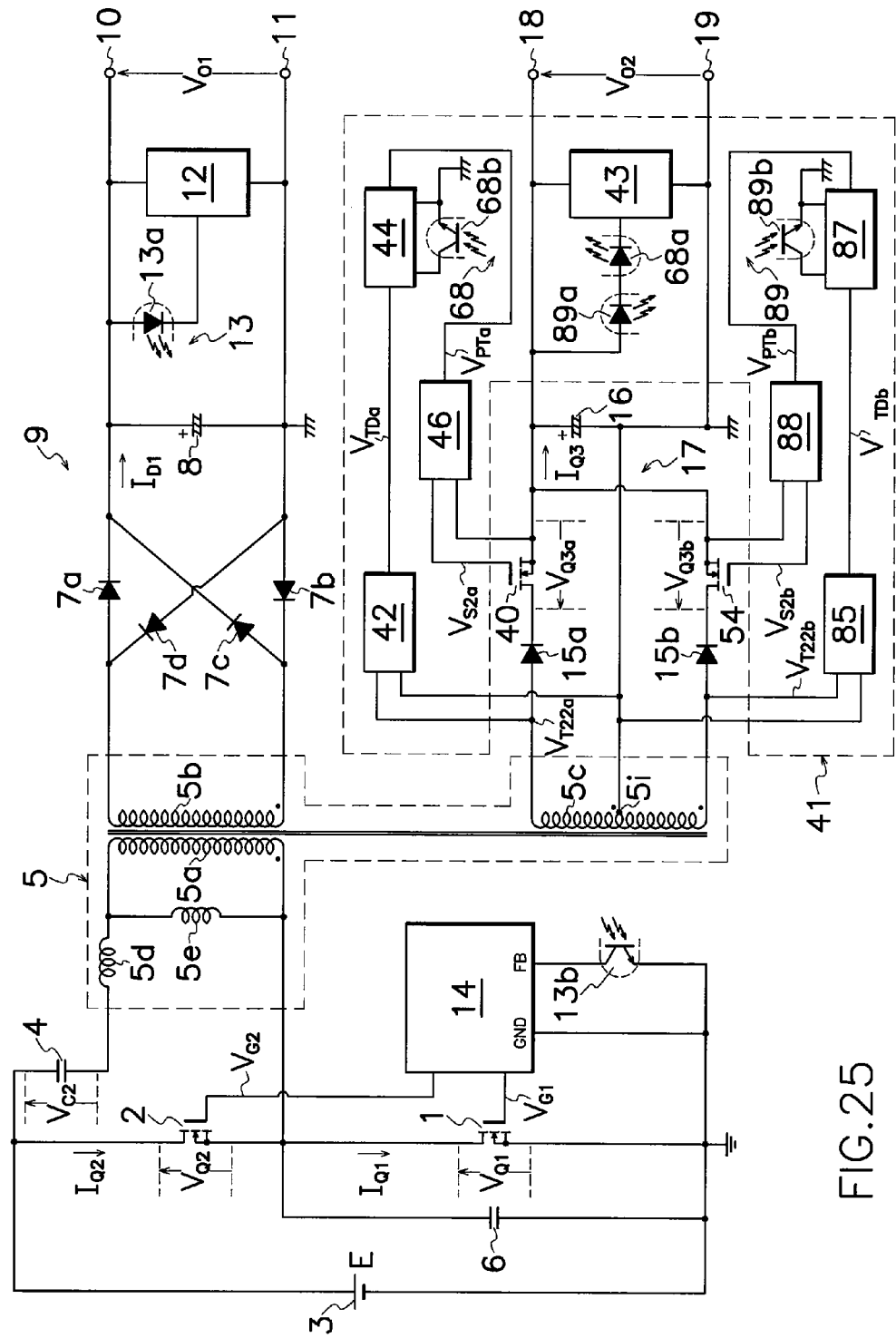
FIG. 25 An electric circuit diagram showing a sixteenth embodiment of the present invention.

The twelfth to fifteenth embodiments utilize each secondary rectifying smoother 9 and 17 of half wave rectification which include one output rectifying diode 7 and 17 and one output smoother 8 and 16, but alternatively, it may utilize rectifying smoothers of double or full wave rectification. For instance, FIG. 25 illustrates a sixteenth embodiment of the current resonant DC-DC converter of multi-output type which has alterations wherein first rectifying smoother 9 in the first embodiment is modified to full wave rectification by connecting four first output rectifying diodes 7a to 7d in bridge connection between first secondary winding 5b of transformer 5 and first output smoothing capacitor 8 shown in FIG. 19; an intermediate tap 5i is provided at a center of second secondary winding 5c of transformer 5 shown in FIG.

19; a pair of second output rectifying diodes 15a and 15b are connected at opposite ends of second secondary winding 5c; second output smoothing capacitor 16 is connected to cathode terminals of second output rectifying diodes 15a and 15b and intermediate tap 5i of second secondary winding 5c to modify second rectifying smoother 17 shown in FIG. 19 to a double wave rectification type; output-regulatory MOS-FET 40 is connected between one second output rectifying diode 15a and second output smoothing capacitor 16 in second rectifying smoother 17; and second output-regulatory MOS-FET 54 is connected between the other second output rectifying diode 15b and second output smoothing capacitor 16.

Main control circuit 14 alternately turns first and second main MOS-FETs 1 and 2 on and off with 50% duty-ratio. Also, output control circuit 41 shown in FIG. 25 comprises a second voltage change detector 85 for detecting rising or falling pulse in voltage $V_{T22b}$ appearing between bottom end of second secondary winding 5c and intermediate tap 5i to produce first or second detection signal $V_{TBb}$, a second PWM controller 87 for producing output signals $V_{PTb}$ to turn second output-regulatory MOS-FET 54 on or off after second voltage change detector 85 produces first or second detection signal $V_{TDb}$; a second drive circuit 88 for producing second operation signal $V_{S2b}$ to gate terminal of second output-regulatory MOS-FET 54 in response to output signal $V_{PTb}$ from second PWM controller 87, and a photo-coupler 89 having a light emitter 89a and a light receiver 89b for transmitting error signal $V_{E2}$ from second output voltage detector 43 therethrough to second PWM controller 87. Each detailed circuitry in second voltage change detector 85, second PWM controller 87 and second drive circuit 88 is substantially similar to the circuits 42, 44 and 46 corresponding to output control circuit 41 shown in FIG. 20, and configurations other than the above is substantially similar to those in the DC-DC converter shown in FIG. 19.

The converter of the sixteenth embodiment is designed such that AC voltage occurring on opposite ends of first secondary winding 5b of transformer 5 is rectified for full wave through first four output rectifying diodes 7a to 7d in bridge connection to produce smoothed first DC output voltage $V_{O1}$ through first output smoothing capacitor 8 and first DC output terminals 10 and 11.

Upon turning-on of first main MOS-FET 1, positive voltage is induced at upper end of primary winding 5a of transformer 5, and positive voltage $V_{T22a}$ is induced between upper end of second secondary winding 5c and intermediate tap 5i. Voltage change detector 42 detects rising pulse in positive voltage $V_{T22a}$ to produce first detection signal $V_{TDa}$ which causes electric current to electrically charge accumulation capacitor 77 in PWM controller 44, and thereby charged voltage $V_{CW}$ on accumulation capacitor 77 is exponentially lowered with time course and applied to inverted input terminal – of comparator 76. On the other hand, voltage $V_{O2}$ on second output smoothing capacitor 16 in second rectifying smoother 17 is detected by second output voltage detector 43 in output control circuit 41 which produces a detection signal and second error signal $V_{E2}$ between the detection signal and second reference voltage $V_{R2}$ for prescribing second output voltage value to control electric current flowing through light emitter 68a and light receiver 68b of photo-coupler 68 by error signal $V_{E2}$. At this time, error voltage $V_{PC}$ whose level is varied in response to voltage $V_{O2}$ on second output smoothing capacitor 16 in second rectifying smoother 17, is applied to non-inverted input terminal + of comparator 76 through junction of current limiting resistor 80 and light receiver 68b of photo-coupler in PWM controller 44.

When charged voltage $V_{CW}$ on accumulation capacitor 77 applied to inverted input terminal – of comparator 76 in PWM controller 44 comes up to error voltage $V_{PC}$ applied to non-inverted input terminal +, comparator 76 inverts output signal $V_{PTa}$ to high voltage level. Thereby, drive circuit 46 furnishes operation signal $V_{S2a}$ of high voltage level to gate terminal of output-regulatory MOS-FET 40 to turn it from off to on. At this moment, drain-source voltage $V_{Q3a}$ of output-regulatory MOS-FET 40 becomes approximately zero volt to allow sinusoidal current $I_{Q3}$ to start flowing through output-regulatory MOS-FET 40.

Then, when first main MOS-FET 1 is turned from on to off, negative voltage $V_{T22a}$ appears between upper end of second secondary winding 5c and intermediate tap 5i of transformer 5. Voltage change detector 42 in output control circuit 41 detects falling pulse in negative voltage $V_{T22a}$ to produce second detection signal $V_{TDa}$ which is applied to accumulation capacitor 77 in PWM controller 44. Accordingly, discharge voltage $V_{CW}$ on accumulation capacitor 77 exponentially increases with time course and is applied to inverted input terminal – of comparator 77. In another aspect, negative voltage $V_{T22a}$ emerges between upper end of second secondary winding 5c and intermediate tap 5i of transformer 5 to bias in the adverse direction one second output rectifying diode 15a which thereby blocks sinusoid current $I_{Q3}$ flowing through output-regulatory MOS-FET 40.

After that, when discharge voltage $V_{CW}$ on accumulation capacitor 77 applied to inverted input terminal – of comparator 76 has become equal to error voltage $V_{PC}$ applied on non-inverted input terminal +, comparator 76 inverts output signal $V_{PTa}$ to low voltage level. Then, drive circuit 46 produces operation signal $V_{S2a}$ of low voltage level to gate terminal of output-regulatory MOS-FET 40 which therefore is turned from on to off. At the time, drain-source voltage $V_{Q3a}$ of output-regulatory MOS-FET 40 increases from zero volt to high voltage level. In this way, when a certain period of time has elapsed since voltage change detector 42 in output control circuit 41 detected falling pulse in voltage $V_{T22a}$ between upper end of second secondary winding 5c and intermediate tap 5i, perfect zero current switching can be accomplished because electric current $I_{Q3}$ flowing through output-regulatory MOS-FET 40 comes up to completely zero.

When second main MOS-FET 2 is turned on, positive voltage rises at bottom end of primary winding 5a of transformer 5, and at the same time, positive voltage $V_{T22b}$ emerges between bottom end of second secondary winding 5c and intermediate tap 5i. Second voltage change detector 85 detects rising pulse of positive voltage $V_{T22b}$ to produce first detection signal $V_{TDb}$ which causes electric current to flow through accumulation capacitor 77 in second PWM controller 87 so that accumulation capacitor is electrically charged, however, charged voltage $V_{CW}$ on accumulation capacitor 77 is exponentially decreased and applied to inverted input terminal – of comparator 76. On the other hand, second output voltage detector 43 in output control circuit 41 detects voltage $V_{O2}$ on second output smoothing capacitor 16 in second rectifying smoother 17 to produce a detection signal, and compares the detection signal with second reference voltage $V_{R2}$ for prescribing second output voltage value to produce second error signal $V_{E2}$, the difference between the detection signal and second reference voltage $V_{R2}$. Since second error signal $V_{E2}$ controls electric current flowing through light emitter 89a and light receiver 89b of photo-coupler 89, error voltage $V_{PC}$, whose level is varied in response to the level of voltage $V_{O2}$ on second output smoothing capacitor 16, is applied to non-inverted input terminal + of comparator 76 through a junction between current limiting resistor 80 and light receiver 89b of photo-coupler 89 in second PWM controller 87.

When charged voltage $V_{CW}$ on accumulation capacitor 77 applied to inverted input terminal – of comparator 76 reaches error voltage $V_{PC}$ applied to non-inverted input terminal +, comparator 76 inverts output signal $V_{PTb}$ to high voltage level. Accordingly, second drive circuit 88 supplies operation signal $V_{S2b}$ of high voltage level to gate terminal of second output-regulatory MOS-FET 54 which then is turned from off to on. At the time, drain-source voltage $V_{Q3b}$ of second output-regulatory MOS-FET 54 becomes substantially zero volt, and sinusoidal electric current $I_{Q3}$ begins to flow through second output-regulatory MOS-FET 54.

When second main MOS-FET 2 is turned from on to off, negative voltage $V_{T22b}$ exists between bottom end of second secondary winding 5c and intermediate tap 5i. Second voltage change detector 85 detects falling pulse in negative voltage $V_{T22b}$ to produce second detection signal $V_{TDb}$ which causes discharge current to flow through accumulation capacitor 77 in second PWM controller 87 so that discharge voltage $V_{CW}$ on accumulation capacitor 77 exponentially increases with time course and is applied to inverted input terminal – of comparator 76. Also, due to negative voltage $V_{T22b}$ developed between bottom end of second secondary winding 5c and intermediate tap 5i, the other second output rectifying diode 15b is biased in the adverse direction to interrupt sinusoidal current $I_{Q3}$ flowing through second output-regulatory MOS-FET 54.

After that, when discharge voltage $V_{CW}$ on accumulation capacitor 77 applied on inverted input terminal – of comparator 76 has become equal to error voltage $V_{PC}$ applied to non-inverted input terminal +, comparator 76 inverts output signal $V_{PTb}$ to low voltage level. Accordingly, second drive circuit 88 produces operation signal $V_{S2b}$ of low voltage level to gate terminal of second output-regulatory MOS-FET 54 which therefore is turned from on to off. At this time, drain-source voltage $V_{Q3b}$ of second output-regulatory MOS-FET 54 rises from zero volt to high voltage level. In this way, when a certain period of time has elapsed since second voltage change detector 85 detected falling pulse in voltage $V_{T22a}$ between upper end of second secondary winding 5c and intermediate tap 5i, perfect zero current switching can be accomplished because electric current $I_{Q3}$ flowing through second output-regulatory MOS-FET 54 comes up to completely zero.

As above-mentioned, each PWM controller 44, 87 turns each output-regulatory MOS-FET 40, 54 from off to on after turning-on of first or second main MOS-FET 1, 2 and at point $t_{ON}$ when charged voltage $V_{CW}$ on accumulation capacitor 77 has reached error voltage $V_{PC}$ on light receiver 68b, 89b of photo-coupler 68, 89, and then each output-regulatory MOS-FET 40, 54 from on to off at point $t_{OFF}$ after turning-off of first or second main MOS-FET 1, 2 and at point $t_{OFF}$ when discharge voltage $V_{CW}$ on accumulation capacitor 77 has become equal to error voltage $V_{PC}$ on light receiver 68b, 89b of photo-coupler 68, 89. In other words, when voltage $V_{O2}$ on second output smoothing capacitor 16 is higher than reference voltage $V_{R2}$ on shunt regulator 64 in second output voltage detector 43, error voltage $V_{PC}$ on light receiver 68b, 89b has the low level. Accordingly, with the lower level of error voltage $V_{PC}$, the more time $t_{ON}$ is delayed when charged voltage $V_{CW}$ on accumulation capacitor 77 reaches error voltage $V_{PC}$ on light receiver 68b, 89b, and the narrower pulse width of operation signals $V_{S2a}$, $V_{S2b}$ is applied to gate terminal of each output-regulatory MOS-FET 40, 54 from output control circuit 41. Accordingly, with the shorter on-period of each output-regulatory MOS-FET 40, 54, during the shorter period of time, electric current flows through second output smoothing capacitor 16 to lower voltage $V_{O2}$ on second output smoothing capacitor 16.

On the contrary, when voltage $V_{O2}$ on second output smoothing capacitor 16 in second rectifying smoother 17 is lower than reference voltage $V_{R2}$ on shunt regulator 64 in second output voltage detector 43, error voltage $V_{PC}$ on light receiver 68b, 89b of photo-coupler 68, 89 is elevated. Accordingly, with the higher level of error voltage $V_{PC}$, the more time $t_{ON}$ is accelerated or quickened when charged voltage $V_{CW}$ on accumulation capacitor 77 reaches error voltage $V_{PC}$ on light receiver 68b, 89b, and the longer pulse width of operation signals $V_{S2a}$, $V_{S2b}$ is applied to gate terminal of each output-regulatory MOS-FET 40, 54 from output control circuit 41. Accordingly, with the longer on-period of each output-regulatory MOS-FET 40, 54, during the more extended period of time, electric current flows through second output smoothing capacitor 16 to elevate voltage $V_{O2}$ on second output smoothing capacitor 16. In this way, output control circuit 41 can control the on-period of each output-regulatory MOS-FET 40, 54 in response to the level of voltage $V_{O2}$ on second output smoothing capacitor 16 in second rectifying smoother 17, and generally certain second DC output voltage $V_{O2}$ can be taken from second DC output terminals 18, 19. Basic operation of the DC-DC converter shown in FIG. 25 is nearly similar to that in the DC-DC converter shown in FIG. 19.

Each voltage change detector 42, 85 shown in FIG. 25 picks out rising pulse in excitation voltage $V_{T22a}$, $V_{T22b}$ appearing on second secondary winding 5c when first or second main MOS-FET 1, 2 is turned on, to produce first detection signal $V_{TDa}$, $V_{TDb}$, and output control circuit 41 switches each output-regulatory MOS-FET 40, 54 at point $t_{ON}$ when charge voltage $V_{CW}$ on accumulation capacitor 77 in each PWM controller 44, 87 has reached error voltage $V_{PC}$ on light receiver 68b, 89b of photo-coupler 68, 89 to send resonance current as load current through second secondary winding 5c.

Also, when first or second main MOS-FET 1, 2 is turned from on to off, each voltage change detector 42, 85 detects falling pulse in voltage $V_{T22a}$, $V_{T22b}$ developed on second secondary winding 5c to produce second detection signal $V_{TDa}$, $V_{TDb}$, and then output control circuit 41 turns each output-regulatory MOS-FET 40, 54 off at point $t_{OFF}$ when discharge voltage $V_{CW}$ on accumulation capacitor 77 in each PWM controller 44, 87 has become equal to error voltage $V_{PC}$ on light receiver 68b, 89b of photo-coupler 68, 89. Thus, each output-regulatory MOS-FET 40, 54 can be turned off with zero current switching after electric current $I_{Q3}$ flowing through second secondary winding 5c has been fully lowered to zero. In this way, the converter shown in FIG. 25 can reduce switching loss associated with each output-regulatory MOS-FET 40, 54, and like in FIG. 19, greatly and totally improve power conversion efficiency. In addition, as the period of time of supplying electric power from primary to secondary side of transformer 5 is almost unchanged even under load fluctuation, it can present similar functions and effects to those in FIG. 19 and first and second DC output voltage $V_{O1}$, $V_{O2}$ with less ripple components in case of utilizing first rectifying smoother 9 of full wave rectification and second rectifying smoother 17 of double wave rectification.

Figure 26:
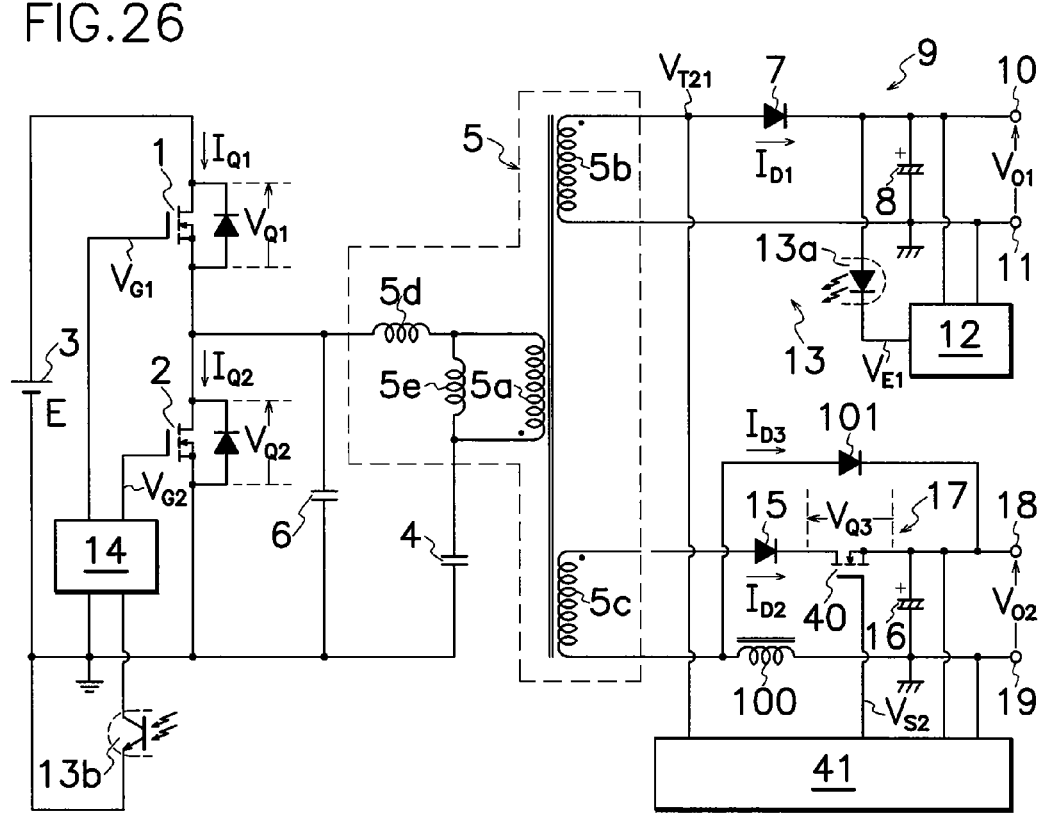
FIG. 26 An electric circuit diagram showing a seventeenth embodiment of the present invention.

In each of the foregoing embodiments, as output-regulatory MOS-FET 40 is provided in secondary side, disadvantageously electric current concentrates in specific output terminals upon turning-on of output-regulatory MOS-FET 40, and therefore, there occurs a period of time of no electric current flowing through some or one of output terminals. In particular, boost DC-DC converter of high output voltage invites higher voltage in secondary windings 5b, 5c of transformer 5 so that smoothing capacitor 16 is rapidly charged for shorter charging period with a large charging current. Accordingly, such a converter is detective in that a large electric current causes current concentration upon turn-on of output-regulatory switching element 40, thus resulting in increase in power conversion loss and deterioration in power conversion efficiency. To overcome this problem, a proposition is made to avoid current concentration in a specific output circuit by inserting an impedance element into each output circuit. However, such an impedance element gives rise to power conversion loss and less power conversion efficiency. FIG. 26 indicates a seventeenth embodiment of the present invention which includes a reactor 100 as an impedance element connected in series to second secondary winding 5c to control a peak current flowing through load during the on-period of output-regulatory MOS-FET 40 and thereby avoid current concentration to load.

The seventeenth embodiment shown in FIG. 26 comprises reactor 100 connected in series between second secondary winding 5c and output terminal 19, and a recovery diode 101 connected between a junction of second secondary winding 5c and reactor 100 and a junction of second output smoothing capacitor 16 and output terminal 18. When RSF/F 45 (FIG. 2) is operated to produce operation signal $V_{S2}$ of high voltage level from drive circuit 46 to gate terminal of output-regulatory MOS-FET 40 which therefore is turned on, negative current flows from second secondary winding 5c through second output rectifying diode 15 in second rectifying smoother 17 and second output smoothing capacitor 16 to load, while elevating voltage $V_{O2}$ on second output smoothing capacitor 16. At this time, energy is stored in reactor 100 which concurrently functions to absorb and alleviate steeply increasing current.

Figure 27:
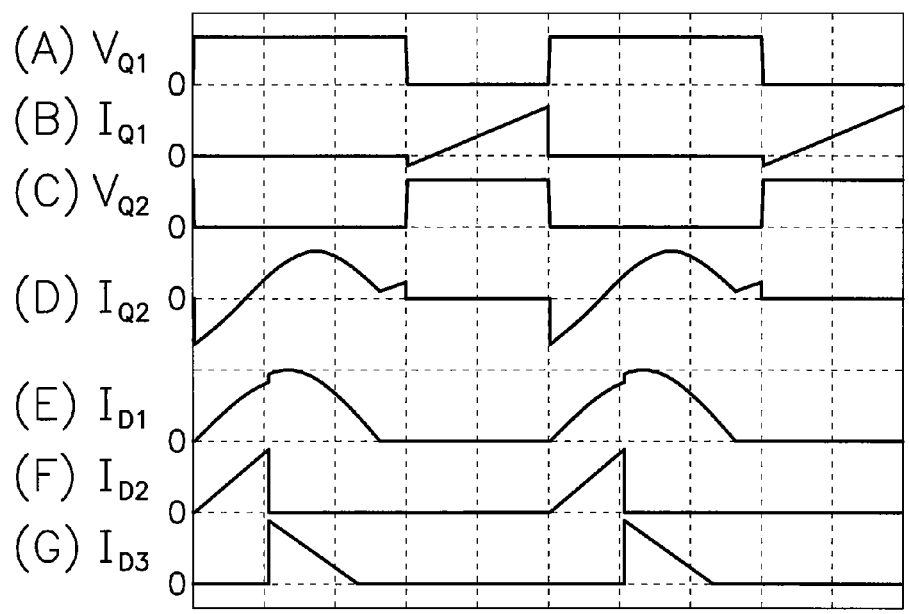
FIG. 27 A wave form chart indicating voltages and electric currents at selected locations in the circuit shown in FIG. 26.
Figure 28:
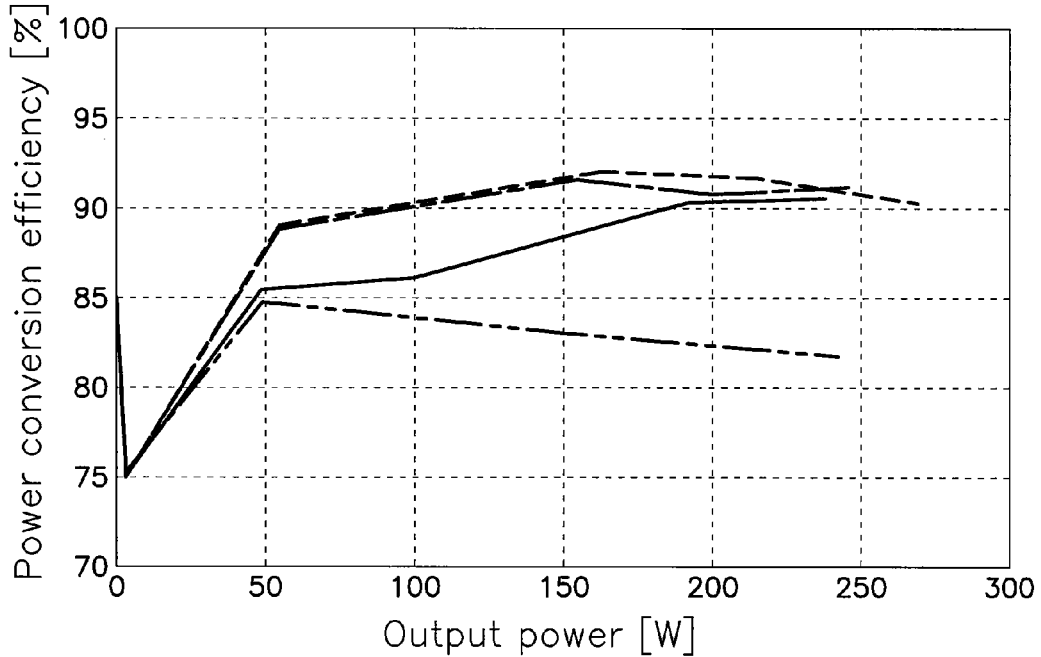
FIG. 28 A graph showing the power conversion efficiency characteristics with output power in prior art and the present invention's circuits.
Figure 29:
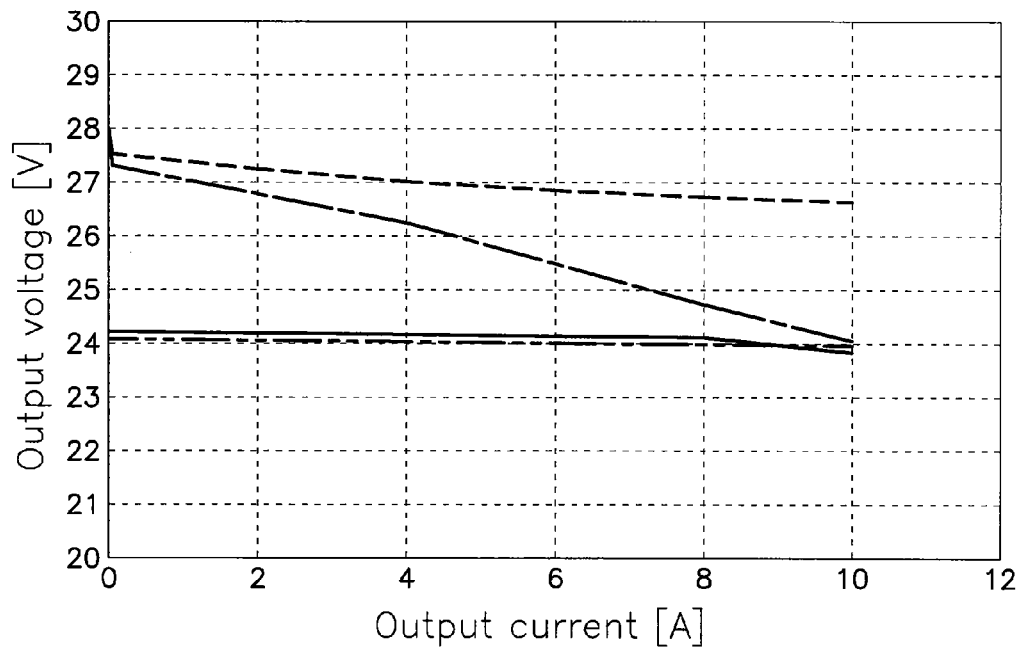
FIG. 29 A graph showing the output voltage characteristics with output current in prior art and the present invention's circuits.

During the off-period of output-regulatory MOS-FET 40, reactor 100 produces back electromotive force which is supplied to load through recovery diode 101 while reducing energy loss associated with connection of reactor 100. FIG. 27 (F) indicates electric current $I_{D2}$ flowing through second output rectifying diode 15, and electric current $I_{D2}$ has the lowered peak level and extended period of time for electric current flow without occurrence of inrush current compared with electric current $I_{D2}$ through second output rectifying diode 15 in a circuit without reactor 100 (not shown). In this embodiment, an average value of electric current $I_{D2}$ through second output rectifying diode 15 is the same as that in prior art circuits, however, existence or absence of peak current would make a big impact on power conversion loss. FIGS. 28 and 29 illustrate graphs indicating the power conversion efficiency with output power and output voltage with output current in prior art's and the present invention's circuits wherein solid lines denote the characteristics in the present invention's embodiments; the alternate long and short dash lines denote the characteristics in prior art circuits with reactor but without chopper switching element; dotted lines denote the characteristics in prior art circuits with neither chopper switching element nor reactor; and alternate long and two short dashes lines denote the characteristics in the present invention's first to sixteenth embodiments. The last circuits according to the invention's first to sixteenth embodiments indicate stable output voltages, however, they also involve higher peak current and increased power loss, and therefore, reveal the lower power conversion efficiency particularly with the more increase in output power. Prior art circuits without voltage control means shown by alternate long and short dash lines only rectify and smooth output power, and indicate lower accuracy in output voltage than that of prior art circuits shown by dotted lines without reactor, and lower output voltage with increase in output current. Although the converter in the seventeenth embodiment according to the present invention may be accompanied by some amount of power conversion degradation, it indicates considerably improved power conversion efficiency compared to the converters shown in the first to sixteenth embodiments of the invention, or in a range equal to power conversion efficiency level of the converter especially even without chopper circuit for large power output.

In the present invention, primary leakage inductance 5d of transformer 5 performs current resonance and also provides the on-off chopping operation of output-regulatory MOS-FET 40, and therefore, if producing output current under control of peak current, leakage inductance 5d connected in series to primary winding 5a of transformer 5 well performs chopping operation so that added reactor 100 may have so small inductance that can control peak current for a certain output and thereby prevent current constriction. Besides, reactor 100 that performs the same function as that of a smoothing reactor in chopper circuit, equivalently increases the inductance for chopper operation by output-regulatory MOS-FET 40 so that reactor 100 may be of extremely small size compared to inductance needed for prior art chopping operation.

When a chopper circuit is used to produce output voltage while depressing input voltage on the order of 30 volts to 24 volts, it requires inductance of approximately 100 μH (micro Henry), however, reactor 100 of 1 μH through output-regulatory MOS-FET 40 is enough for the DC-DC converter shown in FIG. 26. While it is necessary to properly select an inductance for reactor, reactor having inductance one tenth of prior art ones is satisfactory to desired characteristics for the present invention without restriction for mounting and with less power loss by winding of inductance. Accordingly, the DC-DC converter shown in FIG. 26 is beneficial without current concentration in secondary side and with repression of peak current and less degradation in power conversion efficiency.

Figure 30:
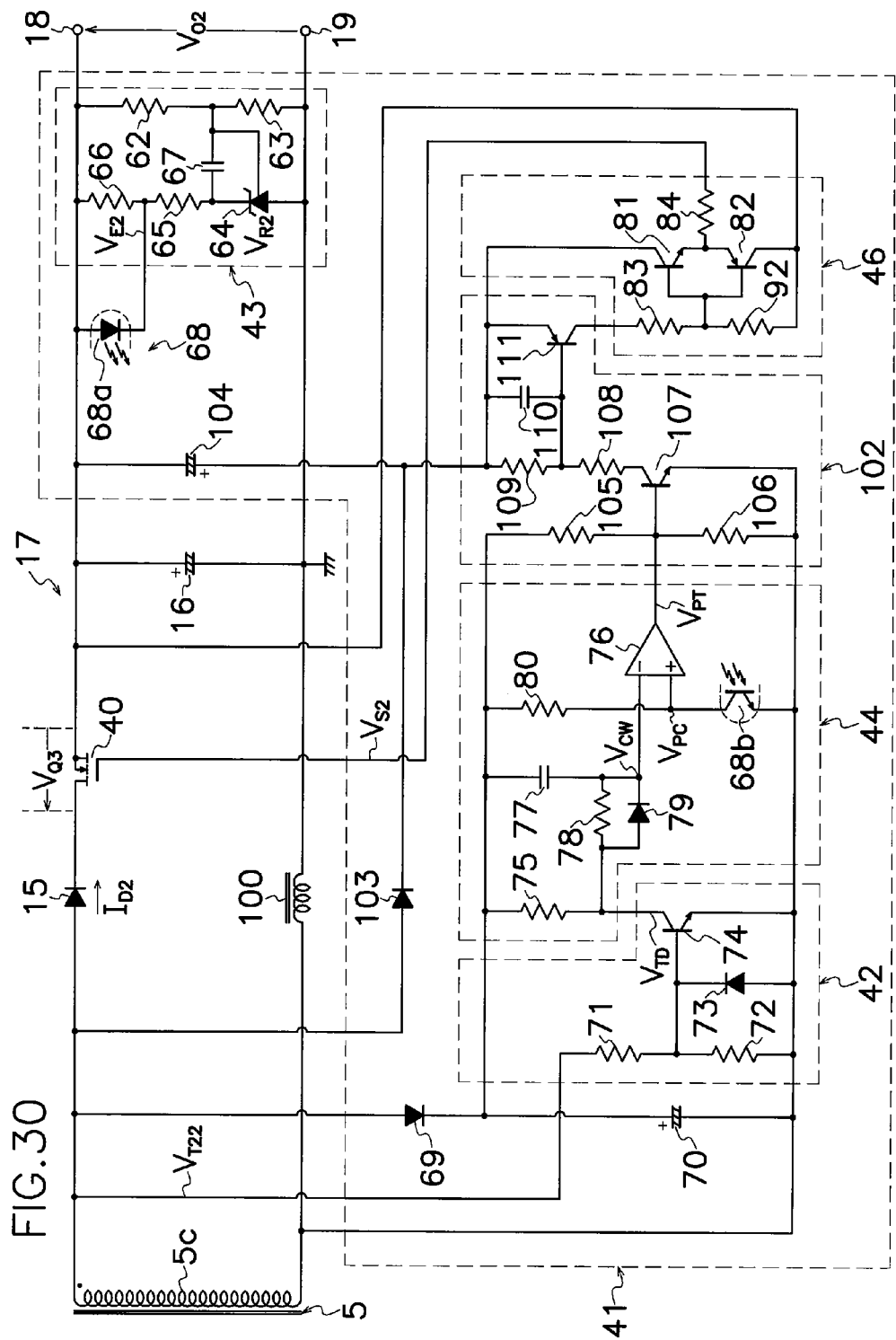
FIG. 30 An electric circuit diagram showing an eighteenth embodiment of the present invention.

Output control circuit 41 shown in FIG. 26 can be designed as shown in an eighteenth embodiment of FIG. 30 which comprises a holding circuit 102 connected between PWM controller 44 and drive circuit 46 in output control circuit 41 for maintaining output-regulatory MOS-FET 40 in the on condition until recovery current flow from reactor 100 has vanished after voltage change detector 42 produced second detection signal with deletion of recovery diode 101 shown in FIG. 26. Connected between upper end of second secondary winding 5c and upper end of second output smoothing capacitor 16 is a high side auxiliary power source which comprises an rectifying diode 103 and a smoothing capacitor 104 to supply from the opposite ends of smoothing capacitor 104 to holding circuit 102 and drive circuit 46 a DC voltage whose level is shifted toward high level by the voltage between terminals of second output smoothing capacitor 16. While drive circuit 46 is substantially similar to circuitry shown in FIG. 20, there are differences in that a base resistor 92 is connected between base and collector terminals of PNP transistor 82; collector terminal of NPN transistor 81 is connected to a junction of cathode terminal of rectifying diode 103 and smoothing capacitor 104; and collector terminal of PNP transistor 82 is connected to upper end of second output smoothing capacitor 16. Similar electric configurations to those in FIG. 20 are applied to voltage change detector 42 and PWM controller 44.

Holding circuit 102 comprises dividing resistors 105 and 106 connected in parallel to smoothing capacitor 70, a level shift transistor 107 which has a base terminal connected to a branched junction of dividing resistors 105 and 106 and an emitter terminal connected to a secondary ground terminal, charge and discharge resistors 108 and 109 connected between collector terminal of level shift transistor 107 and a junction of cathode terminal of rectifying diode 103 and smoothing capacitor 104, a hold capacitor 110 connected in parallel to discharge resistor 109, and a retardant transistor 111 which has a base terminal connected to a junction of charge and discharge resistors 108 and 109, an emitter terminal connected to a junction of a cathode terminal of rectifying diode 103 and smoothing capacitor 104. A collector terminal of retardant transistor 111 is connected to an upper end of a bias resistor 83 in drive circuit 46. Capacitance value of hold capacitor 110 is set to have the discharge time equal to the time length from discharge of hold capacitor 110 with discharge current flowing through discharge resistor 109 to cease of recovery current after completion of excitation energy release from reactor 100.

When charged voltage $V_{CW}$ on accumulation capacitor 77 in PWM controller 44 has become equal to error voltage $V_{PC}$ after voltage change detector 42 produced first detection signal $V_{TD}$, comparator 76 creates output signal $V_{PT}$ of high voltage level which is then forwarded to base terminal of level shift transistor 107 through dividing resistors 105 and 106 in holding circuit 102. Therefore, level shift transistor 107 is turned on, and voltage on smoothing capacitor 104 causes electric current to flow into and charge holding capacitor 110 through charge resistor 108 while turning retardant transistor 111 on because of electric current flowing through base-emitter terminals of retardant transistor 111. This switches NPN and PNP transistors 81 and 82 in drive circuit 46 respectively off and on to turn output-regulatory MOS-FET 40 on. At the time, electric current $I_{D2}$ flows from second secondary winding 5c of transformer 5, second output rectifying diode 15, output-regulatory MOS-FET 40, second output smoothing capacitor 16 and reactor 100 to accumulate excitation energy in reactor 100.

When voltage change detector 42 produces second detection signal $V_{TD}$ after polarity of voltage on second secondary winding 5c of transformer 5 is inverted, second output rectifying diode 15 is biased in the adverse direction to therefore cease electric supply from second secondary winding 5c of transformer 5 to second DC output terminals 18 and 19. At the moment, no voltage from second secondary winding 5c of transformer 5 is applied on reactor 100 which therefore produces back electromotive force and discharges excitation energy therefrom while recovery or regeneration current flows through a closed circuit formed of reactor 100, second secondary winding 5c of transformer 5, second output rectifying diode 15, output-regulatory MOS-FET 40 and second smoothing capacitor 16. Then, when discharge voltage $V_{CW}$ on accumulation capacitor 77 in PWM controller 44 has become equal to error voltage $V_{PC}$, comparator 76 produces output signal $V_{PT}$ of low voltage level which is given to base terminal of level shift transistor 107 through dividing resistors 105 and 106 in hold circuit 102 to turn level shift transistor 107 off so that hold capacitor 110 is discharged with discharge current through discharge resistor 109. Upon completion of discharge from holding capacitor 110 after cease of recovery current by completion of excitation energy release from reactor 100, no electric current flows between base and emitter terminals of retardant transistor 111 which therefore is turned off. Under the circumstances, NPN and PNP transistors 81 and 82 in drive circuit 46 are turned respectively off and on to switch output-regulatory MOS-FET 40 off.

In the circuit shown in FIG. 30, as holding circuit 102 retains output-regulatory MOS-FET 40 on after voltage change detector 42 generates second detection signal until recovery current from reactor 100 ceases flowing, recovery current due to release of excitation energy from reactor 100 flows through second secondary winding 5c of transformer 5, second output rectifying diode 15 and output-regulatory MOS-FET 40 to second output smoothing capacitor 16 to electrically charge second output smoothing capacitor 16. Specifically, because regeneration current from reactor 100 passes through closed circuit comprised of reactor 100, second secondary winding 5c, second output rectifying diode 15, output-regulatory MOS-FET 40 and second output smoothing capacitor 16, the converter requires no recovery diode shown in FIG. 26 and favorably serves to provide an inexpensive power source device of multi-output type in manufacture compared to that in the seventeenth embodiment. While turning-off timing of output-regulatory MOS-FET 40 is hindered by means of discharge time of holding capacitor 110, alternatively, it can be hindered by utilizing discharge resistor 75 of larger resistance in PWM controller 44 to extend discharge time of accumulation capacitor 77. In this case, resistance value of discharge resistor 75 may be set such that the time when discharge voltage $V_{CW}$ on accumulation capacitor 77 reaches error voltage $V_{PC}$ on light receiver 68b of photocoupler 68, corresponds with the time when recovery current is ceased after completion of excitation energy release from reactor 100.

Prior art DC-DC converter shown in FIG. 35 is operated to rectify, smooth and convert AC voltage induced on second secondary winding 5c into DC voltage through second rectifying smoother 17, and then reconvert it through stepdown chopper circuit 30 into second DC output voltage $V_{O2}$ lower than DC voltage entered from second rectifying smoother 17, and therefore disadvantageously a large current flows through filter reactor 28 in stepdown chopper circuit 30 with great power loss involved thereby. On the contrary, in the seventeenth and eighteenth embodiments (FIGS. 26 and 30) of the present invention, during the on-period of regulatory MOS-FET 40, electric current flows through current resonance capacitor 4, primary winding 5a, leakage inductance 5d and second main MOS-FET 2, and at the same time, concomitant current induced via transformer 5 flows through closed circuit comprised of second secondary winding 5c, second output rectifying diode 15, output-regulatory MOS-FET 40, second output smoothing capacitor 16 and reactor 100. As this concomitant current through closed circuit is restricted by leakage inductance 5d of transformer 5, reactor 100 does not need to restrict such a large electric current as that through filter reactor 28 shown in FIG. 35. Accordingly reactor 100 of much smaller inductance than filter reactor 28 of FIG. 35 can be used in reduced size with less power loss involved. In addition, during the off-period of output-regulatory MOS-FET 40, back electromotive force appearing in reactor 100 can be regenerated through recovery diode 101 (FIG. 26) or second secondary winding 5c of transformer 5, second output rectifying diode 15 and output-regulatory MOS-FET 40 (FIG. 30) to second output smoothing capacitor 16 to advantageously and greatly improve power conversion efficiency compared to prior art DC-DC converter shown in FIG. 35.

Figure 18:
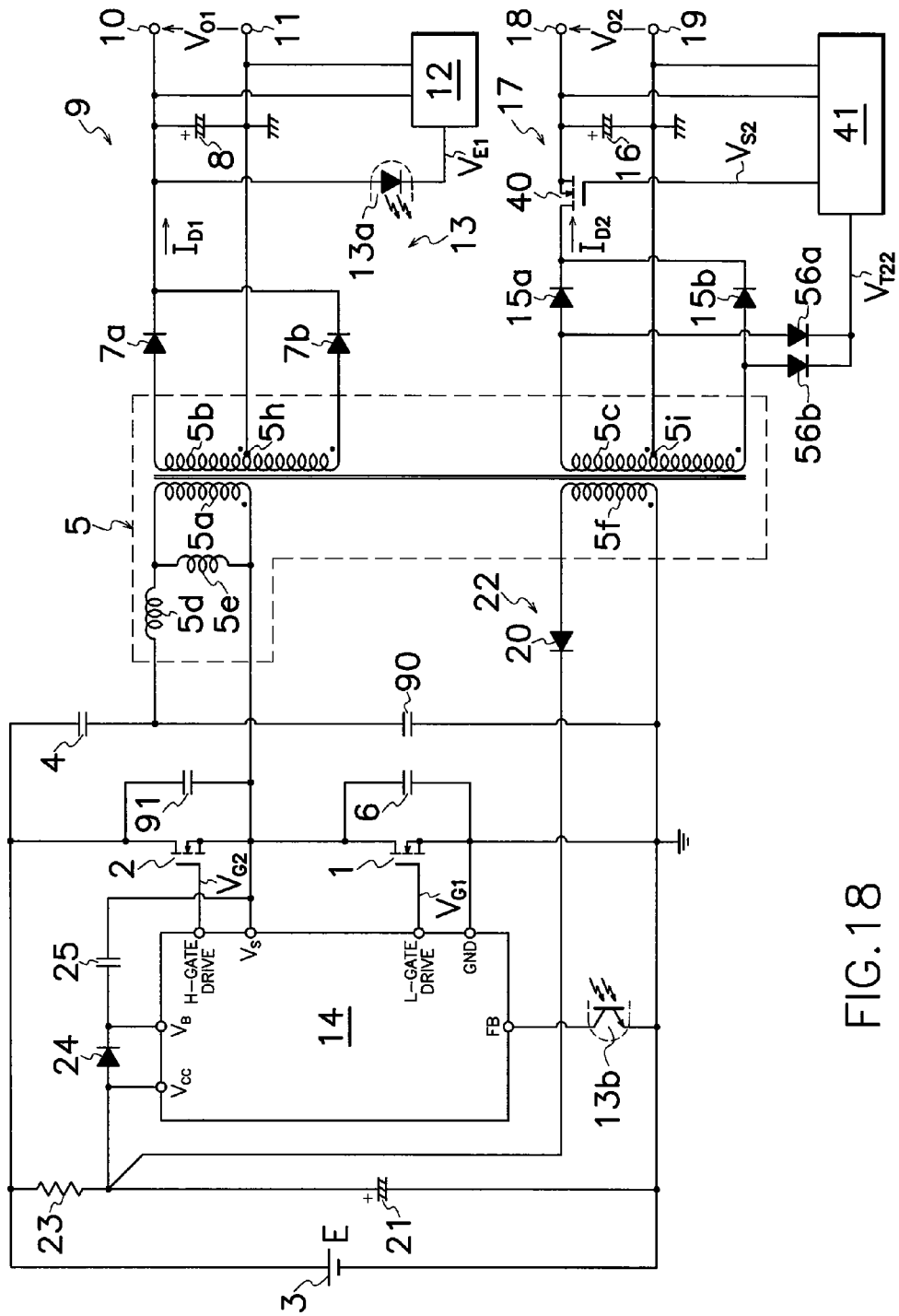
FIG. 18 An electric circuit diagram indicating a varied embodiment of FIG. 7.

The present invention should not be limited to the above first to eleventh embodiments and may be modified in various ways. For example, similar functions and effects as those in FIG. 1 can be obtained in a varied embodiment shown FIG. 17 wherein second current resonance capacitor 90 is connected between a junction of current resonance capacitor 4 and leakage inductance 5d in FIG. 1 and primary ground terminal, and second voltage pseudo resonance capacitor 91 is connected between drain and source terminals of second main MOS-FET 2. Similar modifications in FIG. 17 may be applied to the second to fourth embodiments shown in FIGS. 4 to 6. Also, similar functions and effects as in FIG. 7 would be obtained in case, as shown in FIG. 18, second current resonance capacitor 90 is connected between a junction of current resonance capacitor 4 and leakage inductance 5d of FIG. 7 and primary ground terminal, and second pseudo resonance capacitor 91 is connected between drain and source terminals of second main MOS-FET 2. Similar modifications to those in FIG. 18 may be made in the sixth to eleventh embodiments shown in FIGS. 11 to 16. While the first to eleventh embodiments utilize leakage inductance 5d of transformer 5 as a current resonance inductance, instead, external inductance may be used. Moreover, while the first to eleventh embodiments modulate pulse signal width of variable frequency for varying the on-period of second main MOS-FET 2 with the fixed on-period of first main MOS-FET 1, otherwise, they may modulate pulse signal width for varying each on-period of first and second main MOS-FETs 1 and 2 with the fixed switching frequency.

The first to eleventh embodiments take uni-polar DC output voltages $V_{O1}$, $V_{O2}$ and $V_{O3}$ for a single set of secondary windings 5b, 5c and 5g of transformer 5, however, they may take positive and negative DC output voltages for the single set of secondary windings 5b, 5c and 5g. Also, the first, fifth and eleventh embodiments utilize two output type, the second to fourth, and sixth to eighth and tenth embodiments utilize three output type of DC-DC converter, but without limiting thereto, the invention can be applied to DC-DC converters of four or more output type.

In the twelfth embodiment shown in FIG. 19, second current resonance capacitor may be connected between a junction of current resonance capacitor 4 and leakage inductance 5d of transformer 5 and primary ground terminal, and second pseudo capacitor may be connected between drain and source terminals of second main MOS-FET 2. Similar functions and effects to those in FIG. 19 can be obtained in this case. Similar modifications to the above-mentioned can also be applied to the thirteenth to sixteenth embodiments shown in FIGS. 22 to 25. The twelfth to fifteenth embodiments comprise rectifying smoother 9, 17 of half wave rectification comprised of one output rectifying diode 7, 15 and one output smoothing capacitor 8, 16, alternatively, they may comprise rectifying smoother 9, 17 of double or full wave bridge rectification or any combination selected from a group of half, double and full wave rectification depending on connected load.

The twelve to sixteenth embodiments comprise series circuit of current resonance capacitor 4, leakage inductance and primary winding 5a of transformer 5 in parallel to second main MOS-FET 2, however, instead, the series circuit may be connected in parallel to first main MOS-FET 1. Also, these embodiments are designed such that output-regulatory MOS-FET 40 is turned on and off when charged voltage $V_{CW}$ on accumulation capacitor 77 in PWM controller 44 is respectively lower and higher than error voltage $V_{PC}$ on light receiver 68b of photo-coupler 68. However, adversely, these embodiments may be designed such that output-regulatory MOS-FET 40 is turned on and off when charged voltage $V_{CW}$ on accumulation capacitor 77 in PWM controller 44 is respectively higher and lower than error voltage $V_{PC}$ on light receiver 68b of photo-coupler 68. These embodiments have voltage pseudo resonance capacitor 6 connected between drain and source terminals of first main MOS-FET 1, but in place of this configuration, voltage pseudo resonance capacitor 6 may be connected between source and drain terminals of both, either or any one of first and second main MOS-FET 1 and 2.

Figure 31:
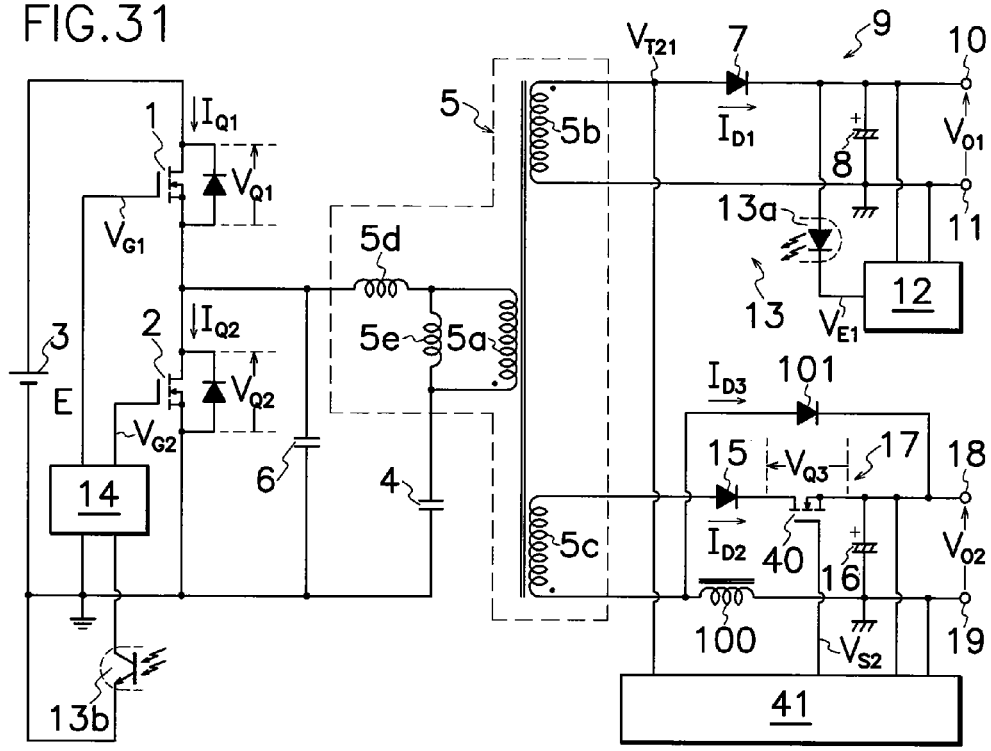
FIG. 31 An electric circuit diagram indicating a first varied embodiment of FIG. 26.
Figure 32:
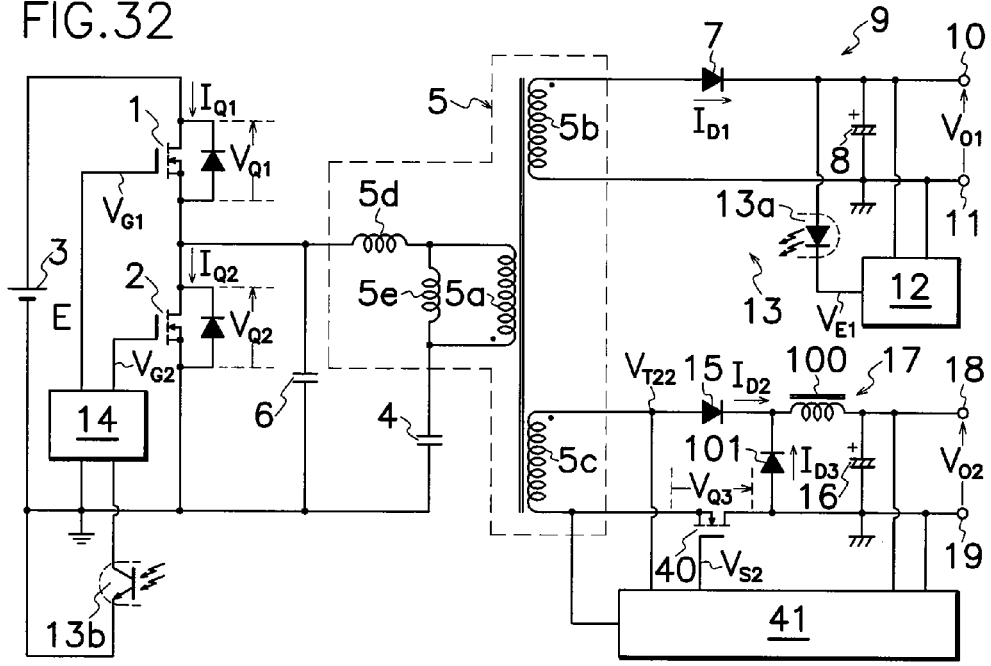
FIG. 32 An electric circuit diagram indicating a second varied embodiment of FIG. 26.
Figure 33:
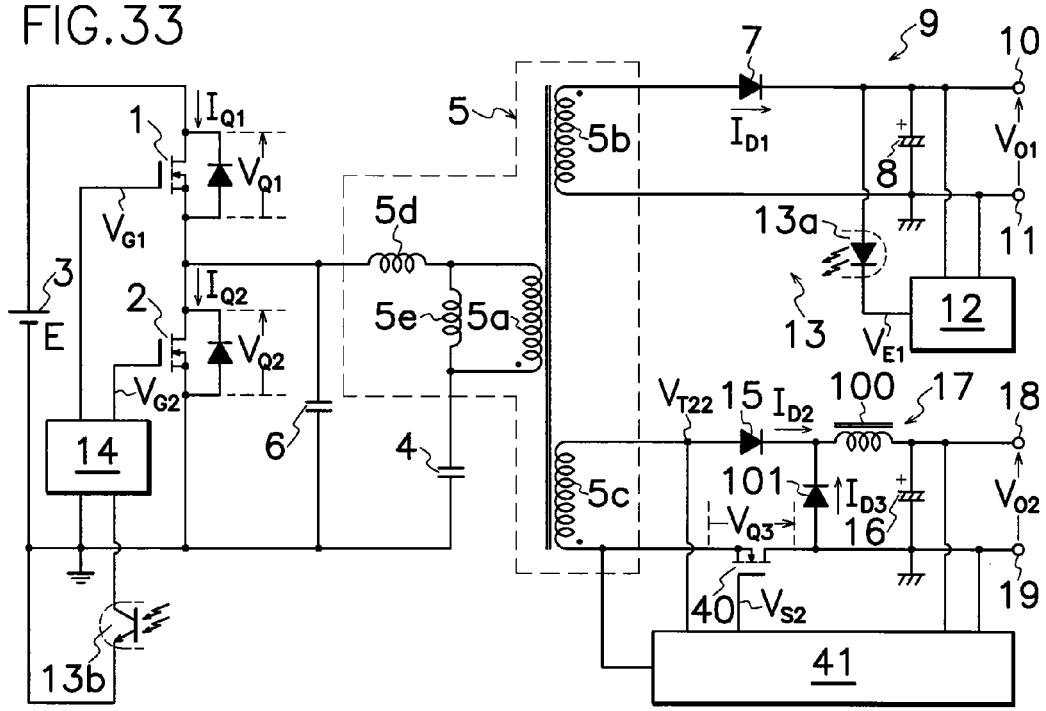
FIG. 33 An electric circuit diagram indicating a third varied embodiment of FIG. 26.
Figure 34:
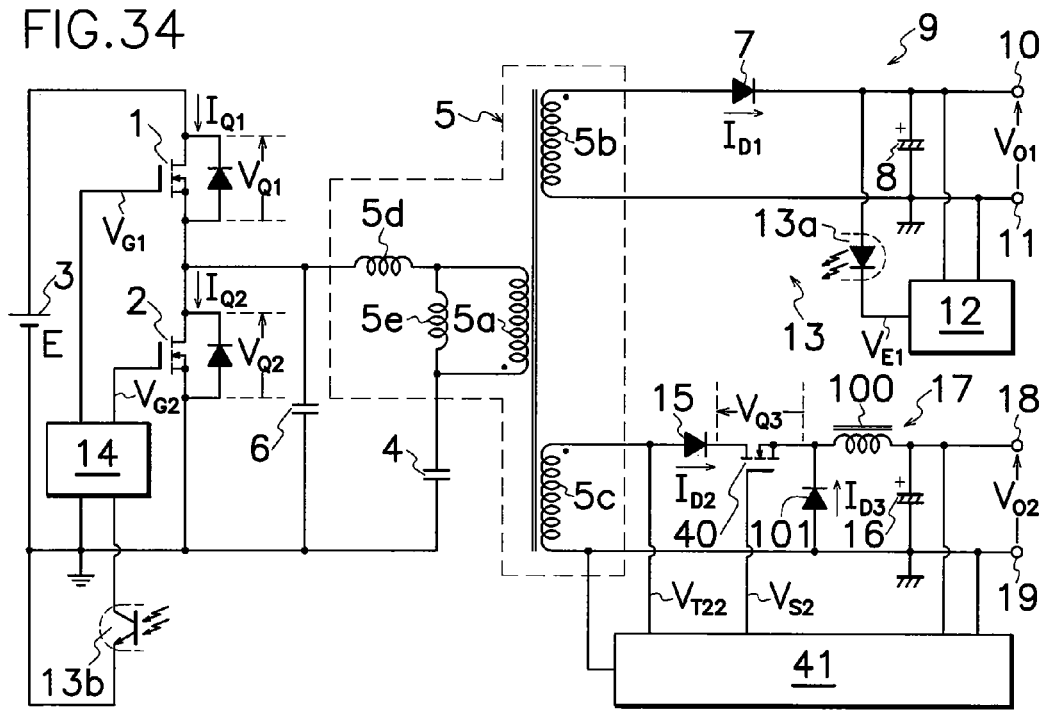
FIG. 34 An electric circuit diagram indicating a fourth varied embodiment of FIG. 26.

The seventeenth embodiment may be varied in various ways. For instance, as shown in FIG. 31, second secondary winding 5c of transformer 5 may be of adverse polarity as shown in FIG. 26. Also, as shown in FIG. 32, connected location of output-regulatory MOS-FET 40 and reactor 100 may be exchanged each other, and recovery diode 101 may be connected between junction of cathode terminal of second output rectifying diode 15 and reactor 100 and drain terminal of output-regulatory MOS-FET 40. In addition, as shown in FIG. 33, polarity of second secondary winding 5c of transformer shown in FIG. 32 may be inverted. Moreover, as shown in FIG. 34, connected location of output-regulatory MOS-FET 40 shown in FIG. 32 may be moved between junction of recovery diode 101 and reactor 100 and cathode terminal of second output rectifying dipole 15. Similar functions and effects to those in the seventeenth embodiment can be obtained in either circuit shown in FIGS. 31 to 34. Particularly, the circuits shown in FIGS. 31 to 33 alternately perform energy transmissions from first secondary winding 5b of transformer 5 to first rectifying smoother 9 and from second secondary winding 5c of transformer 5 to second rectifying smoother 17 to improve usability of transformer 5 for greater power transmission with higher conversion efficiency. Similar modifications to those in the eighteenth embodiment can be applied to each circuit shown in FIGS. 31 to 34. In other words, if output control circuit 41 shown in FIGS. 31 to 34 is designed as shown in FIG. 30, an inexpensive power source device of multi-output type may be provided without recovery diode 101.

Parasitic capacitance between drain and source terminals of first and second main MOS-FETs 1 and 2 may be utilized as voltage pseudo resonance capacitor. The twelfth to fourteenth embodiments are designed such that voltage change detector 42 in output control circuit 41 detects rising and falling pulses in excitation voltage $V_{T22}$ on second secondary winding 5c, but instead, voltage change detector 42 can detect rising and falling pulses in excitation voltage $V_{T21}$ on first secondary winding 5b of transformer 5. In addition, the twelfth to seventeenth embodiments exemplify the current resonant DC-DC converter of multi-output type for producing two DC outputs $V_{O1}$ and $V_{O2}$, but without limiting thereto, the present invention may be applied to current resonant DC-DC converters of multi-output type for producing three or more DC outputs. The period of time for supplying power to secondary side may be independent of the on- or off-period of switching elements. In addition, secondary rectification mode may be whatever mode of single, full and double wave rectification.

APPLICABILITY IN INDUSTRY

The present invention is preferably applicable to resonant DC-DC converters for producing a plurality of DC outputs, for example, current resonant DC-DC converter of multi-output type which comprises an output-regulatory switching element in a secondary side to generate plural DC outputs.

What is claimed is:
1. A current resonant DC-DC converter of multi-output type, comprising:
    first and second switching elements connected in series to a DC power source, a series circuit which comprises current resonance capacitor, an inductance and a primary winding of a transformer connected in parallel to said first or second switching element, a first rectifying smoother connected to a first secondary winding of the transformer, a second rectifying smoother connected to a second secondary winding of the transformer, an output-regulatory switching element connected between said secondary winding of the transformer and a smoothing capacitor in the second rectifying smoother, and an output control circuit for controlling the on-off operation of the output-regulatory switching element based on voltage from the smoothing capacitor in the second rectifying smoother, wherein said output control circuit detects rising pulse or falling pulse in voltage on said second secondary winding of the transformer to control the on-off operation of the output-regulatory switching element in synchronization with switching frequency of said first or second switching element, and wherein the on-off operation of the first and second switching elements causes resonance current to flow through the current resonance capacitor, inductance and primary winding of the transformer and the first or second switching element so that a first DC output voltage is provided from the first secondary winding of the transformer through the first rectifying smoother and simultaneously a second DC output voltage is provided from the second secondary winding of the transformer through the second rectifying smoother.

2. The current resonant DC-DC converter of claim 1, further comprising at least one additional secondary winding provided in said transformer, an additional rectifying smoother connected to said additional secondary winding, an additional switching element connected between said additional secondary winding and a smoothing capacitor in said additional rectifying smoother, and an additional control circuit for controlling the on-off operation of said additional switching element based on voltage on said smoothing capacitor in said additional rectifying smoother, wherein said additional control circuit turns said additional switching element on and off in synchronization with switching frequency of said first or second switching element to produce an additional DC output from said additional secondary winding through said additional rectifying smoother.

3. The current resonant DC-DC converter of claim 1 or 2, wherein the secondary windings of the transformer have the different polarities from each other.

4. The current resonant DC-DC converter of any one of claims 1 to 2, further comprising a main control circuit for controlling the on-off operation of said first and second switching elements based on voltage produced from said first rectifying smoother.

5. The current resonant DC-DC converter of any one of claims 1 to 2, further comprising a main control circuit for controlling the on-off operation of said first and second switching elements based on fluctuation in voltage from said DC power source.

6. The current resonant DC-DC converter of claim 1, wherein said output control circuit comprises:

a voltage change detector for detecting rising pulse or falling pulse in voltage on the second secondary winding of the transformer to produce respectively a first or second detection signal, and a drive control circuit for turning said output-regulatory switching element on or off after said voltage change detector produces the first or second detection signal.

7. The current resonant DC-DC converter of claim 6, wherein said drive control circuit comprises an error voltage generator for comparing said second DC output with a reference voltage to produce an error voltage of the level corresponding to the error between the second DC output and reference voltage, an accumulation circuit for producing a first or second accumulation output corresponding to an accumulated value of voltage produced on the second secondary winding of said transformer after said voltage change detector produced the first or second detection signal, and a comparator for comparing said error voltage and first or second accumulated output and turning said output-regulatory switching element on when said first accumulated output is lower than said error voltage, or turning said output-regulatory switching element off when said second accumulated output is higher than said error voltage.

8. The current resonant DC-DC converter of claim 7, wherein said voltage change detector comprises a detecting switching element for rising or falling pulse in voltage produced on said second secondary winding of said transformer to produce a first or second detection signal by turning itself on or off, said accumulation circuit comprises an accumulation capacitor electrically charged by voltage produced on said second secondary winding of the transformer to produce said first accumulated output after said detecting switching element produces said first detection signal, said accumulation capacitor is electrically discharged by voltage produced on said second secondary winding of the transformer to produce said second accumulated output after said detecting switching element produces said second detection signal, said comparator compares said error voltage and charged or discharged voltage on said accumulation capacitor and turns said output-regulatory switching element on or off when said charged or discharged voltage is respectively lower or higher than said error voltage.

9. The current resonant DC-DC converter of claim 6, wherein said drive control circuit comprises an error voltage generator for comparing said second DC output with reference voltage to produce an error voltage of the level corresponding to the error between said second DC output and reference voltage, an accumulation circuit for producing a first or second accumulation output corresponding to an accumulated value of voltage generated on the second secondary winding of the transformer after said voltage change detector produces said first or second detection signal, and a comparator for comparing said error voltage and said first or second accumulated output, and turning said output-regulatory switching element on when said first accumulated output is higher than said error voltage, or turning said output-regulatory switching element off when said second accumulated output is lower than the error voltage.

10. The current resonant DC-DC converter of claim 9, wherein said voltage change detector comprises a detecting switching element for detecting rising or falling pulse in voltage produced on said second secondary winding of the transformer to produce first or second detection signal by turning itself on or off, said accumulation circuit comprises an accumulation capacitor electrically charged by voltage produced on said second secondary winding of the transformer to produce said first accumulated output after said detecting switching element produces said first detection signal, said accumulation capacitor is electrically discharged by voltage produced on said second secondary winding of the transformer to produce said second accumulated output after said detecting switching element produces said second detection signal, said comparator compares said error voltage and charged or discharged voltage on said accumulation capacitor and turns said output-regulatory switching element on or off when said charged or discharged voltage is respectively lower or higher than said error voltage.

11. The current resonant DC-DC converter of claim 1, further comprising a voltage pseudo resonance capacitor connected in parallel to both or one of said first and second switching elements.

12. The current resonant DC-DC converter of claim 1, comprising
a reactor connected in a closed circuit comprised of said second secondary winding, second rectifying smoother and output-regulatory switching element.

13. The current resonant DC-DC converter of claim 12, wherein one end of said reactor is connected to one end of a smoothing capacitor in said second rectifying smoother, and a recovery diode is connected between the other end of said reactor and the other end of said smoothing capacitor.

14. The current resonant DC-DC converter of claim 12, further comprising a holding circuit connected to a later stage of said drive control circuit for maintaining said output-regulatory switching element in the on condition until the recovery current from said reactor ceases after said voltage change detector produces the second detection signal.

15. The current resonant DC-DC converter of claim 1, wherein said output control circuit comprises:
a voltage change detector for detecting rising pulse in voltage on the second secondary winding of the transformer to produce a first detection signal, or detecting falling pulse in voltage on the second secondary winding of the transformer to produce a second detection signal, and
a drive control circuit for turning said output-regulatory switching element on or off after said voltage change detector produces the first or second detection signal.

16. The current resonant DC-DC converter of claim 1, comprising:
a leakage inductance equivalently in series to the primary winding of the transformer; and an excitation inductance equivalently in parallel to primary winding;
wherein an excitation current flows through the current resonance capacitor, the leakage inductance and the excitation inductance of the transformer and the first switching element; and
the excitation current is a resonant current with a resonance frequency determined by a capacitance of the current resonance capacitor and a composite inductance of the leakage and excitation inductances and of the transformer.

* * * * *